United States Patent [19]

Tabata et al.

[11] Patent Number: 5,281,791
[45] Date of Patent: Jan. 25, 1994

[54] PULSED ARC WELDING APPARATUS

[75] Inventors: Yoichiro Tabata; Shigeo Ueguri; Yoshihiro Ueda, all of Hyogo; Masanori Mizuno, Aichi; Yoshiaki Katou, Aichi; Osamu Nagano, Aichi, all of Japan

[73] Assignee: Mitsubishi Denki K.K., Tokyo, Japan

[21] Appl. No.: 601,723

[22] PCT Filed: Feb. 27, 1990

[86] PCT No.: PCT/JP90/00245
§ 371 Date: Dec. 27, 1990
§ 102(e) Date: Dec. 27, 1990

[87] PCT Pub. No.: WO90/09857
PCT Pub. Date: Sep. 7, 1990

[30] Foreign Application Priority Data

| Feb. 28, 1989 | [JP] | Japan | 1-46801 |
| Feb. 28, 1989 | [JP] | Japan | 1-46802 |
| Mar. 9, 1989 | [JP] | Japan | 1-56959 |
| Apr. 12, 1989 | [JP] | Japan | 1-92599 |
| Apr. 12, 1989 | [JP] | Japan | 1-92600 |
| Apr. 12, 1989 | [JP] | Japan | 1-92601 |
| Apr. 12, 1989 | [JP] | Japan | 1-92602 |
| Apr. 12, 1989 | [JP] | Japan | 1-92603 |
| Apr. 12, 1989 | [JP] | Japan | 1-92604 |
| Apr. 12, 1989 | [JP] | Japan | 1-92605 |
| Apr. 12, 1989 | [JP] | Japan | 1-92606 |
| Jun. 20, 1989 | [JP] | Japan | 1-157444 |
| Jul. 12, 1989 | [JP] | Japan | 1-179881 |
| Jul. 12, 1989 | [JP] | Japan | 1-179882 |

[51] Int. Cl.$^5$ ............................................. B23K 9/09
[52] U.S. Cl. ........................ 219/130.51; 219/130.33
[58] Field of Search .................... 219/130.33, 130.21, 219/130.51, 137 PS

[56] References Cited

U.S. PATENT DOCUMENTS

| 4,201,906 | 5/1980 | Puschner | 219/130.33 |
| 4,300,035 | 11/1981 | Johansson | 219/130.21 |
| 4,438,317 | 3/1984 | Ueguri et al. | |
| 4,721,843 | 1/1988 | Budai et al. | 219/130.33 |
| 4,794,232 | 12/1988 | Kimbrough et al. | 219/130.33 |

OTHER PUBLICATIONS

Ueguri et al., "Study of Metal Transfer in Pulsed GMA Welding", Welding Journal, Aug. 1985, pp. 242 et seq.

Primary Examiner—Clifford C. Shaw
Attorney, Agent, or Firm—Sughrue, Mion, Zinn, Macpeak & Seas

[57] ABSTRACT

A pulsed arc welding for carrying out arc welding or short-circuit transfer type arc welding by utilizing the pulsed discharge generated at the tip of a wire electrode. The propensity of wire electrode curvature causes irregular changes in the contact point of the wire electrode and variations in the arc length between the wire electrode tip and workpieces. Consequently, the invention detects arc voltage and current and checks the instantaneous variation in the arc length. The arc voltage value thus detected is converted to a reference arc voltage variable. Then the detected arc voltage value is compared with the reference value to compute a true arc length. A simulation arc length signal, which varies as welding proceeds, and a reference simulation welding current waveform are set, to compare the simulation arc length signal with the computed arc length signal. The reference simulation welding current waveform is corrected according to this difference signal to form and output a welding current waveform, which is controllable instantaneously to provide an ideal target arc length. Welding can be carried out with stability since the wire electrode is allowed to hold the simulation arc length during each welding process.

35 Claims, 55 Drawing Sheets $V = K_1(I) \cdot 1 + K_2$ $\left(\dfrac{R_C}{R_D} \dfrac{R_B}{R_A}\right) 1 + \left(\dfrac{R_D}{R_E} V_C\right)$ $K_1 = \dfrac{R_C}{R_D} \dfrac{R_B}{R_A}$ $K_2 = \dfrac{R_D}{R_E} V_C$

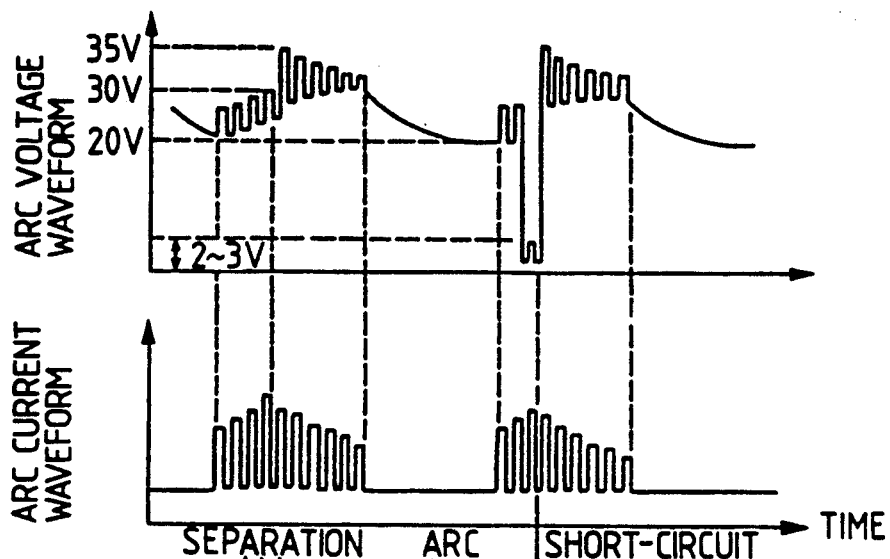
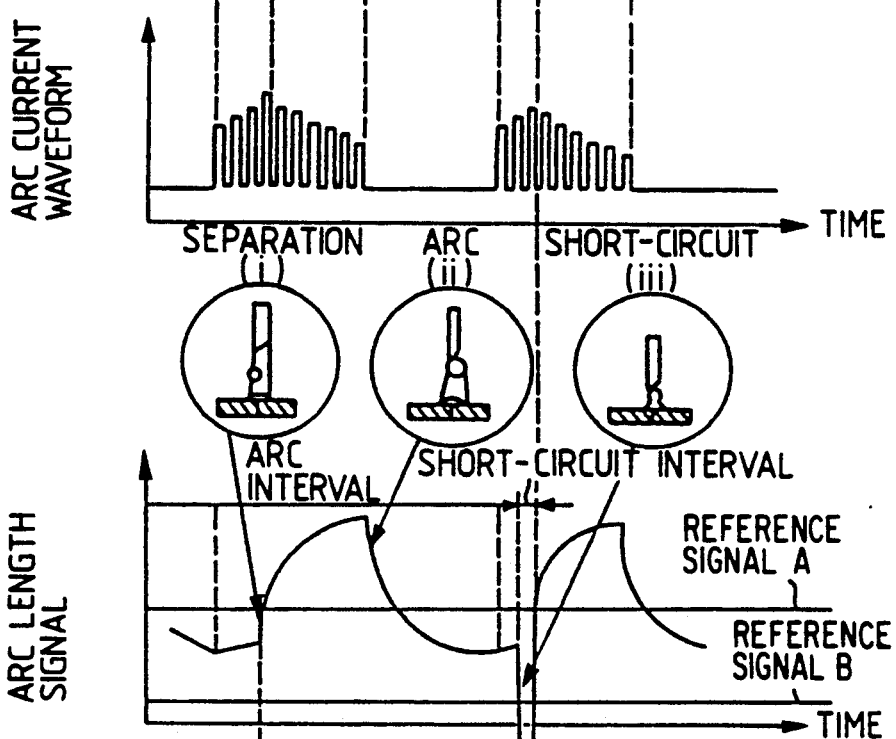
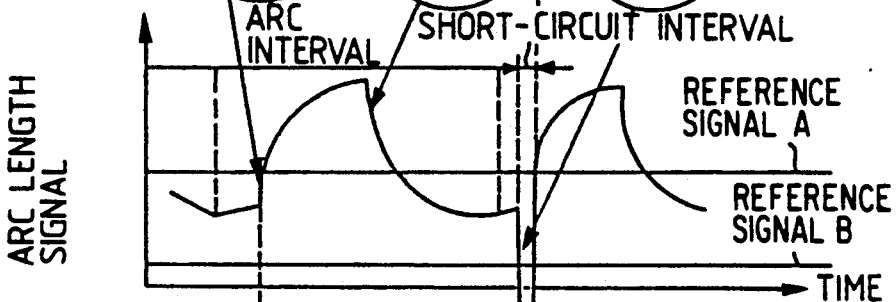
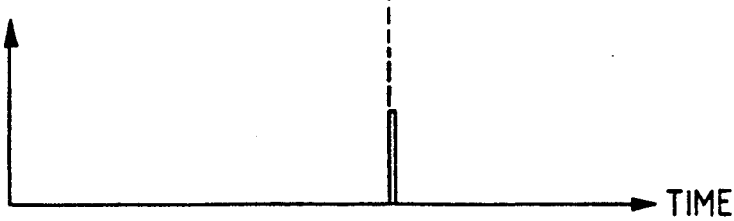

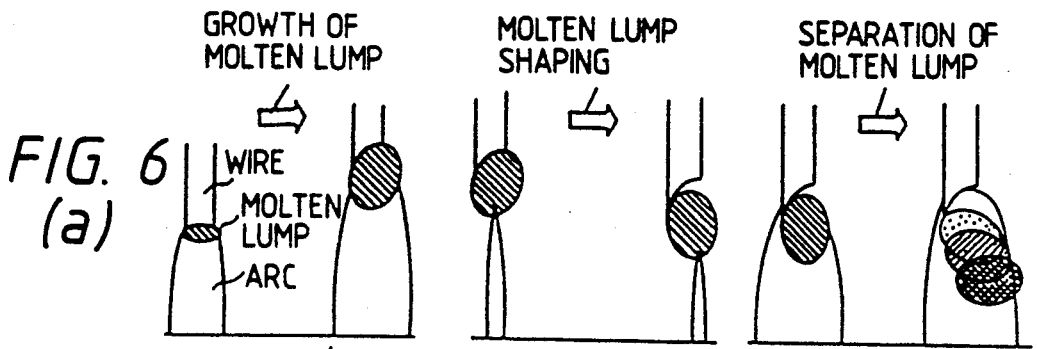
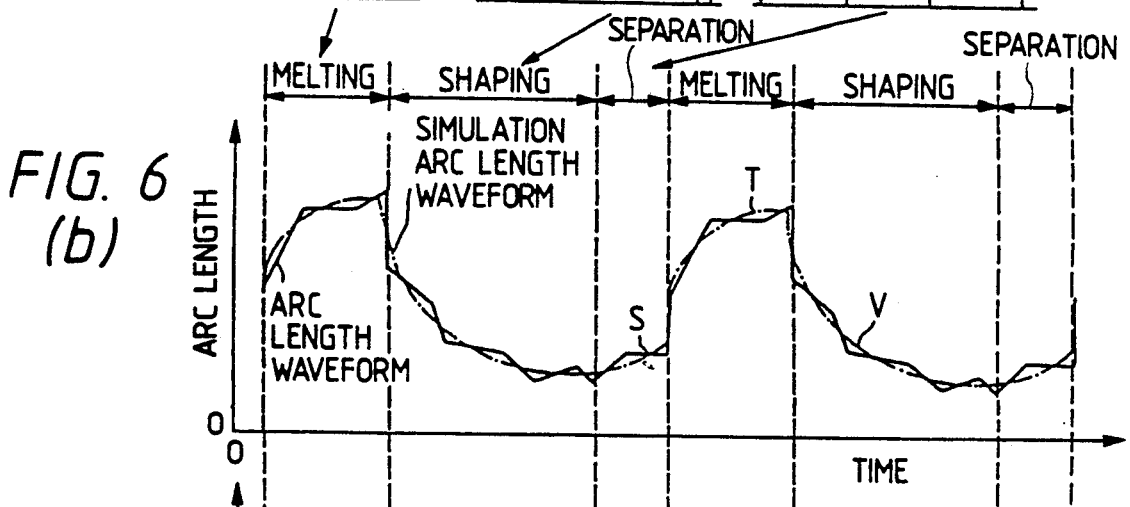
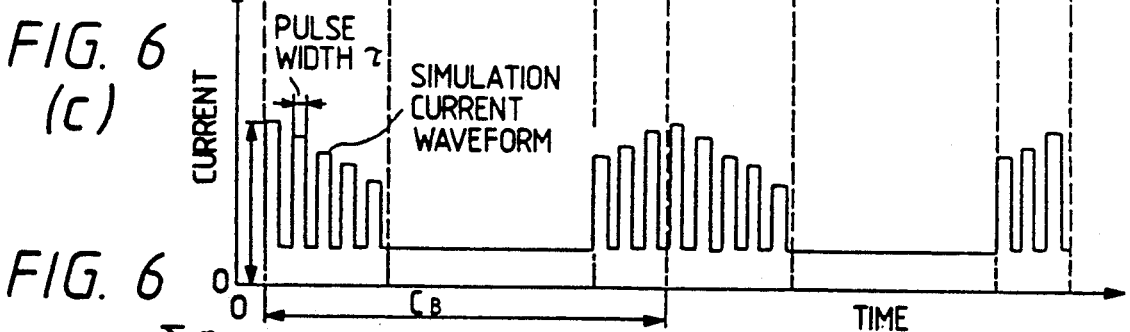
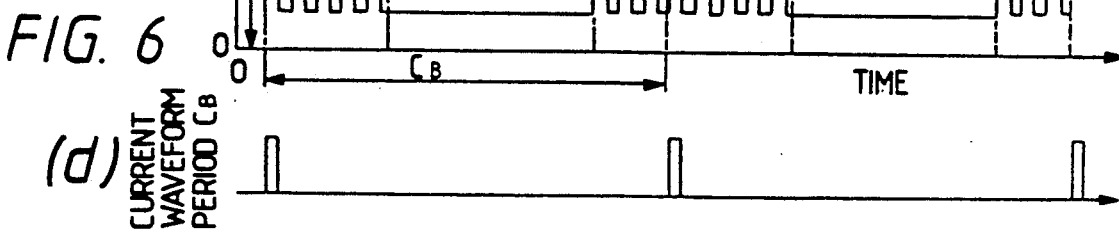

—·—·— SIMULATION ARC LENGTH WAVEFORM

——— ARC LENGTH WAVE FORM

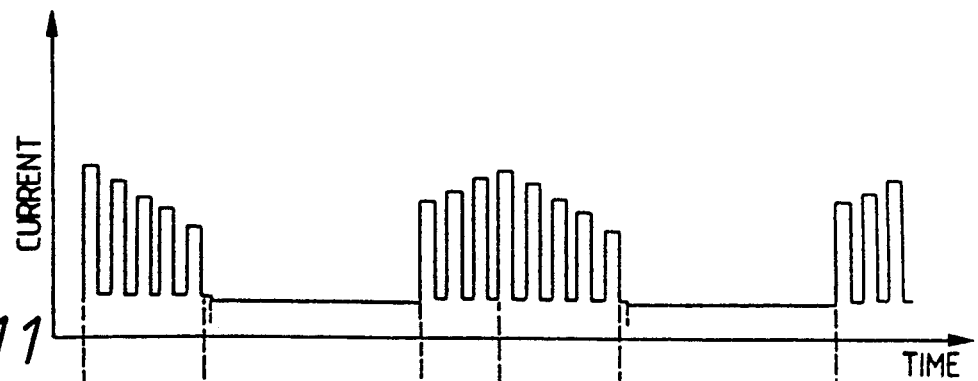
FIG. 11 (a)
FIG. 11 (b)
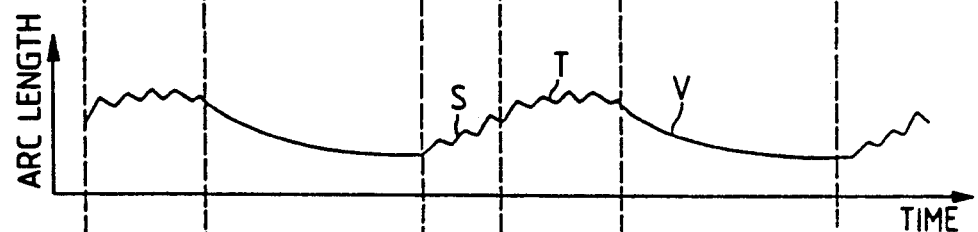
FIG. 11 (c)
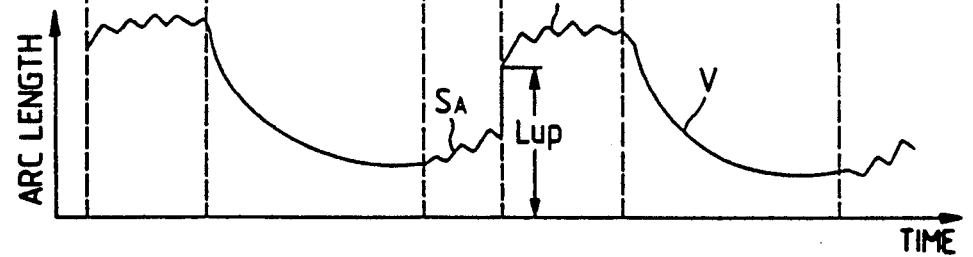

——— SIMULATION ARC LENGTH WAVEFORM
——— ARC LENGTH WAVEFORM

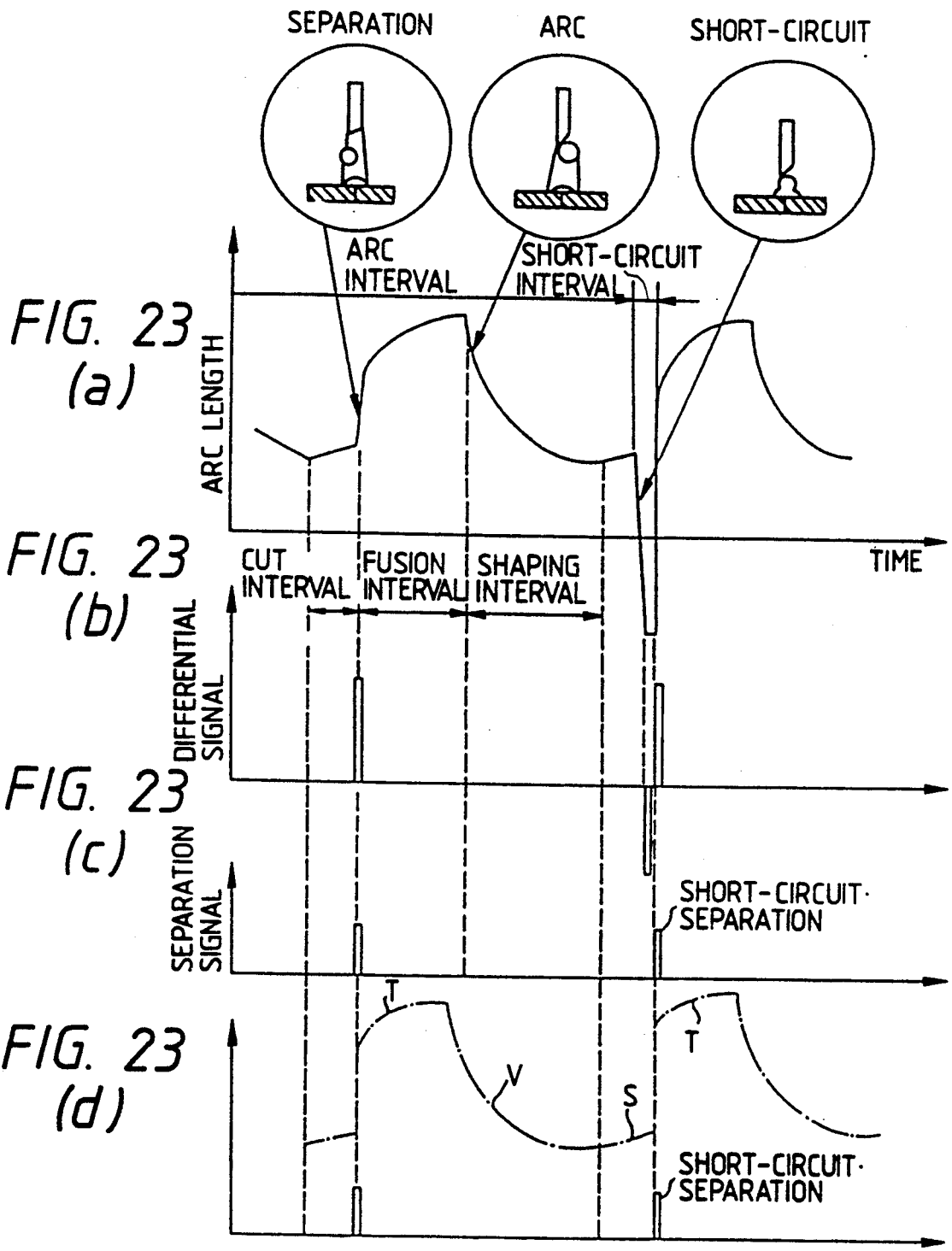

— · — SIMULATION ARC
——— ARC

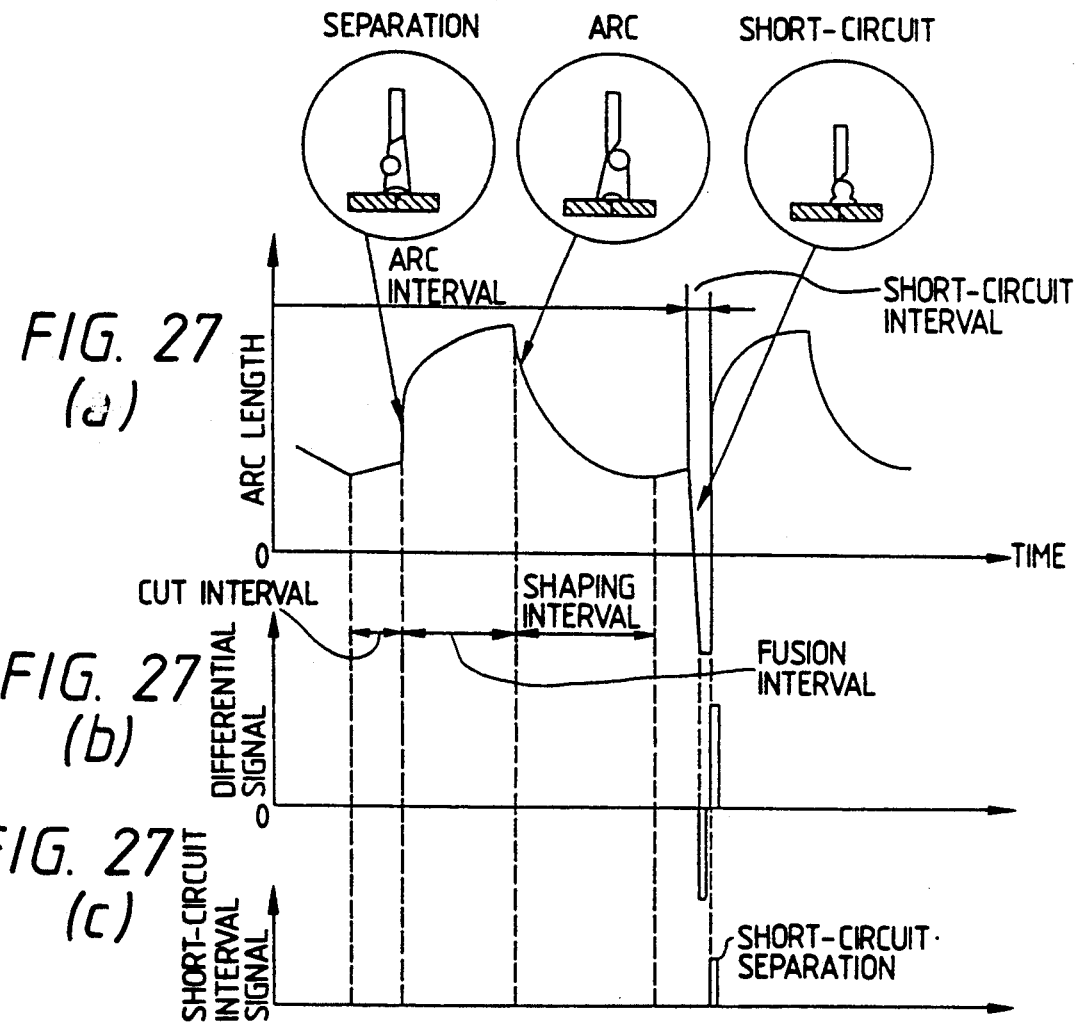

--- SIMULATION ARC
— ARC

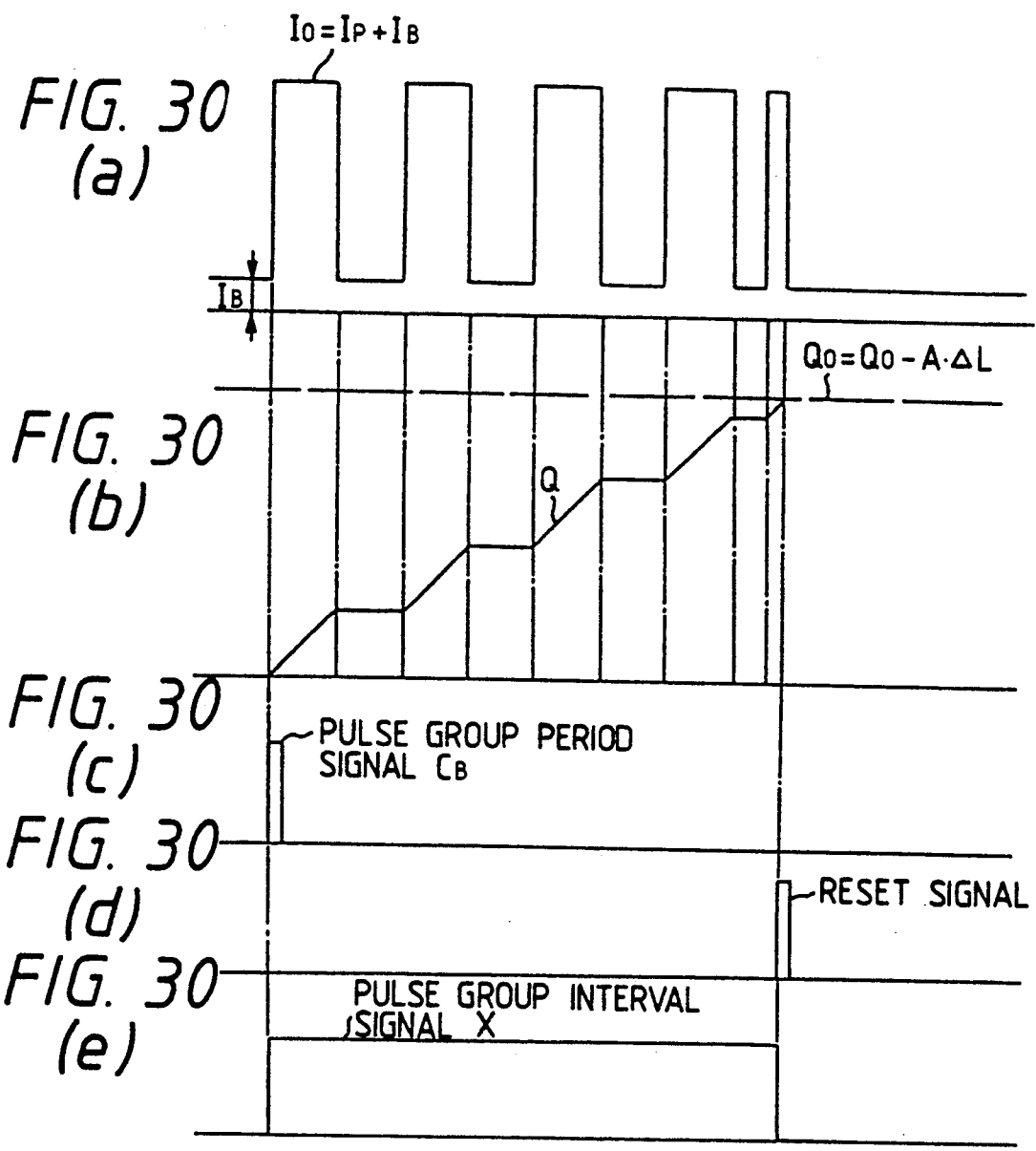

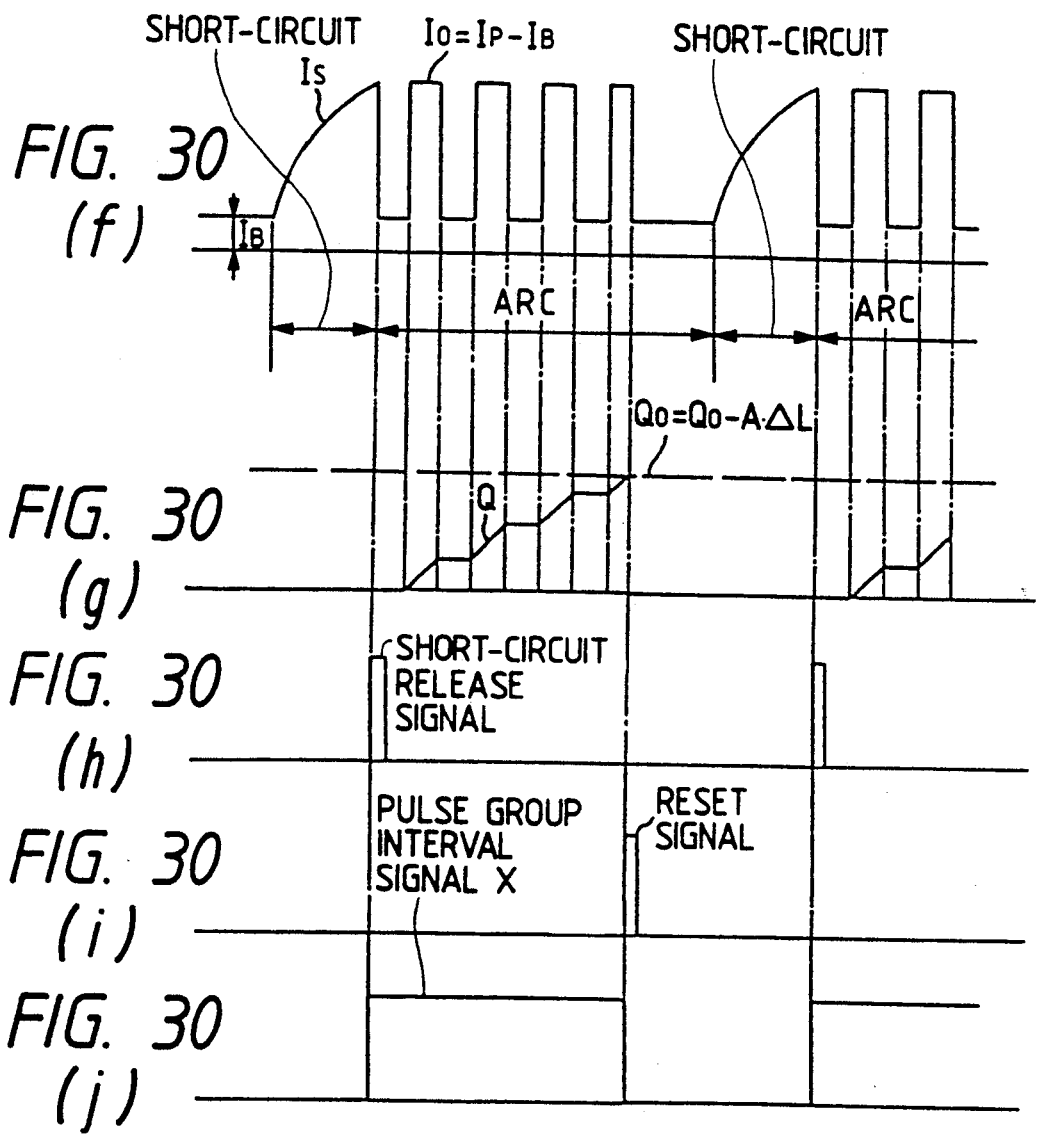

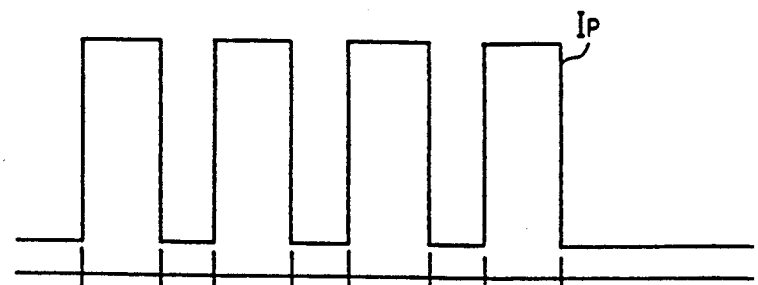
FIG. 35 (a)
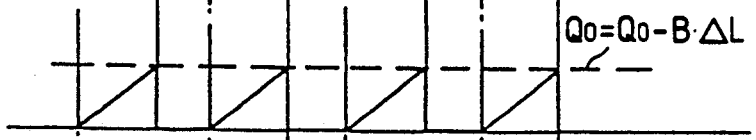
FIG. 35 (b)
FIG. 35 (c)
FIG. 35 (d)
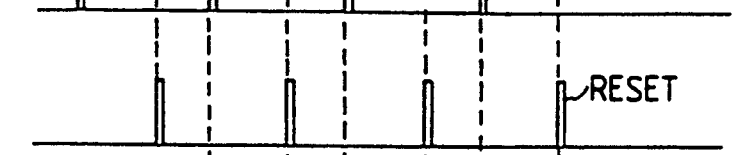
FIG. 35 (e)
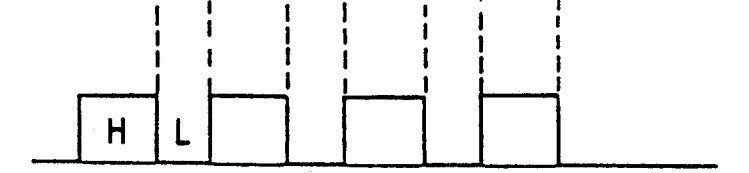

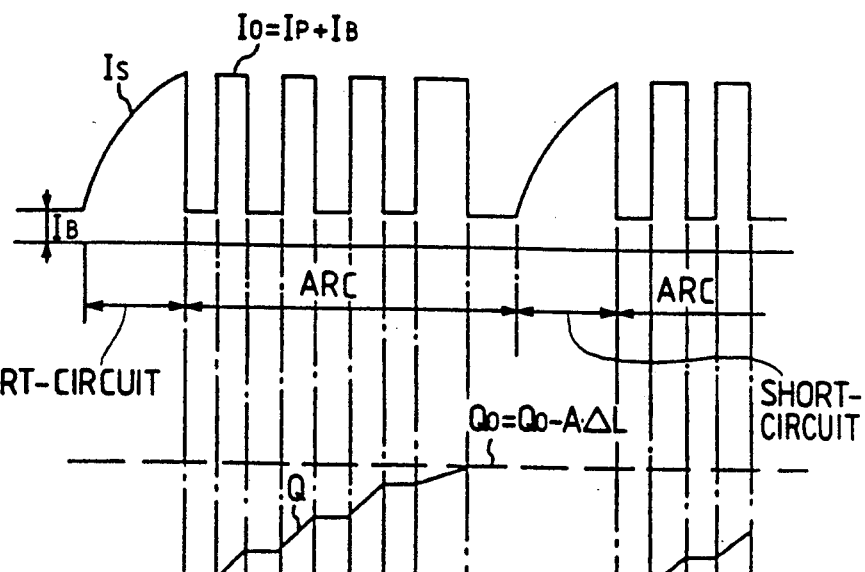
FIG. 38 (a)
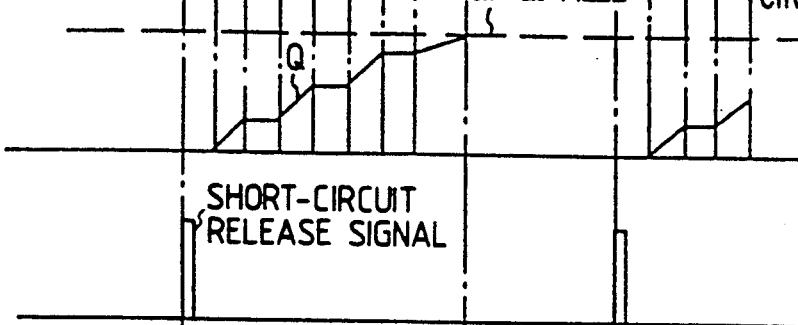
FIG. 38 (b)
FIG. 38 (c)
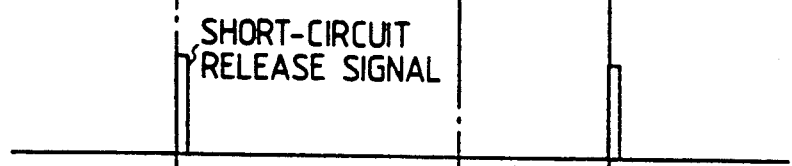
FIG. 38 (d)
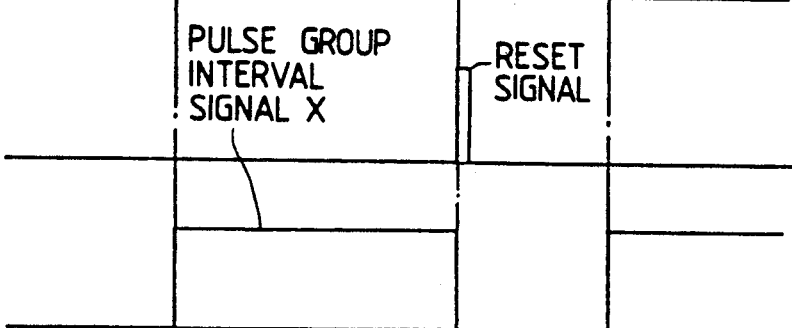
FIG. 38 (e)

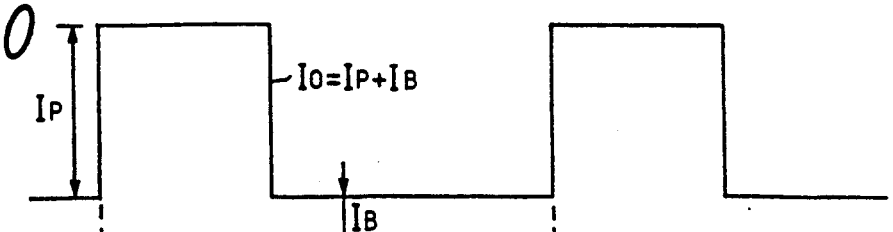
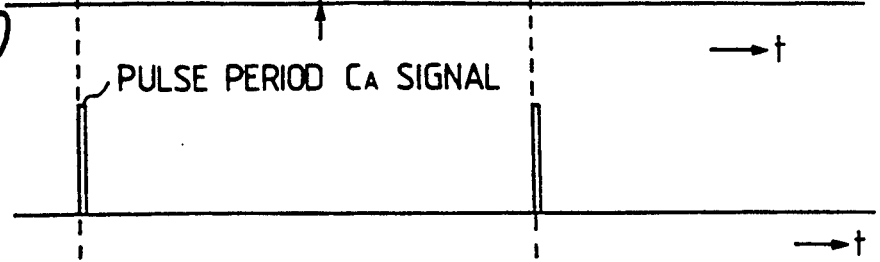
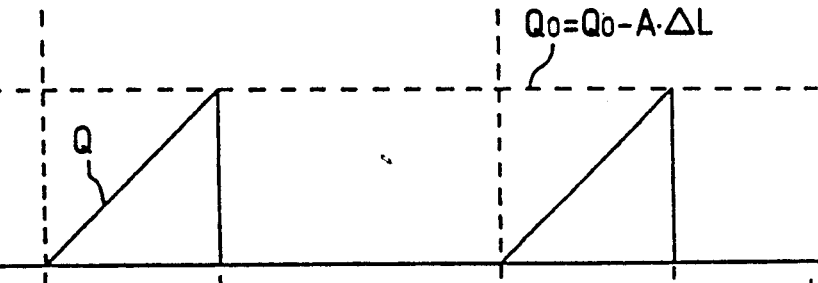
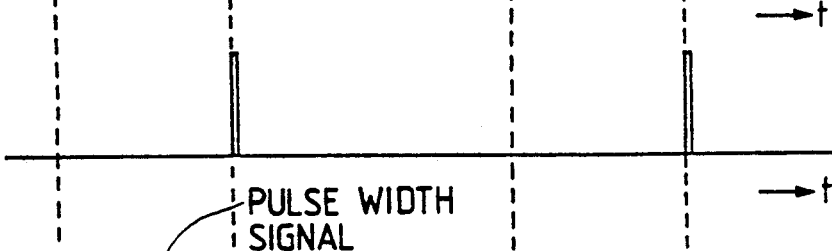
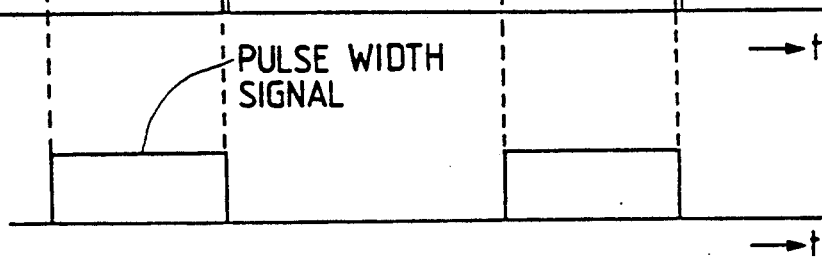

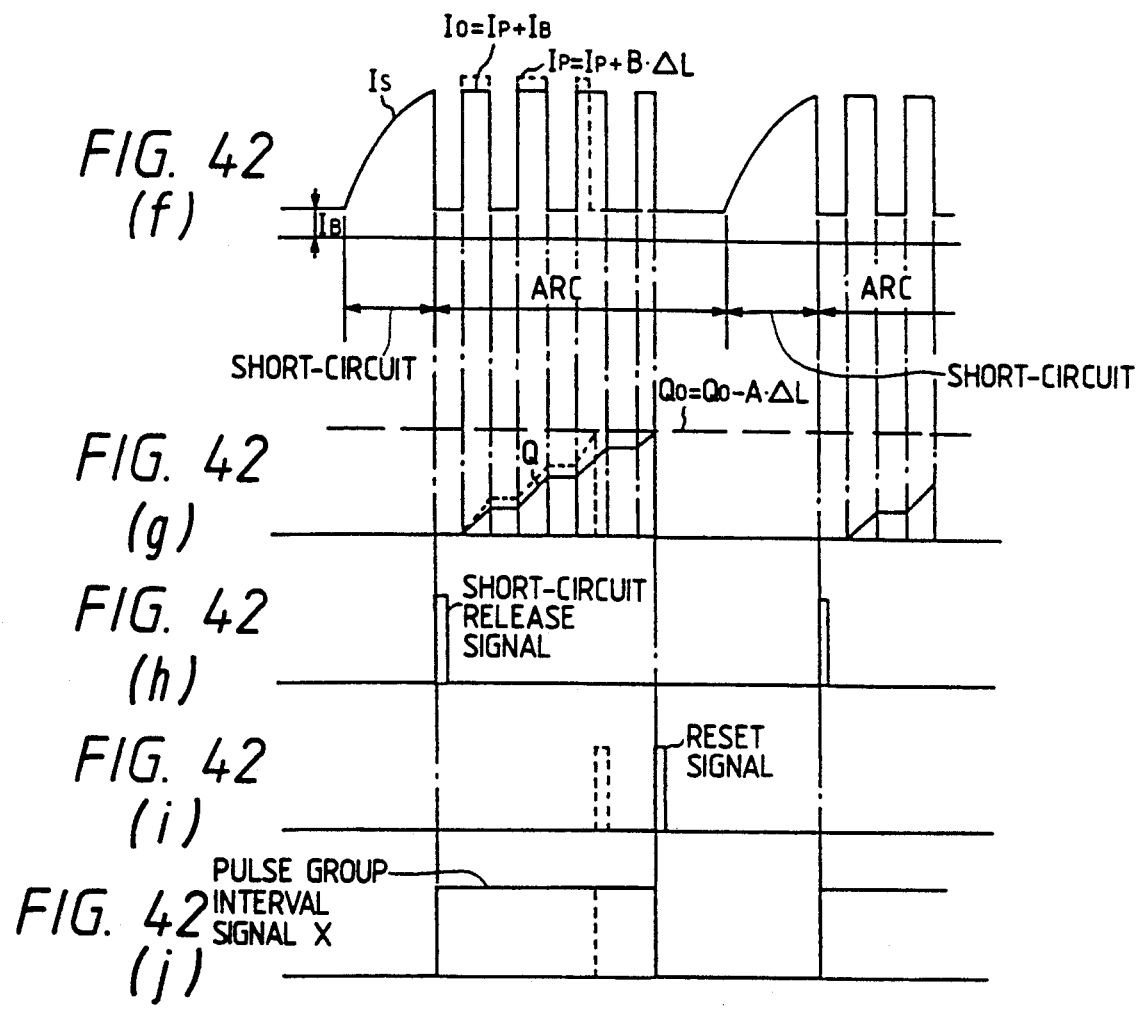

(a)

(b)

PULSED ARC WELDING APPARATUS

TECHNICAL FIELD

The present invention relates to welding apparatus utilizing a pulsed discharge, i.e., pulsed arc welding apparatus, and more particularly to a pulsed arc welding apparatus which control and correct a welding current waveform, wherein the welding current waveform for use in arc weld is supplied in accordance with the periodic repetition of a preset simulation arc length.

PRIOR ART

There are known welding apparatus such as an arc welding apparatus which uses the heat derived from the arc discharge caused to occur between a welding electrode and workpieces so as to weld the workpieces, and a pulsed arc welding apparatus which utilizes a pulsed discharge for the arc discharge. Particularly, some pulsed arc welding apparatus employs a group of pulsating currents comprising pulse trains.

As shown in FIGS. 47(a), (b), a conventional arc welding apparatus of the sort stated above is such that a pulsating current is repeatedly synchronously supplied as an arc current for arc welding purposes. FIG. 44 is shown a structure of such an arc welding apparatus. As shown in FIG. 44, the arc welding apparatus comprises an arc welding power supply 1 for supplying a welding current to a wire electrode 3 supported by a welding torch 2 and to workpieces 4b to be welded so as to have an arc 4a produced, a voltage detector 5 for detecting the arc voltage generated between the wire electrode 3 and the workpieces 4b, a current detector 6 for detecting the arc current, and an automatic welding evaluation unit 71. The automatic welding evaluation unit 71, comprises a voltage setting device 7a2, for setting a comparison voltage Va, a mean voltage converter 7a2 for receiving the arc voltage V detected and converting the arc voltage V to a mean voltage V, a comparator 7a3 for comparing the mean voltage V with the comparison voltage Va, a current setting device 7a4, for supplying a preset predetermined current from the arc welding power supply 1 to the arc 4a, an adder 7a5 for receiving an output signal ΔV from the comparator 7a3 and correcting the output Io of the current setting device 7a4, and a comparator 7a6 for comparing an arc current I from the current detector 6 with the output Io of the adder 7a5 and for outputting a directive signal (ON, OFF) so as to make the arc welding power supply 1 supply the arc current I in line with the set current Io.

With this arrangement, the operation of the conventional apparatus will subsequently be described. When the arc welding voltage (hereinafter called the welding voltage) converted so as to supply an arc current waveform is applied across the gap between the wire electrode 3 and the workpieces 4b by a switching element forming the arc welding power supply 1, the arc 4a is produced between the wire electrode 3 and the workpieces 4b. The wire electrode 3 and the workpieces 4b are heated and melted by the heat thus generated at that time and the workpieces 4b are welded as the molten lump of the melted wire electrode 3 transfers to the workpiece side.

When disturbances resulting from the variation of the feed rate of the wire electrode, the deflection of the welding torch and the distortion of the workpiece and the like occur, however, the heat input supplied from the welding power supply changes as the disturbance causes the arc welding load to change. As a result, the gap (the arc length) between the welding electrode and the workpieces tends to become too wide or narrow in comparison with the locus of the regular arc length accompanied by the normal fusion-separation of the molten lump and hence the welding condition becomes unstable. For this reason, the electrode-to-workpiece arc voltages V detected by the voltage detector 5 are averaged by the mean voltage converter 7a2 and the mean arc voltage V and the comparison voltage Va set by the voltage setting device 7a1' are compared by the comparator 7a3. If the mean arc voltage V is greater than the comparison voltage Va (ΔV<0), it is assumed longer than an imaginary mean arc length equivalent to the comparison voltage Va. The adder 7a5 then operates to correct the set current Io so as to decrease it by C·ΔV and delivers the corrected current to the comparator 7a6', C in this case being a proportionality factor.

Therefore, the melting amount of the welding electrode fed toward the workpieces 4 at constant speed is small and the molten lump at the tip of the electrode hardly grows; consequently the arc length gradually narrows.

If the mean arc voltage V is smaller than the comparison voltage Va (ΔV>0), it is assumed shorter than the imaginary mean arc length equivalent to the comparison voltage Va and the preset current Io is corrected by the adder 7a5' so as to increase it by C·ΔV and the current thus increased is delivered to the comparator 7a6.

As a result, the arc current flowing through the wire electrode increases and as the melting amount of the wire electrode at a constant feed rate gains, the gap (the arc length) between the wire electrode and the workpieces gradually widens.

When such a single pulsating current is used for arc welding while the arc-producing wire electrode is kept moving in the predetermined direction above the workpieces, the magnetic field distribution formed within the welding space is changed by the path of the current flowing from the welding torch to the arc and from the arc to the workpieces. In other words, the magnetic field distribution in the welding space is caused to vary with the difference in the shape of the welding joint and the earthing point on a case-by-case basis. Since electromagnetic force acts on the arc, depending on the magnetic field distribution and the direction of the arc current, there appears a magnetic arc blow phenomenon which makes the arc incline toward the workpieces. As shown in the separation processes (A-1—C-1, A-3—C-3) of respective molten lumps in FIG. 49, the molten lump is lifted by the deflected arc in the magnetic arc blow phenomenon. The molten lump formed at the tip of the wire is bent in the direction in which the arc has inclined as the arc length is prolonged and thus prevented from separating smoothly. In addition, instable welding conditions tend to be brought about as the molten lump is not allowed to move to the weld zone on an iron plate but caused to slip out of position.

In order to suppress the deflection of the molten lump due to the magnetic arc blow, as shown in FIG. 48, there has been proposed a pulsed arc welding apparatus which employs a group of pulsating currents formed by dividing a single pulse into a plurality of pulses as an arc current for use in welding.

FIG. 45 is a block diagram of a conventional pulsed arc welding apparatus of the sort stated above.

The pulsed arc welding apparatus shown in FIG. 45 comprises an arc welding power supply 1 for supplying the arc current composed of pulsating currents to a welder body, the power supply further comprising an invertor circuit 1a for converting a three-phase alternating voltage into a predetermined frequency so as to deliver the voltage thus converted to a transformer 1c, and invertor drive circuit 1b for driving the invertor circuit, and diodes 1d, 1d for rectifying the invertor output transformed so as to obtain the arc current composed of the pulsating currents. The pulsed arc welding apparatus further comprises a welding torch 2, a wire electrode 3 fed by a feed roller from a wire reel to workpieces 4b, the arc 4a produced between the wire electrode 3 and the workpieces 4b, a voltage detector 5 for detecting the arc voltage, a current detector 6 for detecting the arc current, a wire feeder 8a for feeding the wire electrode 3 to the workpieces 4a, a wire feed rate setting device 8b for setting a wire feed rate, a mean voltage setting device 13 for setting a mean arc voltage, and a pulsating current waveform control circuit 14 for setting a group of pulsating currents so as to output the group thereof as the arc current. The pulsating current waveform control circuit 14 comprises a pulse waveform shaper 14a, a pulse train period $C_B$ setting device 14b, a pulse train interval X setting device 14c, a pulse train waveform setting device 14d, a pulse width $\tau$ setting device 14e, a pulse period $C_A$ setting device 14f, an adder 14g for adding the base current output of a base current output device 14h to the group of pulsating current thus formed, and a comparator 14i for comparing the detected arc current value with the output of the group of pulsating currents.

The operation of the conventional apparatus will subsequently be described. A pulse train waveform signal, a pulse width $\tau$ signal and a pulse period CA signal are first transmitted to the pulse waveform shaper 14a from each of pulse train waveform setting device 14d, the pulse width $\tau$ setting device 14e and the pulse period $C_A$ setting device 14f, respectively. Moreover, a pulse train period $C_B$ signal and a pulse train interval X signal are transmitted to the pulse waveform shaper 14a from the pulse train period $C_B$ setting device 14b and the pulse train period X setting device 14c. Then the pulse waveform shaper 14a shapes the pulse train signal having a specific pulse train waveform and a specific pulse period $C_A$ into an intermittent pulse train waveform shown in FIG. 48 according to the pulse train period $C_B$ signal and the pulse train interval X signal. In addition the pulse waveform shaper 14a uses a base current $I_B$ from the base current output device 14h to superpose a direct current $I_B$ on the intermittent pulse train waveform for reshaping (FIG. 48). By inputting the pulse current group signal thus shaped and the current signal detected by the current detector 6 to the comparator 14i, an invertor drive signal corresponding to the relation of large and small between the pulse current group signal and the detected current signal is transmitted from the invertor drive circuit 1a to the invertor circuit 1b, so that the invertor is driven.

When the invertor is thus driven, the group of pulsed arc currents, shown in FIG. 48, are supplied to the weld zone. Simultaneously with the supply of the group of pulsed arc currents, the wire electrode 3 is continuously fed by a motor (not shown) in the arc load section. Consequently, the group of pulsed arc currents cause the pulsed arc discharge between the wire electrode 3 and the workpieces 4b, thus melting the workpieces 4b and the tip of the wire electrode 3. The molten part of the wire electrode 3 is caused to continuously fall in drops onto the molten parts of the workpieces 4b to effect welding. Naturally, the wire electrode 3 is continuously consumed and hence the wire electrode 3 is continuously fed by the motor to the welding torch 2 to compensate for the consumed amount.

Next, the high-frequency characteristics of a pulsed arc current waveform $I_P$ will subsequently be described with reference to FIG. 46. As the pulse width $\tau$ of one pulsating current becomes shortened simultaneously with the presence of intermittent currents in the group of pulsating currents X, the intensity of the electromagnetic force caused by the pulsating current once varies in accordance with the application of the pulsating current. In this time, the force applied to the molten lump 3a formed at the tip of the wire electrode 3 is mainly represented by the electromagnetic force F at the pulse peak current value $I_P$. When the supply of the pulsating current is suspended, the force owing to a reaction to the electromagnetic force during the supply of the pulsating current, the surface tension of the molten lump or gravity becomes extremely stronger than the electromagnetic force is derived from the base current and it acts on the molten lump 3a as a pinch force P. As a result, the molten lump 3a formed at the tip of the wire electrode 3 is caused to oscillate because of the pulse frequency of the group of pulsating currents X. As the molten lump 3a oscillates, it becomes possible to produce a 'shoulder' B promptly even in the region of the pulse peak current value where such a 'shoulder' could hardly be produced on the interface between the wire electrode and the molten lump in the prior art. Thus the molten lump 3a can be separated easily.

The molten lump separated by the group of pulsating currents X is reduced to fine particle before being methodically transferred to the workpieces to obtain a bead uniform in quality during the work of welding. It is therefore necessary to repeat the group of pulsating currents X with the predetermined period $C_B$, the group of pulsating currents X being composed of the plurality of pulsating currents set at pulse intervals TA with the pulse width $\tau$.

However, the variation of the arc length has been detected by comparing the comparison voltage for setting the imaginary mean arc length with the mean arc voltage value between the wire electrode and the workpieces in the conventional arc welding apparatus. Notwithstanding, the mean arc voltage value may vary as the arc current changes, provided the arc length is constant. Even if the variation of the arc length is determined with the variation of the mean arc voltage value as a criterion so as to correct the variation of the arc length, the arc length is still beyond precise control. The problem is that arc welding of good quality remains unanticipated. In a case where the workpiece as a base metal is distorted at a fixed percentage as shown in FIG. 50(a), for instance, and where the length (Ex) of the projected wire electrode and the arc length vary as it is distorted, the variation of the arc length may be detected from the mean arc voltage value which is proportional to the variation of the length thereof. If, however, the inside of the torch chip wears enough to have the chip diameter enlarged as it kept in contact with the wire electrode to the extent that the wire electrode irregularly makes contact with the inside thereof, the point at which the arc current is supplied to the wire electrode instantly changes, which equally means the fact that the length (Ex) of the projected wire electrode instantaneously changes.

If the contact point of the wire electrode to the inside of the chip varies because of its propensity for curving, the aforementioned point at which the current is supplied irregularly changes, which is also comparable to the change of the projected length (Ex) and therefore to the instantaneous change of the arc length. Moreover, the arc length instantaneously changes when the welding torch is caused by a welding robot or jig to deflect irregularly or sharply or because of the change of play in the cable path for the wire electrode from the wire electrode reel up to the welding torch. For this reason, the detected mean arc voltage value cannot be relied upon to control the instantaneous change of the arc length and this poses a problem in that the abrupt change of the arc length during welding work causes welding defects such as an undercut to part of weldment. Since the instantaneous change of the arc length has to be made controllable to obviate the problems stated above, it has remained difficult to control arc welding precisely in consideration of the periodic locus of the arc length with the accompaniment of the fusion-separation of the molten lump.

In the case of the pulsed arc welding apparatus with the arc current composed of the group of pulsating currents, the pulsating current charge amount is fixed since the waveform of the group of pulsating currents for setting the group of pulsating currents, the output period of the group of pulsating currents and the like have been incorporated in the preset values. The contact point of the wire electrode to the inside of the chip irregularly changes because of the propensity of the wire electrode for curving, thus causing the projected length (Ex) to vary and hence the arc length to instantaneously vary. Even if the arc length instantaneously changes when the welding torch is caused by a welding robot or jig to deflect irregularly or sharply or because of the change of play in the cable path for the wire electrode from the wire electrode reel up to the welding torch, the supply charge amount of the arc current remains uncontrollable even though such an attempt is made to correct the change of the arc length. These problems left unsolved tend to badly affect welding quality.

An object of the present invention is to solve the foregoing problems by providing a pulsed arc welding apparatus which makes it possible to specify the separation and short-circuit time of droplets simultaneously with the detection of a true arc length, to detect the actual change, including the instantaneous change, of the arc length and to carry out welding along a preset target arc length with stability.

DISCLOSURE OF THE INVENTION

According to a first aspect in the invention, a pulsed arc welding apparatus for welding workpieces with heat resulting from the arc discharge produced between a welding electrode and the workpieces by applying a welding voltage between the welding electrode and the workpieces, comprises a current and a voltage detector for detecting variations of current and voltage between the welding electrode and the workpieces, a multiplier circuit for receiving a detected arc current value which momentarily varies from the current detector and for multiplying the detected current value by a function, an adder circuit for adding direct voltage to the output from the multiplier circuit so as to output a reference arc voltage, and an arc length computing means for receiving the arc voltage changing momentarily from the voltage detector as the arc length varies so as to output an arc length signal L(l) indicating the change of the arc length according to the operation of comparing the arc voltage with the reference arc voltage output of the adder circuit. The function relying on the arc current is determined by the arc length computing means after the arc voltage and the arc current are simultaneously detected by the voltage detector and the current detector, respectively. The reference arc voltage signal obtained by adding the direct current to the output from the multiplier for multiplying the current value by the function is simulated in the circuit. According to the simulated reference arc voltage and the arc voltage are computed for comparison, based on which the arc length signal L(l) integrally corresponding to the true change of the arc length is output. Therefore, the shape of the reinforcement of weld and the depth of weld penetration of the welding bead formed with reliance on the true arc length make it possible to evaluate the welding bead condition changing momentarily with the momentary change of the arc length signal L(l). The evaluation has the effect of assuming the role of a sensor for improving welding quality in anticipation of improvement in product quality.

According to a second aspect in the invention, a pulsed arc welding apparatus includes, in addition to those recited in the first aspect in the invention, a differentiating circuit for detecting the level of the arc length signal produced from the arc length computing means of the first aspect in the invention at the sharp rise and fall time of the signal, and a decision circuit for choosing the signal only at the rise time according to the output signal of the differentiating circuit. The provision of the additional detector A for deciding the output signal of the decision circuit A to be a signal representing the time at which the molten lump transfers to the workpieces ensures that the separation time of the molten lump as a unique phenomenon during arc welding can be made known precisely. Consequently, it becomes possible to measure the separation period of the molten lump corresponding to the unevenness of a welding bead. Since the accurate evaluation of welding quality can be made accordingly, the provision of the decision circuit A as a sensor contributes to quality improvement.

According to a third aspect in the invention, a pulsed arc welding apparatus includes, in addition to those recited in the second aspect in the invention, an additional decision circuit B for choosing the signal only at the fall time according to the output signal of the differentiating circuit. The provision of the additional detector B for deciding the output signal of the decision circuit B to be a signal representing the time at which the molten lump and the workpieces short-circuit ensures that the short-circuit time of the molten lump and the workpieces as a unique phenomenon during arc welding can be made known precisely. Consequently, it becomes possible to evaluate any defect in the welding bead due to short-circuit and a welding defective ratio due to the adherence of spatter to the weld plate by measuring the number of short-circuit times or short-circuit time itself. In this way, the provision of the decision circuit B as a sensor contributes to welding quality improvement.

According to a fourth aspect in the invention, a pulsed arc welding apparatus includes, in addition to those recited in the second and third aspects in the invention, a means for comparing the arc length signal L(l) with a reference signal A, and a decision circuit C for deciding a point of time at which the arc length signal L(l) exceeds the reference signal A. The provision of the additional detector C for deciding the output signal of the decision circuit C to be a signal representing the time at which the molten lump transfers to the workpieces ensures that, in addition to the effect of the second aspect in the invention, the separation of the molten lump can be detected as the detection of the separation thereof is decided by the level value of the reference signal A.

According to a fifth aspect in the invention, a pulsed arc welding apparatus includes, in addition to those recited in the second to fourth aspects in the invention, a means for comparing the arc length signal L(l) with a reference signal B whose level is lower than that of the reference signal A and a decision circuit D for deciding a point of time at which the arc length signal L(l) is made lower by the aforementioned comparison means than the reference signal B. The provision of the additional detector D for deciding the output signal of the decision circuit D to be a signal representing the time at which the molten lump of the molten electrode and the workpieces short-circuit ensures that, in addition to the effect of the third aspect in the invention, the short-circuit is detected as it is decided according to the level value of the reference signal B.

According to a sixth aspect in the invention, a pulsed arc welding apparatus for welding workpieces by transferring the molten lump grown at the tip of a welding wire electrode to a welding zone with the heat generated by the welding current supplied between the welding wire fed to workpieces and the workpieces, comprises an arc length detector for momentarily detecting the arc length between the tip of the welding wire electrode and the workpieces so as to output an arc length signal, an arc length setting device for setting the pre-simulated momentary change of the arc length as the welding process proceeds, a current waveform setting device for setting a reference welding current waveform, a comparator for comparing the detected arc length value along the momentary progress of the welding process with the set arc length value so as to output a difference signal, and a computing element for correcting the pulse peak value or pulse width of the reference welding current waveform according to the difference signal and for forming and outputting a welding current so as to obtain a target arc length. The difference signal obtained by comparing the momentary arc length detected by the arc length detector with the preset simulation arc length set by the arc length setting device is used to correct the reference welding current waveform so as to form and output a corrected welding current waveform, so that welding can be effected with stability while the wire electrode maintains the simulation arc length during the welding process.

According to a seventh invention, the computing element according to the third aspect in the invention is provided with the function of correcting a base current having the reference welding current waveform according to the difference signal. By raising the waveform level during the melting period in the reference welding current waveform, the instantaneous change of the arc length causes the arc length level to lower and the change of the arc length is corrected. While the target arc length is retained, stable welding can thus be carried out and the simulation target arc length waveform is easily set in conformity with the reference welding current waveform with the effect of obtaining a high general-purpose grade arc welding apparatus.

According to an eighth aspect in the invention, a pulsed arc welding apparatus includes, in addition to those recited in the sixth and seventh aspects in the invention, a short-circuit interval detector for detecting the short-circuit between the molten lump and the workpieces according to the arc length signal and outputting a short-circuit interval detection signal when the short-circuit occurs. When the short-circuit state of the molten lump is detected to be above the simulation arc length waveform signal, the computing element corrects the reference welding current waveform, forms and outputs the welding current, so that the wire electrode can effect welding with stability while maintaining the simulation arc length in agreement with the timing at which the short-circuit occurs.

According to a ninth aspect in the invention, a pulsed arc welding apparatus includes, in addition to those recited in the sixth aspect in the invention, a current waveform period setting device for synchronizing periods with which the reference welding current waveform from the current waveform setting device and the simulation arc length waveform resulting from the simulation of the momentary change of the arc length from the arc length setting device are read. As the simulation arc length waveform is read from the arc length setting device synchronously with the period of reading, the frequency period of each welding phenomenon can be judged from a current waveform period and the frequency period interval in each welding process can also be regulated in accordance with the change of welding conditions. Moreover, the difference signal obtained by comparing the simulation arc length with the true arc length detected by the arc length detector is usable for correcting the reference welding current waveform. The corrected welding current waveform is thus formed and output, so that the wire electrode can effect welding with stability while maintaining the simulation arc length in each welding process despite the change of welding conditions. In comparison with the sixth aspect in the invention, the versatility of the arc welding apparatus is further increased with the effect of improving not only welding quality but also welding control speed.

According to a tenth aspect in the invention, a pulsed arc welding apparatus includes, in addition to those recited in the third and fourth aspects in the invention, a separation detector for outputting a separation detection signal at the time the molten lump at the tip of the wire electrode separates according to the arc length signal. The arc length setting device sets the simulation arc length waveform in each welding process after the separation of the molten lump synchronously with the output signal of the separation detector. The simulation arc length waveform is compared with the set arc length value in the comparator and the reference welding current waveform is corrected in the computing element according to the difference signal produced after the comparison so as to form and output the welding current. While the arc length in line with the simulation arc length waveform set after the separation of the molten lump is maintained, arc welding can be carried out with stability.

According to an eleventh aspect in the invention, a pulsed arc welding apparatus includes, in addition to those recited in the sixth and seventh aspects in the invention, a short-circuit interval detector for detecting the short-circuit between the workpieces and the molten lump at the tip of the wire electrode so as to output the short-circuit interval signal, and a computing element for operating only when no short-circuit interval signal is output so as to control the operation of correcting the reference welding current waveform when the short-circuit interval signal is output. The correction of the reference welding current waveform in the computing element according to the difference signal is restricted while the short-circuit interval signal is output with the effect of suppressing the generation of an excessive welding current.

According to a twelfth aspect in the invention, a pulsed arc welding apparatus for welding workpieces by transferring the molten lump grown at the tip of a welding wire electrode to a welding zone with the heat generated by the welding current supplied between the welding wire fed to workpieces and the workpieces, comprises an arc length detector for outputting an arc length signal corresponding to the change of the arc length between the tip of the wire electrode and the workpieces, a mean arc length converter for outputting a mean arc length signal according to the arc length signal, a target arc length setting device for setting a target arc length, a comparator for outputting a difference signal between the mean arc length and the target arc length, a current group output unit for periodically outputting a plurality of pulse trains (the waveform of the group of pulsating currents), a charge amount setting device for setting the charge amount of the group of pulsating currents including the pulsed or base current during the period, and a control unit for suspending the supply of the group of pulsating currents when the output from the set charge amount setting device and the charge amount of the group of pulsating currents to be output reach a predetermined value. According to a thirteenth aspect in the invention, the mean arc length converter according to the twelfth aspect in the invention is replaced with a sampling arc length converter for extracting and sampling an arc length signal at particular time and the target arc length setting device is replaced with a target sampling arc length setting device. According to these twelfth and thirteenth aspects in the invention, the width of the group of pulses constituting the arc current is corrected in accordance with the difference between the arc length preset by the target arc length detector and what is based on the true arc length detected by the arc length detector so as to control the charge amount of the arc current. The melting amount of the molten lump at the tip of the wire electrode therefore methodically grows in each welding process. As a result, the mean arc length can be so controlled that it is made constant and hence the amount of the reinforcement of weld and the depth of weld penetration of the welding bead are free from variations. Arc welding of good quality is thus effectively carried out.

According to a fourteenth aspect in the invention, moreover, a short-circuit transfer type pulsed arc welding apparatus includes, in addition to those recited in the twelfth and thirteenth aspects in the invention, a means for detecting a short-circuit interval, a means for deciding an arc interval by means of the short-circuit interval, and a means for restricting the arc current during the arc interval when the charge amount during the arc interval and the set charge amount reach a predetermined value. The mean arc length can thus be controlled so as to make it constant during the arc interval even in short-circuit transfer arc welding. Consequently, the short-circuit and the arc interval are made constant and welding can be carried out with the repetition of the arc with the effect of making the amount of the reinforcement of weld and the depth of weld penetration of the welding bead free from variations. Arc welding of good quality is thus effectively carried out.

According to a fifteenth aspect in the invention, a pulsed arc welding apparatus includes, in addition to those recited in the fourteenth aspect in the invention, a pulsating current group output holding means for outputting the high level output of the group of pulsating currents and delivering the output thereof to the control unit for supplying the group of pulsating currents until a signal for deciding the charge amount of the group of pulsating currents to be constant is delivered from the control unit therefor. According to a sixteenth aspect in the invention, the mean arc length converter according to the twelfth aspect in the invention is replaced with a sampling arc length converter for extracting and sampling an arc length signal at specific time, and the target arc length setting device is replaced with a target sampling arc length setting device. According to the twelfth and thirteenth aspects in the invention, the width of the group of pulses constituting the arc current is extended in accordance with the difference between the arc length preset by the target arc length detector and what is based on the true arc length detected by the arc length detector so as to increase the charge amount of the arc length. The melting amount of the molten lump at the tip of the wire electrode therefore methodically grows in each welding process. As a result, the mean arc length can be so controlled that it is made constant without relying on the current and hence the depth of weld penetration of the welding bead is prevented from varying. Even if the welding mean current is varied as the thickness of the workpiece varies, welding can be effected with a preset constant arc length. Arc welding of good quality is thus effectively carried out.

According to a seventeenth aspect in the invention, the pulse group period setting device according to the sixteenth aspect in the invention is replaced with a short-circuit release signal output device. Moreover, a means for detecting the short-circuit interval, a means for deciding the arc interval by means of the short-circuit interval, a signal output support means for applying the output directive signal of the group of pulsating currents to a pulse group output unit after the short-circuit interval is released are provided to constitute a short-circuit transfer type welding apparatus. The mean arc length at the arc interval can be so controlled as to make it constant even in the short-circuit transfer arc welding. As a result, the short-circuit and the arc interval can be made constant and since welding can be effected by methodically repeating the short-circuiting and arcing, the depth of weld penetration of the welding bead is prevented from varying. Arc welding of good quality is thus effectively carried out.

According to an eighteenth aspect in the invention, a pulsed arc welding apparatus for welding workpieces by transferring the molten lump grown at the tip of a welding wire electrode to a welding zone with the heat generated by the welding current supplied between the welding wire fed to workpieces and the workpieces, a pulse waveform setting device for setting the waveform of a pulsating current forming a welding current so as to output the pulsating current, and a pulsating current supply control unit for setting the charge amount of the pulsating current supplied according to the difference signal, for comparing the set charge amount with the charge amount of the pulsating current output from the pulsating current waveform setting device so as to stop the supply of the pulsating current when the charge amount of the output pulsating current reaches the set charge amount. The melting amount of the molten lump at the tip of the wire electrode thus grows methodically in each welding process. As a result, the mean arc length is made constant so as to allow welding with stability. Arc welding of good quality can thus offered.

According to a nineteenth aspect in the invention, the pulsating current group output unit according to the twelfth aspect in the invention is provided with the additional function of determining the peak value of the group of pulsating currents corresponding setting and periodically outputting the waveform of the group of pulsating currents having the peak value. According to a twentieth aspect in the invention, the mean arc length converter according to the sixteenth aspect in the invention is replaced with a sampling arc length converter for extracting and sampling an arc length signal at specific time, and the target arc length setting device is replaced with a target sampling arc length setting device. With this arrangement, the heat input supplied from the welding power supply varies as the arc load varies because of the variation (disturbance) of the projected length (Ex) when the true arc length shown by the arc length signal varies from the target arc length preset by the target arc length setting device. According to the decision made on the fact that the arc length has been prolonged, the peak value of the group of pulsating currents is corrected by the variation of the arc and simultaneously, the pulse group width of the group of pulsating currents is also corrected in the pulsating current supply control unit, whereby the supply charge amount of the pulsed arc current is controlled. For this reason, the arc current is so controlled that the heat input supplied from the welding power supply is suppressed in accordance with the variation of the arc load so that the arc length is approximated to the target arc length and therefore made constant. Consequently, the amount of the reinforcement of weld and the depth of weld penetration of the welding bead are prevented from varying. Arc welding bead of good quality is thus effectively carried out.

According to a twenty-first aspect in the invention, a pulsed arc welding apparatus additionally includes, in addition to those recited in the nineteenth aspect in the invention, a means for detecting the short-circuit interval, a means for deciding the art interval using the short-circuit means, and a means for restricting the arc current at the arc interval when the charge amount at the arc interval and the set charge amount reaches a substantially constant value. The mean arc length at the arc interval is accordingly so controlled as to make it constant even in short-circuit transfer arc welding and consequently the short-circuiting and arcing are also made constant. Since welding is effected with the repetition of methodical short-circuiting and arcing, the amount of the penetration of weld and the depth of weld penetration of the welding bead are prevented from varying. Arc welding of good quality is thus effectively carried out.

BRIEF DESCRIPTION OF THE DRAWINGS

FIG. 6(a) is a diagram illustrating classified welding functions.

FIG. 6(b) is an arc length waveform chart.

FIG. 6(c) is a simulation current waveform chart.

FIG. 6(d) is an output timing chart of a current waveform period signal $C_B$.

FIGS. 11(a)-11(c) are a waveform chart explanatory of the operation of the arc length setting device.

FIGS. 23(a)-23(d) are a waveform chart explanatory of the operation of the apparatus embodying the invention.

FIGS. 27(a)-27(c) are a waveform chart explanatory of the operation of the short-circuit interval detector.

FIGS. 30(a)-30(e) are a signal waveform chart explanatory of the operation of the apparatus embodying the twelfth aspect in the invention.

FIGS. 30(f)-30(j) are a signal waveform chart explanatory of the operation of the apparatus embodying the thirteenth aspect in the invention.

FIGS. 35(a)-35(3) are a signal waveform chart explanatory of the operation of the other apparatus embodying the fifteenth aspect in the invention.

FIGS. 38(a)-38(e) are a signal waveform chart explanatory of the operation of the apparatus embodying the seventeenth aspect in the invention.

FIGS. 40(a)-40(e) are a signal waveform chart explanatory of the operation of the apparatus embodying the present invention.

PREFERRED EMBODIMENT FOR PRACTICING THE INVENTION

Figure 1:
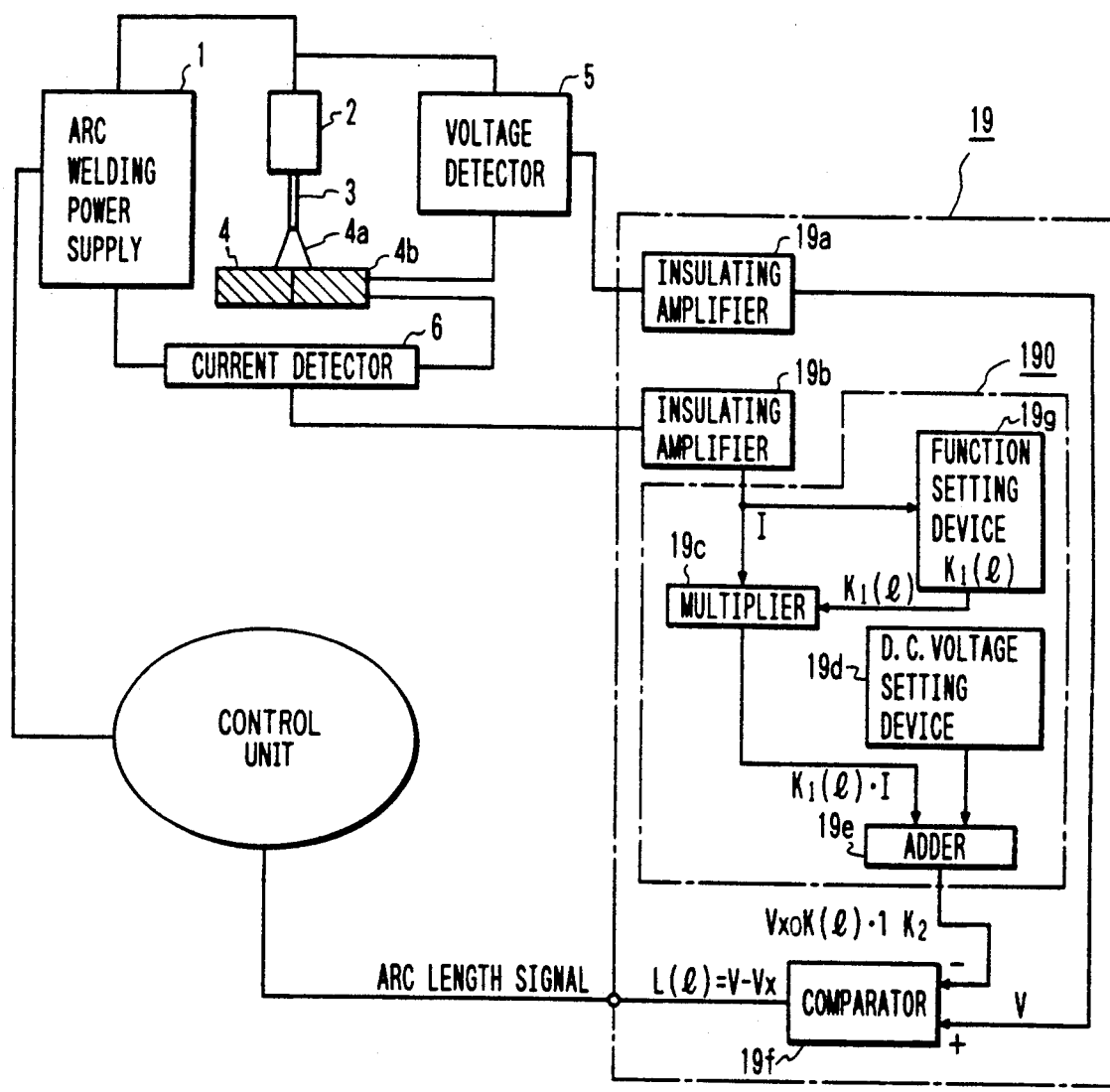
FIG. 1 is a block diagram of a pulsed arc welding apparatus embodying a first aspect in the invention.

FIG. 1 is an overall block diagram of a pulsed arc welding apparatus embodying a first aspect in the invention. In FIG. 1, the apparatus comprises an arc welding power supply 1 for supplying an arc current to a wire electrode 3, a welding torch 2 for supporting the wire electrode 3, an arc 4a being generated between the wire electrode 3 and workpieces 4b (parent metal), a voltage detector 5 for detecting the arc voltage V generated between the wire electrode 3 and the workpieces 4b, a current detector 6 for detecting the arc current, and an arc length detector 19 for detecting the actual arc length and outputting a signal corresponding to the value detected. The arc length detector 19 comprises an insulating amplifier 19a for amplifying the arc voltage detected by the voltage detector 5, an insulating amplifier 19b for amplifying the arc current detected by the current detector 6, a function setting device 19g for receiving the arc current I and outputting a function setting value $K_1(I)$, a multiplier 19c for converting the arc current I into arc voltage variations conforming to arc voltage-current characteristics with a reference arc length as a parameter so that the variations are plotted in an arc voltage-current characteristic diagram of FIG. 2(a), a d.c. voltage constant setting device 19d for multiplying a reference arc voltage by an offset voltage, an adder 19e for adding the offset voltage to the arc voltage value to obtain the reference arc voltage Vx, a comparator 19f for comparing the reference arc voltage with the detected arc voltage and outputting an arc length signal corresponding the actual arc length, and a reference arc voltage setting device 190 for simulating the reference arc voltage.

With this arrangement, the operation of the apparatus will subsequently be described with reference to the arc voltage characteristic diagram of FIG. 2(a).

FIG. 2(b) is a circuit diagram of the reference arc voltage setting device 190 with operational amplifiers 140a, 140b, a volume 140c, and circuit resistors $R_A$, $R_B$, $R_C$, $R_D$, $R_E$.

While the operation is described, in order that the arc voltage V detected by the voltage detector 5, which employs an arc length as a parameter, may vary while depicting definite functions as the arc current varies, the arc voltage V is represented, based on experimental data, as follows; $V=R(I)\cdot I + Al + B$ ($R(I)$: characteristic constant of the arc for allowing the arc voltage to obtain the characteristics shown in FIG. 2(a) when the arc current I is caused to flow, I: arc current, A: proportional constant with respect to the arc length, l: arc length, B: minimum voltage for maintaining arc discharge when the arc length l is assumed 0 mm; and $Al+B=V_l$ (maintenance arc voltage) with each arc length as l). Vo is the no-load voltage of the arc welding power supply at Vo in FIG. 2(a) and the arc voltage is so characterized as to rise from the maintenance arc voltage VI as shown therein when an arc is generated.

The arc voltage V is set as described above. The arc current I detected by the current detector 6 via the insulating amplifier 19b is multiplied by a function $(k_1(I))$ relying on current in the multiplier 19c. The function is set in such a way that the inclination lowers as the wire diameter increases or in the case of a $CO_2$.—Ar mixed gas, the Ar component increases. (In this case, the function $(k_1(I))$ is also set in accordance with the characteristic constant $(R(I))$ of the arc). The output $(k_1(I))$ from the multiplier 19c that has multiplied the arc current I by the function $(k_1(I))$ is applied to the adder 19e. Since the adder 19e receives the voltage constant $(K_2)$ set by the d.c. voltage setting device 19d, the output (the reference arc voltage) becomes $V_x = k_1(I)\cdot I + k_2$. As a result, with the arc current I as a variable and with $k_1(I)$, $k_2$ as a constant, the characteristic diagram depicting the reference arc voltage Vx as an output conforms to what is shown in FIG. 2(a). The electric characteristics shown therein are such that, with a reference arc length of lo, the reference arc voltage Vx varies in conformity with the characteristic curve determined by the function $(k_1(I))$ with a d.c. voltage constant $(k_2)$ at a predetermined level with the arc current I variation. The reference characteristics of the arc voltage at the reference arc length lo are thereby obtained.

Figure 2:
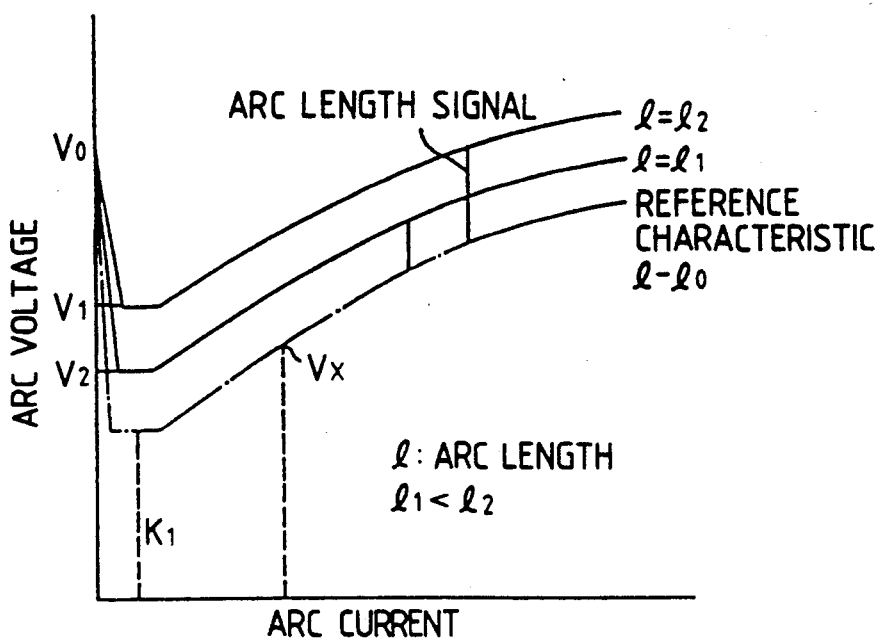
FIG. 2(a) is an arc voltage-current characteristic diagram pertaining to the apparatus embodying the invention.
FIG. 2(b) is a specific circuit diagram of a reference arc length setting device 14o.
Figure 2:
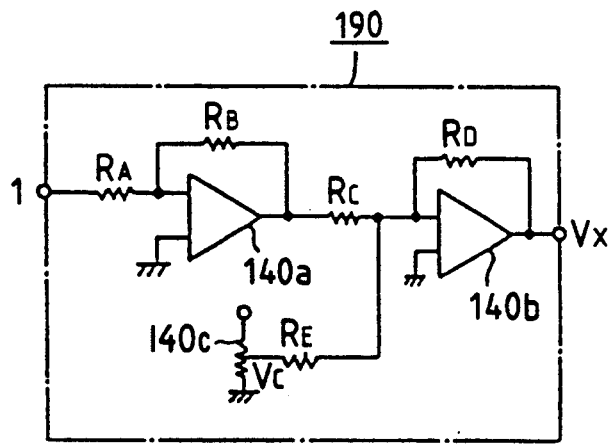

The reference arc voltage (Vx) thus sequentially set as the arc current I varies, together with the arc voltage V output from the voltage detector 6 via the insulating amplifier 19d, is applied to the comparator 19f and serves for the operation output of an arc length signal $(L(l))$ at the predetermined arc current value. $L(l)$ is expressed by the following equation: $L(l) = V - V_x = (R(I) - k_1(I))I + Al + B - k_2$. As $R(I)$ is approximately set to $k_1(I)$, $L(l)$ becomes approximately $(Al + B - k_2)$. If $k_2 = B$, V becomes approximately Al and V is substantially proportional to l. As a result, the arc length signal $L(l)$ with respect to the true arc length is obtained from Al which serves to set the detected voltage V since $(B-k_2)$ is constant. This arc length varies as the molten lump at the tip of the welding electrode grows, separates, shapes and short-circuits and the arc length periodically repeats as the growth-separation-shaping of the molten lump are repeated. The variation of the arc length is made clear by comparing the detected voltage value V with the reference arc voltage $V_x$. In the case of an arc length $l_1 > l_2$, for instance, the arc voltage V differs though the arc current value remains the same as shown in FIG. 2.

In this way, accurate welding control is made possible by obtaining the arc length signal which momentarily varies.

A description will subsequently be given of the operation of the reference arc voltage setting device 190 as a specific example.

In this circuit arrangement, the reference arc voltage $V_x$ substantially approximates to a primary function with respect to the current in the range of 40A-600A arc currents in terms of the characteristics of FIG. 2(a).

As shown in FIG. 2(b), the arc current I is multiplied by the primary function $R_B/R_A$ in the first stage operational amplifier 140a.

In the second stage operational amplifier 140b, moreover, $V_c$ set in the volume 140c and the multiplied signal $(R_B/R_A \cdot I)$ are added so that $Vx(R_D/R_C \cdot R_B/R_A)\cdot I + (R_D/R_E)\cdot V_C$ is output. In this way, $k_1$, $k_2$ shown in FIG. 2(a) can be simulated with the characteristics by selecting the values of the circuit resistances $R_A$ to $R_D$, and $V_x$ is obtained.

Although not shown, disturbances are introduced in the arc current and voltage detectors and the aforementioned noise is cut to prevent malfunction because of a noise signal. It is therefore natural to provide filters at the outputs of the current-voltage detectors and the arc length detector and to give various treatments against the disturbances in the computing element of the arc length detector 19.

Figure 3:
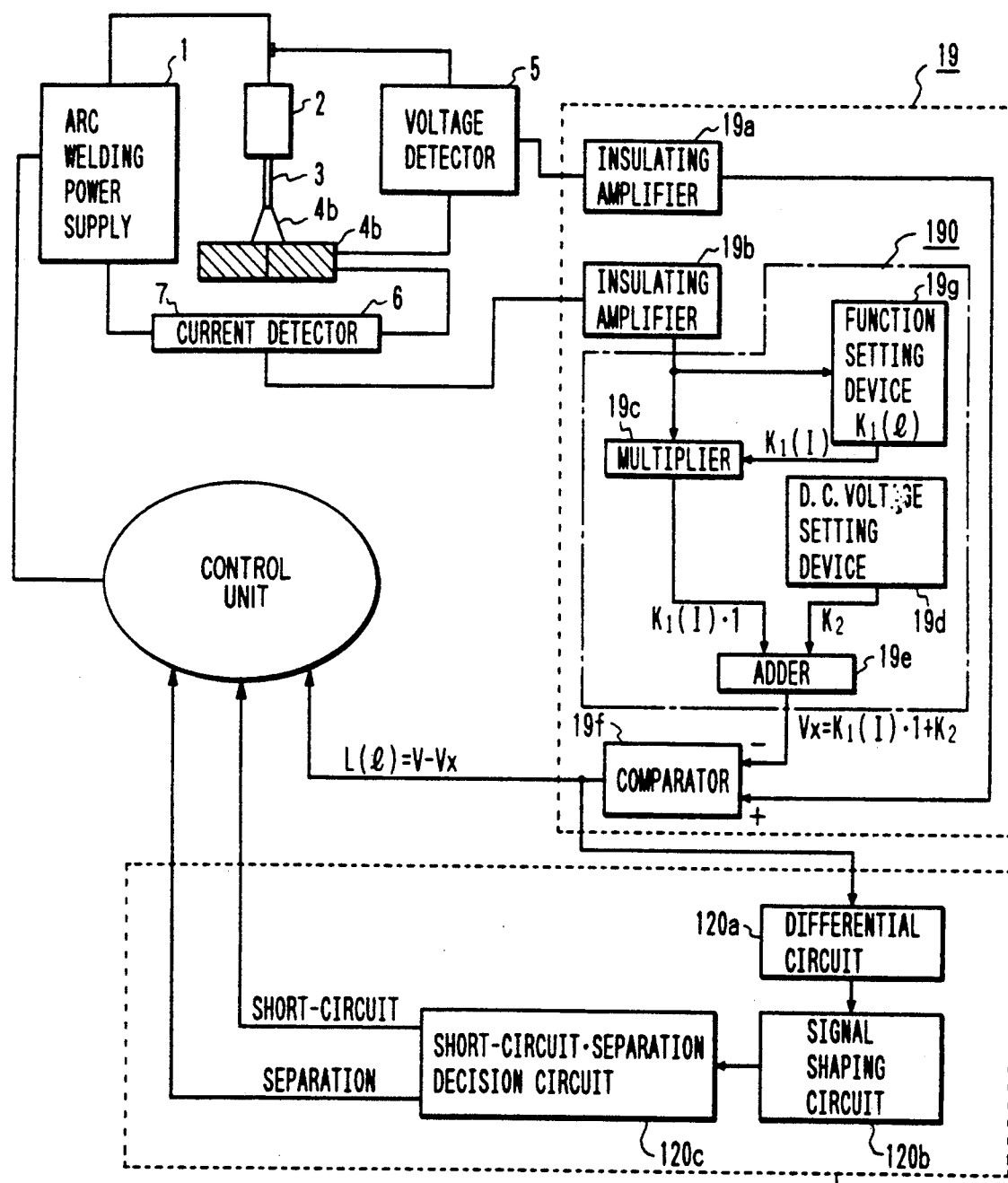
FIG. 3 is an overall block diagram of a pulsed arc welding apparatus embodying a second and a third aspects in the invention.

FIG. 3 is an overall block diagram of a pulsed arc welding apparatus embodying a second aspect in the invention. In FIG. 3, like reference characters designate like and corresponding component parts of FIG. 1 with the omission of the detailed description thereof. With respect to the operation of the arc length detector 19, it is similar to the operation of the arc length detector according to the first aspect in the invention.

In FIG. 3, a short-circuit-separation detector 120b comprises a differential circuit 120a for differentiating an arc length signal, a signal shaping circuit 120 for shaping a differential waveform, and a short-circuit-separation decision circuit for judging the short-circuit-separation of the molten lump from the shaped differential waveform.

With this arrangement, the operation of the this embodiment will be described. In this embodiment, the arc current to be supplied to the wire electrode 3 will be described as a group of pulsating currents shown in FIGS. 4(a), (b). As shown in FIGS. 4(a), (b), when a plurality of pulse means (a group of pulses) are superposed on the base current and this operation is periodically repeated to effect welding, the molten lump formed at the tip of the wire therefore separates (I) in the group of pulses and then the tip of the wire becomes melted by the arc to form (II) the molten lump. The formation-separation phenomena of the molten lump are repeated to effect welding. In addition, the short-circuit (III) between the molten lump formed at the tip of the wire and the workpieces may occur. In (b) and (c) of FIG. 4(a), the arc voltage waveform and the arc length signal during welding are shown.

A description will be given of the arc voltage waveform and the arc length signal when the formation-separation phenomena of the molten lump repeat and when the short-circuit phenomenon occurs. The arc voltage waveform of (a) of FIG. 3(a) varies in a pulsating form correspondingly to the pulsating current waveform and in accordance with the variation of the arc length. When the molten lump separates (I), the arc voltage waveform is continuous, whereas the arc voltage waveform remains discontinuous. In other words, though the arc voltage remains at 30 V before the molten lump separates, for instance, it will rise up to approximately 35 V in response to less than several μS when the molten lump becomes separated from the welding electrode 2. The arc voltage at 20 V before the molten lump short-circuits will drop to less than 2-3 V in response to less than several μS when the short-circuit between the molten lump and the workpieces occurs. As is obvious from the arc length signal waveform of (c) of FIG. 4(a), on the other hand, the variation of the arc length signal relies not on the pulsating current waveform but only on the true arc length l and it sharply rises when the molten lump starts separating. Although the arc length signal then rises as the molten lump grows, the short-circuit between the molten lump and the workpieces occurs in turn when the molten lump lowers simultaneously with the shortening of the arc length. The arc length becomes zero and consequently the arc length signal suddenly drops.

As set forth above, the arc length signal, for instance may be used to detect the sharp variation of the arc length signal or the separation-short-circuit time by comparing the predetermined level with the arc voltage. As shown in FIG. 4(a), (d)−(f) illustrate the separation-short-circuit detected from the sharp variation of the arc length signal. The arc voltage rises to approximately 35 V as the molten lump is detached from the wire electrode 3 when the arc length signal (L(l)) whose signal level varies as the welding time elapses is input to the differentiating circuit 120a, e.g., when the arc voltage V is at 30 V. In this case, the arc length signal rises without relying on the arc current in response to less than several μS. As a result, the differentiating circuit 120a outputs its forward-direction differential signal at the fusion-separation time as shown in (d) of FIG. 4(a). The differential signal is input to a short-circuit-separation decision circuit 120c after it has been shaped in a signal shaping circuit 120b. Since the signal thus input is a forward differential signal, the molten lump is judged separated and a separation signal is output as shown in (e) of FIG. 4(a).

In place of the detection of the rise of the arc length signal according to the first aspect in the invention, the drop of the arc length signal according to the third aspect in the invention is otherwise detected. Accordingly, in the third aspect in the invention, A1+B at the minimum maintenance arc voltage drops to less than 3 V at less than several μS where the short-circuit of the molten lump occurs when the d.c. current voltage constant (offset voltage) $k_2$ remains at approximately 10 V. Consequently, the arc length signal causes the voltage L(l) to approximately −7 V at a stretch as shown in (c) of FIG. 4(a) from its relationship to L(l)≃A1+B+$k_2$ and a differential signal is output in the negative direction at the short-circuit time. This differential signal is input to the short-circuit-separation decision circuit 120c after being shaped in the signal shaping circuit 120b. Since the signal thus received is a negatively-directed differential signal, the molten lump is decided to have been separated and a separation signal is output as shown in (f) of FIG. 4(a).

When the short-circuit is released, the arc voltage sharply rises again and the arc length signal also sharply rises. The molten lump is then decided to have short-circuited and separated and the separation signal is output as in the case of the third aspect in the invention. As shown in (d) of FIG. 4(a), the negatively-directed differential signal is output at the time of short-circuit of the molten lump when the arc length signal drops, whereas a positively-directed differential signal is output at the time of short-circuit-separation. The negatively-directed differential signal is input to the short-circuit-separation decision circuit 120c after being subjected to waveform shaping in the signal shaping circuit 120b and a short-circuit signal is output as shown in (f) of FIG. 4(a). As a result, the separation-short-circuit time can be made known precisely.

Since a point of time the arc length signal grows corresponds to the separation time of the molten lump as shown in (c) of FIG. 4(c), the arc length signal is compared with a reference signal A according to a fourth aspect in the invention. A signal is output at the time the arc length signal becomes greater than the reference signal A and the molten lump is decided to have separated when the signal is output and the separation signal is output as shown in (d) of FIG. 4(c). When the molten lump short-circuits, the minimum maintenance arc voltage drops by approximately 2-3 V. In this case, the arc length signal decreases up to approximately −7 V at a stretch from L(l)≃A1+B+$k_2$ if $k_2$ is set a approximately 10 V. As a point of time the arc length signal lessens corresponds to the short-circuit time of the molten lump and the workpiece, an arc length signal B is compared with a reference signal B and a signal is output when the arc length signal becomes smaller then the reference signal B according to the fifth aspect in the invention. The time at which this signal is output is decided to be the short-circuit time and the short-circuit signal is output as shown in (e) of FIG. 4(c).

The operation of the short-circuit-separation detector 120 according to the fourth and fifth aspects in the invention will subsequently be described with reference to a circuit diagram of FIG. 4(b).

When a welding start signal is applied to a welding start timer, the welding start timer 120d operates to cause a timer interval H signal to be applied to an analog switch 120f via an inversion buffer 120e. The welding start timer is thus actuated when welding is started and while the analog switch 120f remains in an off state during the start interval, the short-circuit-separation detector is not operated.

In this way, the separation signal is produced when vontage is applied from the welding power supply at the welding start time and therefore the analog switch is provided to remove the signal so as to prevent the short-circuit-separation detector from operating at the welding start time.

During welding, the arc length signal is applied to comparators 120i, 120j via the analog switch 120f. The arc length signal is compared with the reference signal A from a separation level setting device 120g in the comparator 120i, and the comparator 120i outputs a H signal if the arc length signal is greater than the reference signal A and an L signal if the arc length signal is otherwise smaller than the reference signal A.

The output signal of the comparator 120i is applied to a rise edge detector 120h, wherein a signal is output at the rise time at which the output signal of the comparator 120i changes from L to H so that the separation time is decided.

In the comparator 120j, on the other hand, the arc length signal is compared with the reference signal B from a short-circuit level setting device 120h, and the comparator 120j outputs a H signal if the arc length signal is smaller than the reference signal B and an L signal if the arc length signal is otherwise greater than the reference signal B. The output signal of the comparator 120j is applied to a rise edge detector 12l, wherein a signal is output at the rise time at which the output signal of the comparator 120j changes from L to H so that the short-circuit time is decided.

Figure 4:
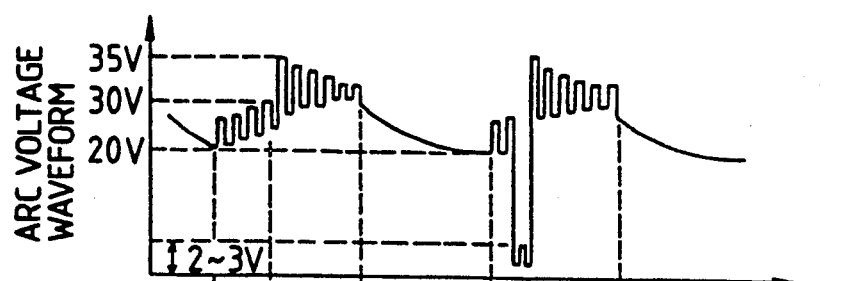
FIG. 4(a)-4(f) are a signal waveform chart explanatory of the operation of the apparatus embodying the invention.
FIG. 4(g) is a block diagram of a short-circuit-separation detector 12 embodying a fourth and a fifth aspects in the invention.
FIGS. 4(h)-4(l) are a signal waveform chart explanatory of the operation of the apparatus embodying the invention.
Figure 4:
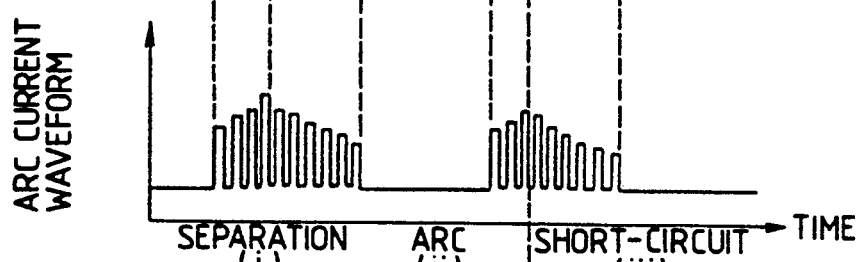
Figure 4:
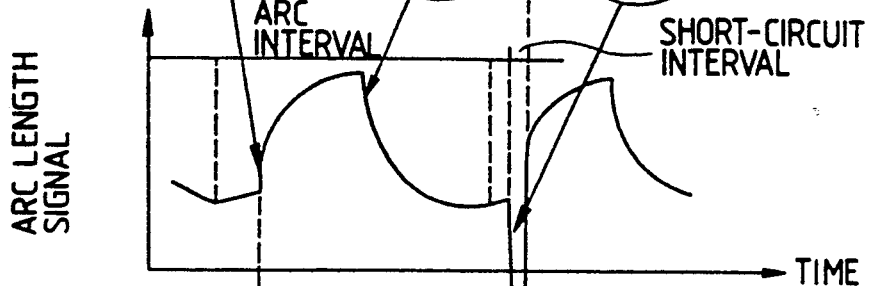
Figure 4:
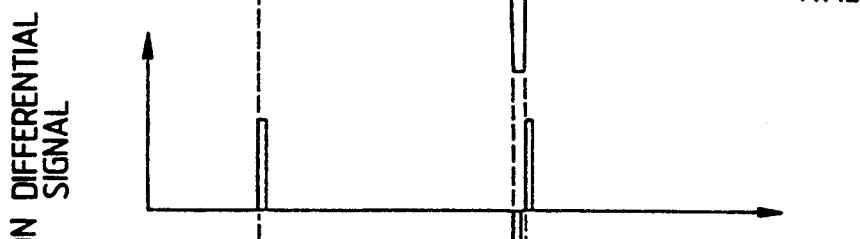
Figure 4:
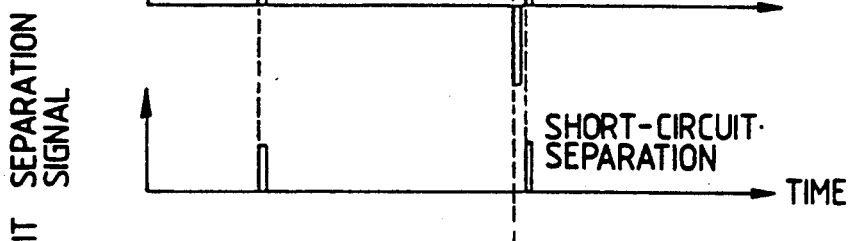
Figure 4:
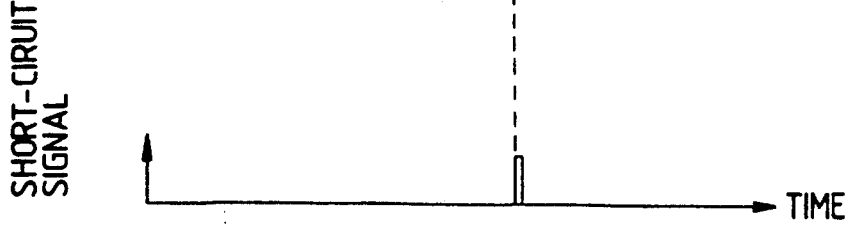
Figure 4G:
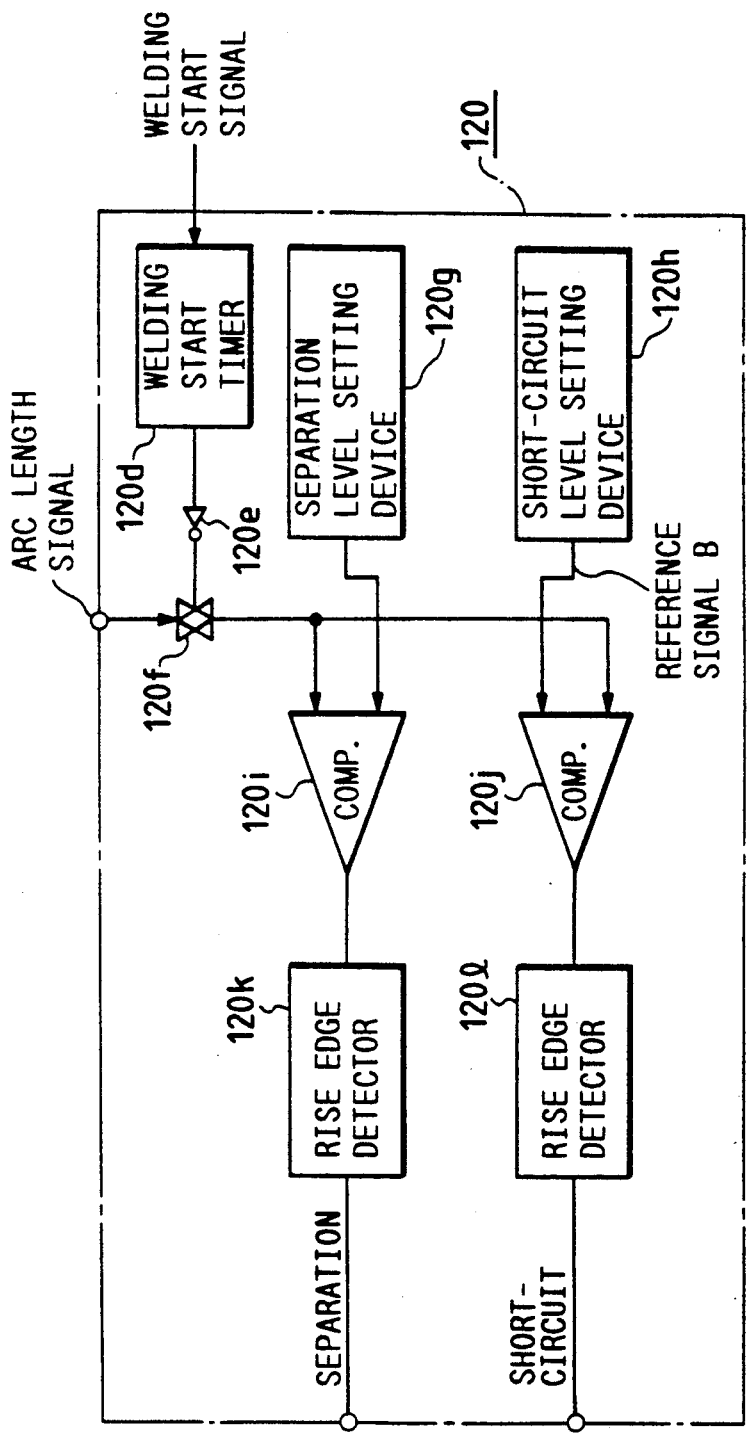

Although the short-circuit-separation detectors according to the second to fifth aspects in the invention are constituted as shown in FIGS. 1, 4(g), the short-circuit-separation detector 120 may malfunction because the noise caused by disturbances and the like is superposed on the arc length signal shown in (c) of FIG. 4(a) or (c) of FIG. 4(c) as an input signal. For this reason, measures are naturally taken against noise for the arc length signal as an input or the output from the short-circuit-separation detector 12 in actual products.

Figure 5:
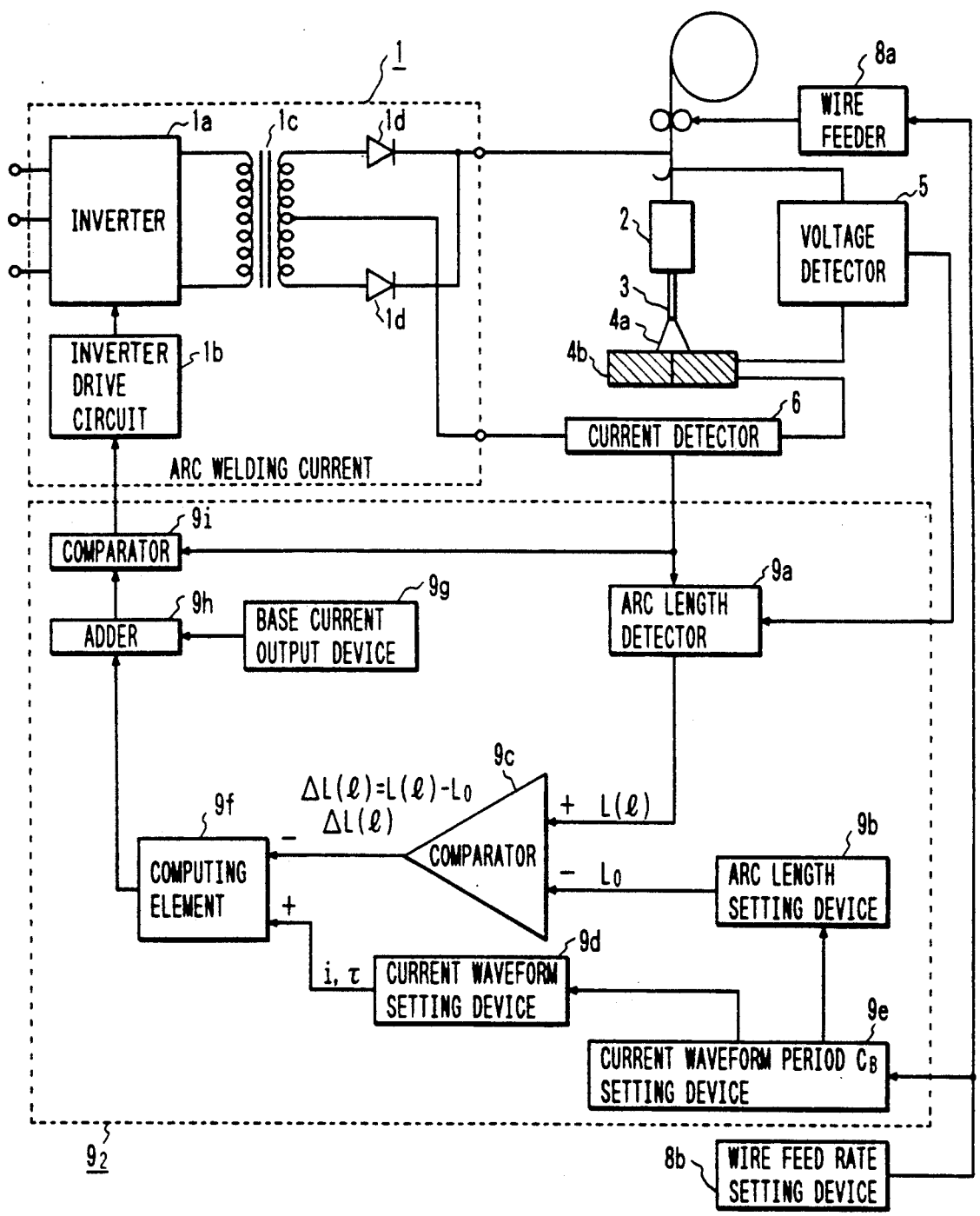
FIG. 5 is an overall block diagram of a pulsed arc welding apparatus embodying the second and the third aspects in the invention.

FIG. 5 is an overall block diagram of a pulsed arc welding apparatus according to a sixth aspect in the invention. As shown in FIG. 5, the welding apparatus comprises an arc welding power supply 1 for supplying the arc current composed of pulsating currents to a welder proper, the power supply comprising an invertor 1a for converting a three-phase a.c. voltage into a predetermined frequency so as to deliver the voltage converted to a transformer 1c, an invertor drive circuit 1b for driving the invertor circuit, and diodes 1d, 1d for rectifying the transformed output from the invertor to obtain the arc current composed of pulsating currents. The welding apparatus further comprises a welding torch 2, a welding wire electrode 3 (hereinafter simply called the wire electrode) to be fed by a feed roller from a wire reel toward workpieces 4b, an arc 4a being generated between the wire electrode 3 and the workpieces 4b, a voltage detector 5 for detecting an arc voltage, a current detector 6 for detecting the arc current, a wire feeder 8a for feeding the wire electrode 3 at the feed rate set by a wire feed rate setting device 8b, and a pulsating current waveform control circuit 101. The control circuit comprises an arc length detector 19 for detecting a true arc length which momentarily varies on the basis of the detected arc voltage and current so as to output an arc length signal L(l), an arc length setting device 9b for setting a simulation arc length waveform by simulating the arc length required in welding process as shown by a broken line of FIG. 6(b), a comparator A 10a for comparing the detected arc length value with the simulation arc length so as to output a difference signal $\Delta L(l)$, a current waveform setting device 110b for setting a simulation current waveform by simulating the reference waveform of a group of pulsating currents constituting the arc current as shown in FIG. 6(c), a current waveform period $C_B$ setting device 9e for setting the period of reading an arc length waveform Lo and a current waveform i in accordance with the wire feed rate, a computing element 10m for correcting the peak value or pulse width of the simulation current waveform by means of the difference signal $\Delta L(l)$ so as to output the arc current generated thereby, a base current output device 10i for outputting a base current to be superposed on the arc current produced, an adder 10h for superposing the base current, and a comparator B 10j for comparing the detected arc current value with the arc current supplied so as to control the on/off state of the invertor drive circuit in conformity with the result of comparison.

The arc length setting device 9b mentioned above comprises, as shown in FIG. 7, setting devices such as a cut interval setting device $9b_1$ for setting an interval during which the cut waveform in the simulation arc length waveform is output, a cut waveform setting device $9b_2$ for setting the cut waveform, a fusion interval setting device $9b_5$ for setting an interval during which a fusion waveform is output, a shaped waveform setting device $9b_9$ for setting a shaped waveform and the like, a waveform synthesizer $9b_{13}$ for synthesizing set waveforms in order thereof, so as to obtain a simulation arc length, analog switches $9b_3$, $9b_7$, $9b_{10}$ for controlling the supply of the respective set waveforms to the waveform synthesizer $9b_{13}$, invertor elements $9b_4$, $9b_8$, $9b_{12}$ for controlling the reading of the respective set waveforms, a flip-flop $9b_{11}$ and an AND gate $9b_{14}$ for setting a shaped waveform output interval on the basis of current waveform period $C_B$ signal output timing The operation of the welding apparatus thus constructed will subsequently be described. As shown in (a) of FIG. 10, the arc length increases during the process of melting the wire electrode by supplying the arc current and growing the molten lump, and the arc length gradually narrows in view of the wire feed rate at the interval during which the molten lump is shaped to reduce the melting volume by restricting the arc current to only the base current. The arc length again increases when the arc current is suddenly made to flow so as to separate the molten lump grown by means of the electromagnetic pinch force produced then at a point of time the molten lump has been shaped into a predetermined melting volume.

When the arc welding is actually carried out under normal conditions, the variation of the arc length is exhibited as stated above. By presetting the variation of the arc length as the simulation arc length waveform and controlling the arc current supply to maintain the simulation arc length waveform, stable arc welding with an excellent welding bead can be effected.

Figure 7:
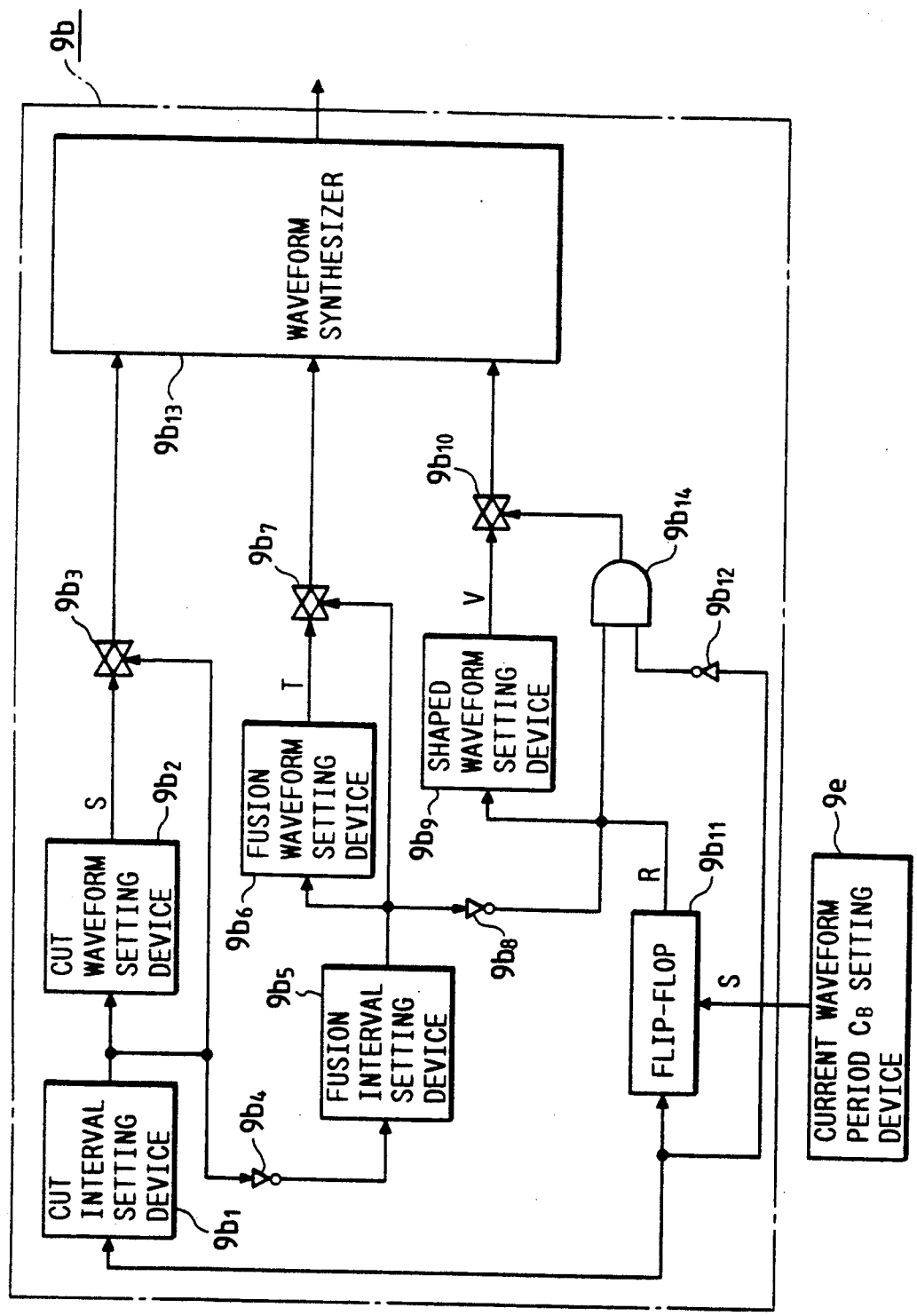
FIG. 7 is an internal block diagram of the arc length setting device.

For that purpose, the simulation arc length waveform shown by a broken line of FIG. 6(b) is first synthesized at a point of time the current waveform period signal (hereinafter simply called the period signal) $C_B$ set in proportion to the wire feed rate is applied from the current waveform period $C_B$ setting device 10j the arc length setting device 9b. As for the arc length waveform synthesization, as shown in FIG. 7, an ON signal at 'H' level is applied from the flip-lop $9b_{11}$ to the cut interval setting device $9b_1$ arranged with a timer circuit when the period signal $C_B$ is applied to the SET terminal of the flip-flop $9b_{11}$ and the ON signal at 'H' level is applied to the cut waveform setting device $9b_2$ arranged with a wave memory and to the analog switch $9b_3$ by an interval corresponding to the cut interval. As a result, cut waveform data (S in (b) of FIG. 6) is supplied from the cut waveform setting device $9b_2$ via the analog switch $9b_3$ to the waveform synthesizer $9b_{13}$. Subsequently, when the level of the ON signal output from the cut interval setting device $9b_1$ changes to 'L' level, the output from the invertor element $9b_4$ is inverted to have 'H' level and to become the ON signal of the fusion interval setting device $9b_5$. Consequently, the ON signal at 'H' level is applied to the fusion waveform setting device $9b_6$ and the analog switch $9b_7$ by an interval corresponding to the fusion interval. Fusion waveform data (T in (b) of FIG. 6) is supplied via the analog switch $9b_7$ to the waveform synthesizer $9b_{13}$. When the level of the ON signal changes to 'L' level upon the termination of the fusion interval, the output from the invertor element $9b_8$ is inverted to have 'H' level and supplied to the reset terminal of the flip-flop $9b_{11}$, one of the inputs of the AND gate $9b_{14}$ and the shaped waveform setting device $9b_9$. The output from the flip-flop $9b_{11}$ is then inverted to have 'L' level before being supplied to the invertor element $9b_{12}$ connected to the other input of the AND gate $9b_{14}$. The AND gate $9b_{14}$, which has resumed its ON state, turns on the analog switch $9b_{10}$ and supplies waveform shaping data (V in (b) of FIG. 6) to the waveform synthesizer $9b_{13}$ to start the synthesization of the simulation arc length waveform. When the period signal $C_B$ is subsequently applied to the SET terminal of the flip-flop $9b_{11}$, the output from the flip-flop $9b_{11}$ is inverted to have 'H' level before being applied to the invertor element $9b_{12}$. The AND gate $9b_{14}$ is then turned off and the analog switch $9b_{10}$ is also turned off, so that the output of the waveform shaping data is suspended. As the output from the flip-flop $9b_{11}$ is supplied to the cut interval setting device $9b_1$ accordingly, the cut waveform data is read again. Consequently, the simulation arc length waveforms at the time of fusion, shaping and cutting are synthesized each time of applying the period signal $C_B$.

When the simulation arc length waveform is set as described above, the comparator A $10a$ compares the signal level Lo of the arc length waveform with the true arc length L(l) (the portion (b) of FIG. 6 indicated by a continuous line) detected by the arc length detector and computes the difference signal ($\Delta L(l) = L(l) - Lo$). The difference signal $\Delta L(l)$, together with the simulation current waveform ((c) of FIG. 6) read from the current waveform setting device $9d$ simultaneously with the period signal $C_B$ output, is applied to the computing element where the peak value i of the pulsating current waveform signal is corrected by means of a relational expression $i = i - A \cdot L(l)$. The pulse width $\tau$ of the pulsating current waveform signal is otherwise corrected by means of a relational expression $\tau = \tau - B \cdot \Delta L(l)$. The pulsating current waveform signal is corrected as the arc length varies so that welding can be carried out while the preset simulation arc length is held in each welding process, whereas the welding current is obtained so as to correct the variation of the arc length. Further, the base current produced by the base current output device $10i$ and used for preventing an out-of-arc condition is superposed on the welding current in the adder $9h$ and the combination is supplied to the comparator $10j$. The arc current value detected by the current detector 6 is compared with a reference arc current value in the comparator B $10j$, and if (the detected arc current value) < (the reference arc current value), the ON signal is applied to the invertor drive circuit 16, and then a pulsed arc current output from the arc welding power supply 1 is supplied between the wire electrode 3 and the workpieces $4b$. On the other hand, the operation-off signal is applied to the invertor drive circuit $1b$ (while the detected arc current value) > (the reference arc current value).

The operation of the arc length detection circuit 19 is similar to what has been described in the first aspect in the invention.

Although a description has been given of the periodic repetition of the plurality of pulse groups (pulse trains) in the embodiment shown, the difference signal $\Delta L$ obtained by comparing the preset simulation arc length in the arc length setting device with the actual arc length detected by the arc length detector may be used to correct the instantaneous current i having a single pulse waveform to $i = i - D \cdot \Delta L$ in effecting welding by periodically repeating the signal pulse. Moreover, the short-circuit transfer arc welding apparatus for effecting welding by repeating the short-circuit and the arc may replace the pulsed arc welding apparatus in the embodiment shown. In this case, the arc length detector operates only during the arc interval and the comparison between the arc length during the arc interval and the simulation arc length is utilized to correct the instantaneous current i at the arc interval to $i = i - D \cdot \Delta L$ according to the difference signal $\Delta L$, whereby the same effect in the embodiment shown is achieved.

Figure 8:
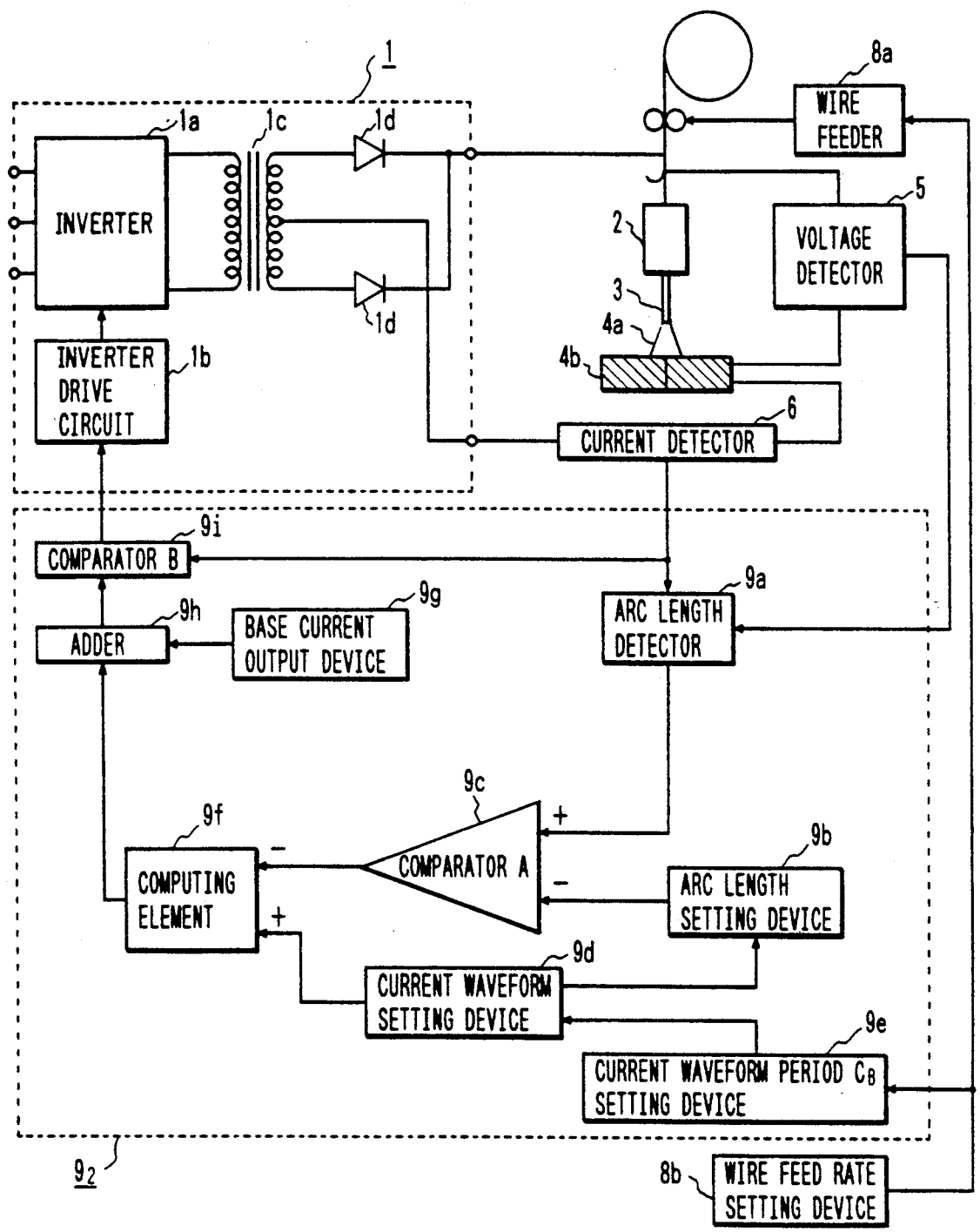
FIG. 8 is an overall block diagram of a pulsed arc welding apparatus embodying a seventh aspect in the invention.

FIG. 8 is an overall block diagram of a pulsed arc welding apparatus embodying a seventh aspect in the invention. In FIG. 8, like reference characters designate like or corresponding parts of FIG. 5 with the omission of the detailed description thereof. The pulsating current waveform control circuit $10_2$ this embodiment comprises the arc length detector $9a$ for detecting the true arc length which momentarily varies on the basis of the detected arc voltage and current so as to output the arc length signal L(l), the arc length setting device $9b$ for setting a simulation arc length waveform by simulating the arc length required in welding process as shown by a broken line of FIG. 10(b) in line with a reference welding current as described later, the comparator A $10a$ comparing the detected arc length value with the simulation arc length so as to output the difference signal $\Delta L(l)$, the current waveform setting device $110b$ for setting a simulation current waveform by simulating the reference waveform of the group of pulsating currents constituting the arc current as shown in (a) of FIG. 11, the current waveform period $C_B$ setting device $10f$ for setting the period of reading the arc length waveform Lo and the current waveform i in accordance with the wire feed rate, the computing element $10m$ for correcting the peak value or pulse width of the simulation current waveform by means of the difference signal $\Delta L(l)$ so as to output the arc current generated thereby, the base current output device $10i$ for outputting the base current to be superposed on the arc current produced, the adder $10h$ for superposing the base current, and the comparator B $10j$ for comparing the detected arc current value with the arc current supplied so as to control the on/off state of the invertor drive circuit $1b$ in conformity with the result of comparison.

Figure 9:
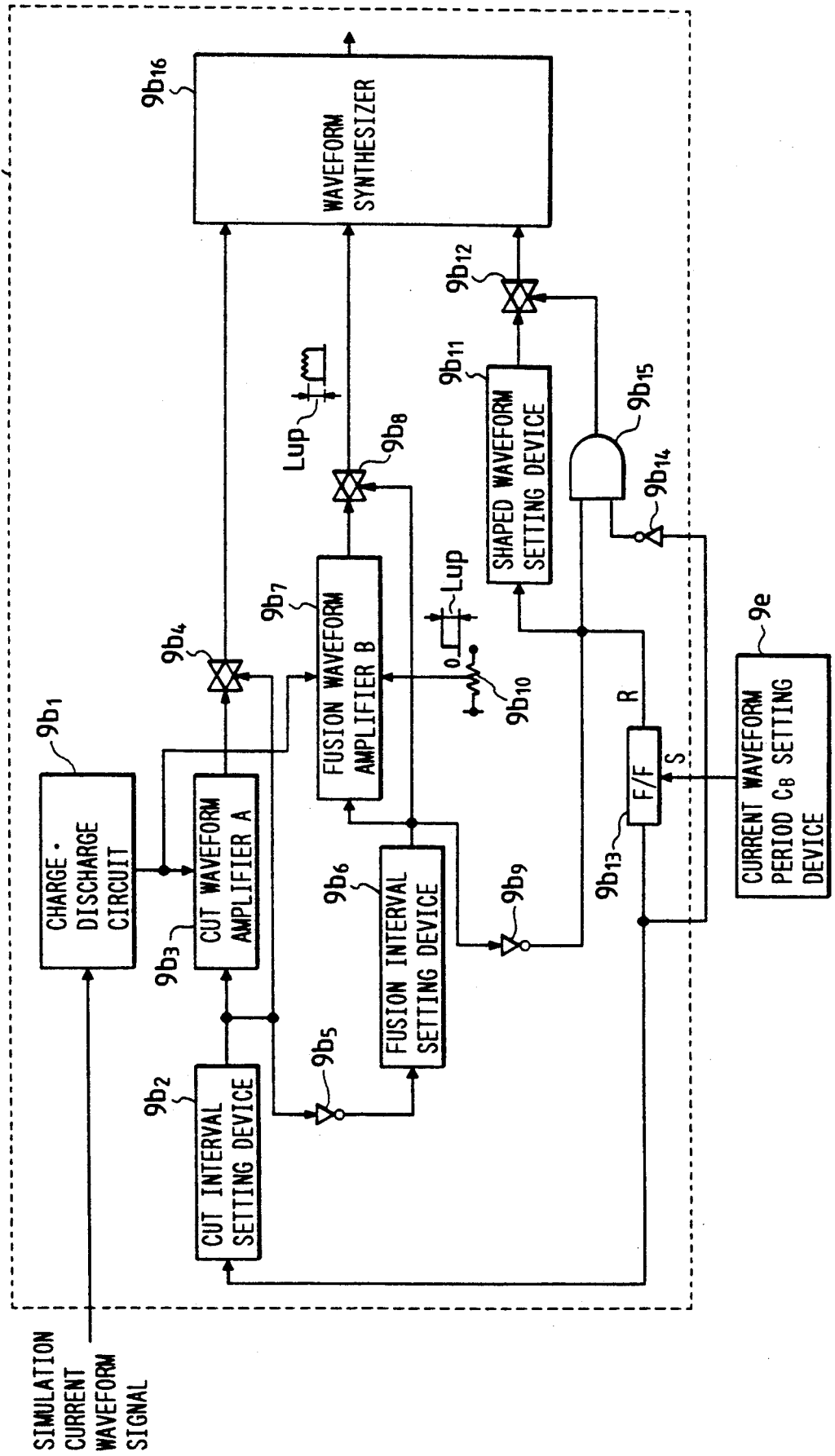
FIG. 9 is a block diagram of the interior of the arc length setting device.

The arc length setting device $9b$ mentioned above comprises, as shown in FIG. 9, setting devices such as a charge-discharge circuit $9b_{15}$ smoothing a simulation current waveform signal ((a) of FIG. 11) to obtain an arc length signal S(i) as shown in (b) of FIG. 11, a cut interval setting device $9b_1$ for setting an interval during which the cut waveform in the simulation arc length waveform is output, a cut waveform amplifier $9b_2$ for amplifying the arc length signal in the cut process, a fusion interval setting device $9b_5$ for setting an interval during which a fusion waveform is output, a fusion waveform amplifier $9b_6$ for amplifying the arc length signal in the fusion process, and a shaped waveform setting device $9b_9$ for setting a shaped waveform and the like, a waveform synthesizer $9b_{16}$ for synthesizing set waveforms in order thereof, so as to obtain a simulation arc length, analog switches $9b_3$, $9b_7$, $9b_{10}$ for controlling the supply of the respective set waveforms to the waveform synthesizer $9b_{13}$ invertor elements $9b_4$, $9b_8$, $9b_{12}$ for controlling the reading of the respective set waveforms, a flip-flop $9b_{11}$ and an AND gate $9b_{14}$ for setting a shaped waveform output interval on the basis of current waveform period $C_B$ signal output timing.

Figure 10A:
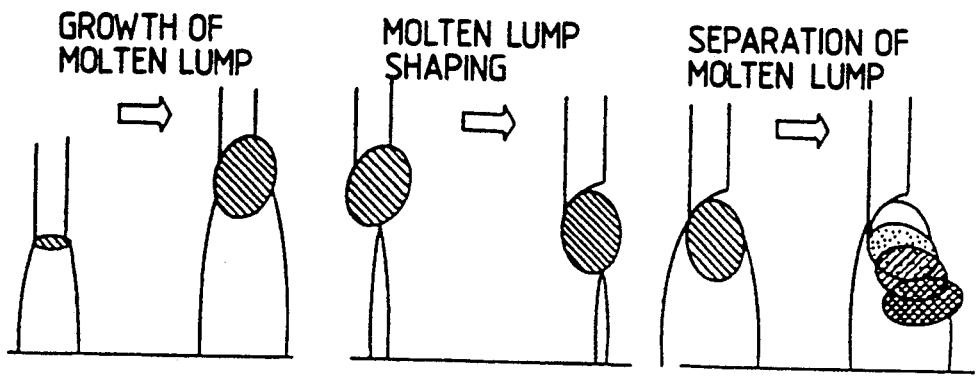
FIG. 10(a) is a diagram illustrating classified welding functions.

The operation of the welding apparatus thus constructed will subsequently be described as follows. As shown in FIG. 10(a), the arc length increases during the process of melting the wire electrode by supplying the arc current and growing the molten lump, and gradually narrows in view of the balance between the wire feed rate and the growth of the molten lump of the wire electrode resulting from the arc current, at the interval during which the molten lump is shaped to reduce the melting volume by restricting the arc current. At a point of time the molten lump is shaped and the arc length shortens, a large arc current is made to flow so as to separate the molten lump grown by means of the electromagnetic pinch force produced then because of the large arc current. The arc length again increases when the molten lump is separated and then the growth-shaping-fusion of the molten lump are repeated.

When arc welding is actually carried out under normal conditions, the variation of the arc length is exhibited as stated above. By presetting the variation of the arc length as the simulation arc length waveform and controlling the arc current supply to maintain the simulation arc length waveform, stable arc welding with an excellent welding bead can be performed.

Figure 10B:
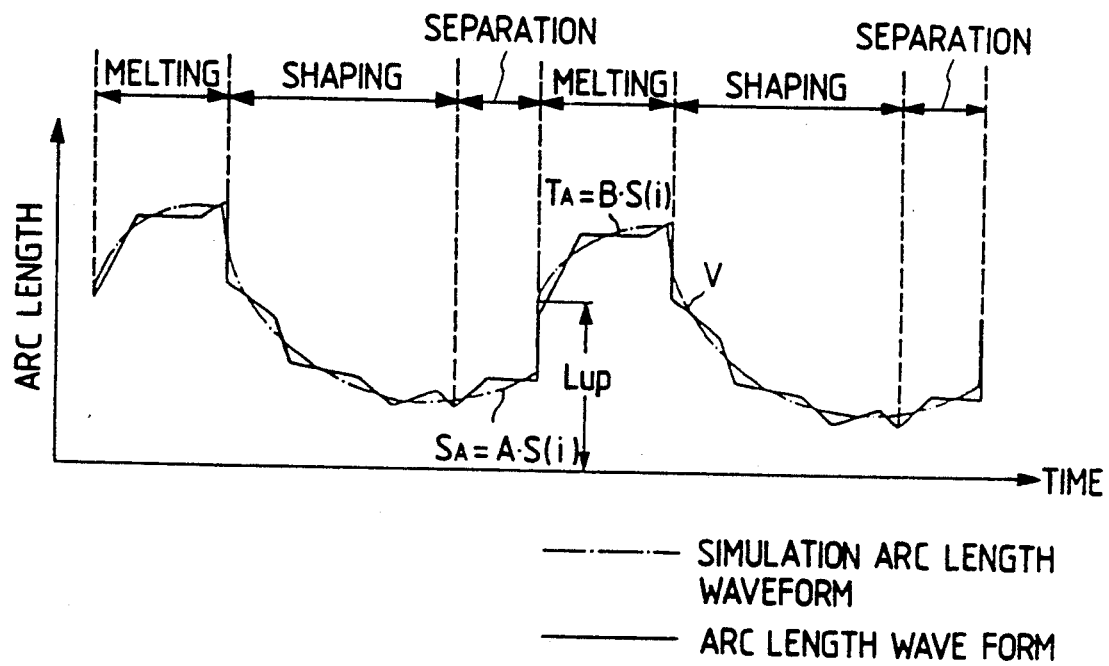
FIG. 10(b) is an arc length waveform chart.

For that purpose, the current waveform period signal (hereinafter simply called the period signal) $C_B$ set in proportion to the wire feed rate is synchronized at a point of time the signal is applied by the current waveform period $C_B$ setting device 10f to the current waveform setting device 110b and the simulation arc length waveform shown by a broken line of FIG. 10(b) is first formed by the arc length setting device 9b. When the simulation arc length waveform is formed, the arc length setting device 9b applies the simulation current waveform signal composed the group of pulsating currents set by the current waveform setting device 9d to the charge-discharge circuit and smooths the signal so as to form the simulation arc length waveform signal.

The arc length setting device 9b first applies the simulation current waveform signal ((a) of FIG. 11) set by the current waveform setting device 9d to the charge-discharge circuit $9b_{15}$. As a result, the group of pulsating currents constituting the simulation current waveform signal are smoothed as shown in (c) of FIG. 11 to become the arc length signal S(i). The arc length signal in the cut process is applied to the cut waveform amplifier $9b_2$ to set its signal level at $S_A$ (=A·S(i) where A=amplification gain) and the arc length signal in the fusion process is applied to the fusion waveform amplifier $9b_6$ set its signal level at $T_A$ (=B·S(i) where B=amplification gain). Then a signal level setting device $9b_{16}$ operated to raise the signal level by a level C. When the period signal $C_B$ is applied to the SET terminal of the flip-flop $9b_{11}$ after each signal level is raised in this manner, an ON signal at 'H' level is applied from the flip-flop $9b_{11}$ to the cut interval setting device $9b_1$ arranged with a timer circuit and the ON signal at 'H' level is applied to the cut waveform amplifier $9b_2$ and the analog switch $9b_3$ for a period of time corresponding to the cut interval. As a result, cut waveform data ($S_A$ in (c) of FIG. 11) is supplied from the cut wave amplifier $9b_2$ via the analog switch $9b_3$ to the waveform synthesizer $9b_{13}$. Subsequently, when the level of the ON signal delivered from the cut interval setting device $9b_1$ changes to 'L', the output from the invertor element $9b_4$ is inverted to have 'H' level to become the ON signal of the fusion interval setting device $9b_5$. The ON signal at 'H' level is applied to the fusion waveform amplifier $9b_6$ and analog switch $9b_7$ for a period of time corresponding to the fusion interval and fusion waveform data ($T_A$ in (c) of FIG. 11) is supplied via the analog switch $9b_{13}$ the waveform synthesizer $9b_{13}$. When the level of the ON signal changes to 'L' upon the termination of the fusion interval, moreover, the output from the invertor element $9b_8$ is inverted to have 'H' level and applied to the reset terminal of the flip-flop $9b_{11}$, one of the inputs of the AND gate $9b_{14}$ and the shaped waveform setting device $9b_9$ so that the output from the flip-flop $9b_{11}$ is applied to the invertor element $9b_{12}$ connected to the other input of the AND gate $9b_{14}$. The AND gate $9b_{14}$ is turned on and turns on the analog switch $9b_{10}$ and then supplies shaped waveform data (V in (b) of FIG. 11) to the waveform synthesizer $9b_{13}$ thus starting to synthesize the simulation arc length waveform. When the period signal $C_B$ is subsequently applied to the SET terminal of the flip-flop $9b_{11}$, the output from the flip-flop $9b_{11}$ turns to have 'H' level and is fed to the invertor element $9b_{12}$, whereby the AND gate $9b_{14}$ is turned off, whereas the analog switch $9b_{10}$ is also turned off. Therefore, the outputting of the shaped waveform data is thus suspended. Since the output from the flip-flop $9b_{11}$, however, is supplied to the cut interval setting device $9b_1$, the cut waveform data is read again. As a result, the simulation arc length waveform each of fusion, shaping and cutting is synthesized whenever the period signal $C_B$ is applied and the simulation arc length waveform signal Lo ((c) of FIG. 11) is output.

When the simulation arc length waveform is set as described above, the comparator A 10a compares the signal level Lo of the arc length waveform with the actual arc length L(l) (the portion indicated by the continuous line in FIG. 10(b)) detected by the arc length detector and computes a difference signal ($\Delta L(l) = L(l) - Lo$). The difference signal $\Delta L(l)$, together with the simulation current waveform ((a) of FIG. 11), is applied to the computing element and the peak value i of the pulse current waveform signal is corrected using the relational expression of $i = i - A \cdot \Delta L(l)$. The pulse width $\tau$ of the pulse current waveform signal is otherwise corrected using the relational expression $\tau = \tau - B \cdot \Delta L(l)$. The pulsating current waveform signal is corrected as the arc length varies so that welding can be carried out while the preset simulation arc length is held in each welding process, whereas the welding current is obtained so as to correct the variation of the arc length. Further, the base current produced by the base current output device 10i and used for preventing an out-of-arc condition is superposed on the welding current in the, adder 10h and the combination is supplied to the comparator B 10j. The arc current value detected by the current detector 6 is compared with a reference arc current value in the comparator B 10j and if (the detected arc current value) < (the reference arc current value), the ON signal is applied to the invertor drive circuit 1b and then a pulsed arc current output from the arc welding power supply 1 is supplied between the wire electrode 3 and the workpieces 4b. On the other hand, the operation-off signal is applied to the invertor drive circuit 1b while (the detected arc current value) > (the reference arc current value).

Although a description has been given of the periodic repetition of the plurality of pulse groups (pulse trains) in the embodiment shown, the difference signal $\Delta L$, obtained by comparing the preset simulation arc length in the arc length setting device with the actual arc length detected by the arc length detector, may be used to correct the instantaneous current i having a single pulse waveform to i=i−D·ΔL in effecting welding by periodically repeating the signal pulse.

Moreover, the short-circuit transfer arc welding apparatus for effecting welding by repeating the short-circuit and the arc may replace the pulsed arc welding apparatus in the above embodiment shown. In this case, the arc length detector operates only during the arc interval and the comparison between the arc length during the arc interval and the simulation arc length is utilized to correct the instantaneous current i at the arc interval to i=i−D·ΔL according to the difference signal ΔL, whereby the same effect in the embodiment shown is achieved.

Figure 12:
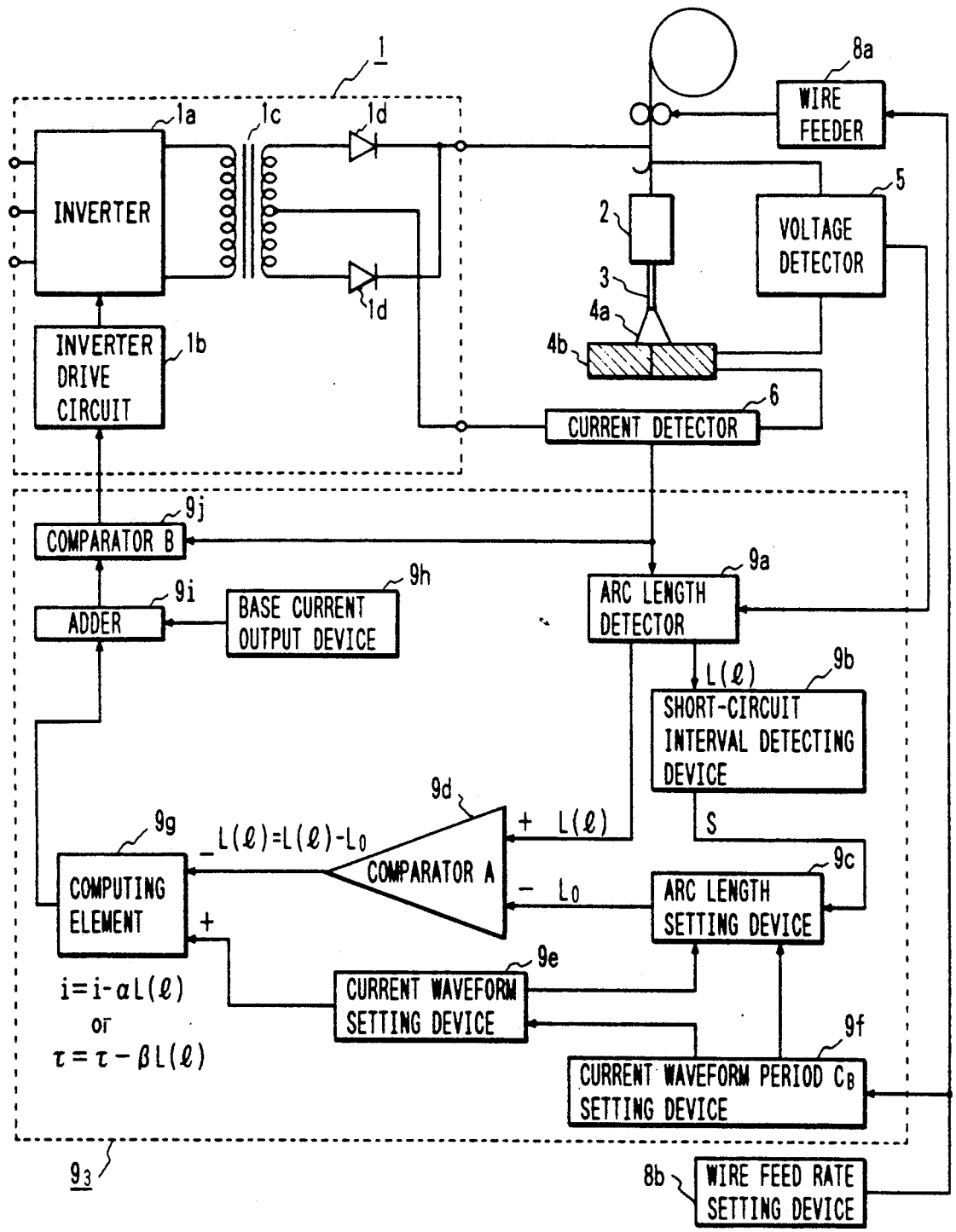
FIG. 12 is an overall block diagram of a pulsed arc welding apparatus embodying an eighth aspect in the invention.

FIG. 12 is an overall block diagram of a pulsed arc welding apparatus embodying an eighth aspect in the invention. In FIG. 12, like reference characters designate like or corresponding parts of FIG. 8 with the omission of the detailed description thereof. The pulsating current waveform control circuit $10_3$ this embodiment comprises the arc length detector $9a$ for detecting the true arc length which momentarily varies on the basis of the detected arc voltage and current so as to output the arc length signal L(l), a short-circuit interval detector $9a$ for detecting the short-circuit of the molten lump according to the arc length signal L(l) so as to output a short-circuit interval signal S, the arc length setting device $9b$ for setting a simulation arc length waveform L(o) by simulating the arc length required in welding process as shown by a broken line of FIG. 15(b) and raising the level of the simulation arc length waveform L(o) as shown in (b) of FIG. 15 when the short-circuit interval detection signal S is input, the comparator A $10a$ for comparing the detected arc length value L(l) with the simulation arc length Lo so as to output the difference signal ΔL(l), the current waveform setting device $110b$ for setting a simulation current waveform by simulating the reference waveform of the group of pulsating currents constituting the arc current as shown in (c) of FIG. 15, the current waveform period $C_B$ setting device $10f$ for setting the period of reading the arc length waveform Lo and the current waveform i, the computing element $10m$ for correcting the peak value or pulse width of the simulation current waveform by means of the difference signal ΔL(l) so as to output the arc current generated thereby, the base current output device $10i$ for outputting the base current to be superposed on the arc current produced, the adder $10h$ for superposing the base current, and the comparator B $10j$ for comparing the detected arc current value with the arc current supplied so as to control the on/off state of the invertor drive circuit $1b$ in conformity with the result of comparison.

Figure 13:
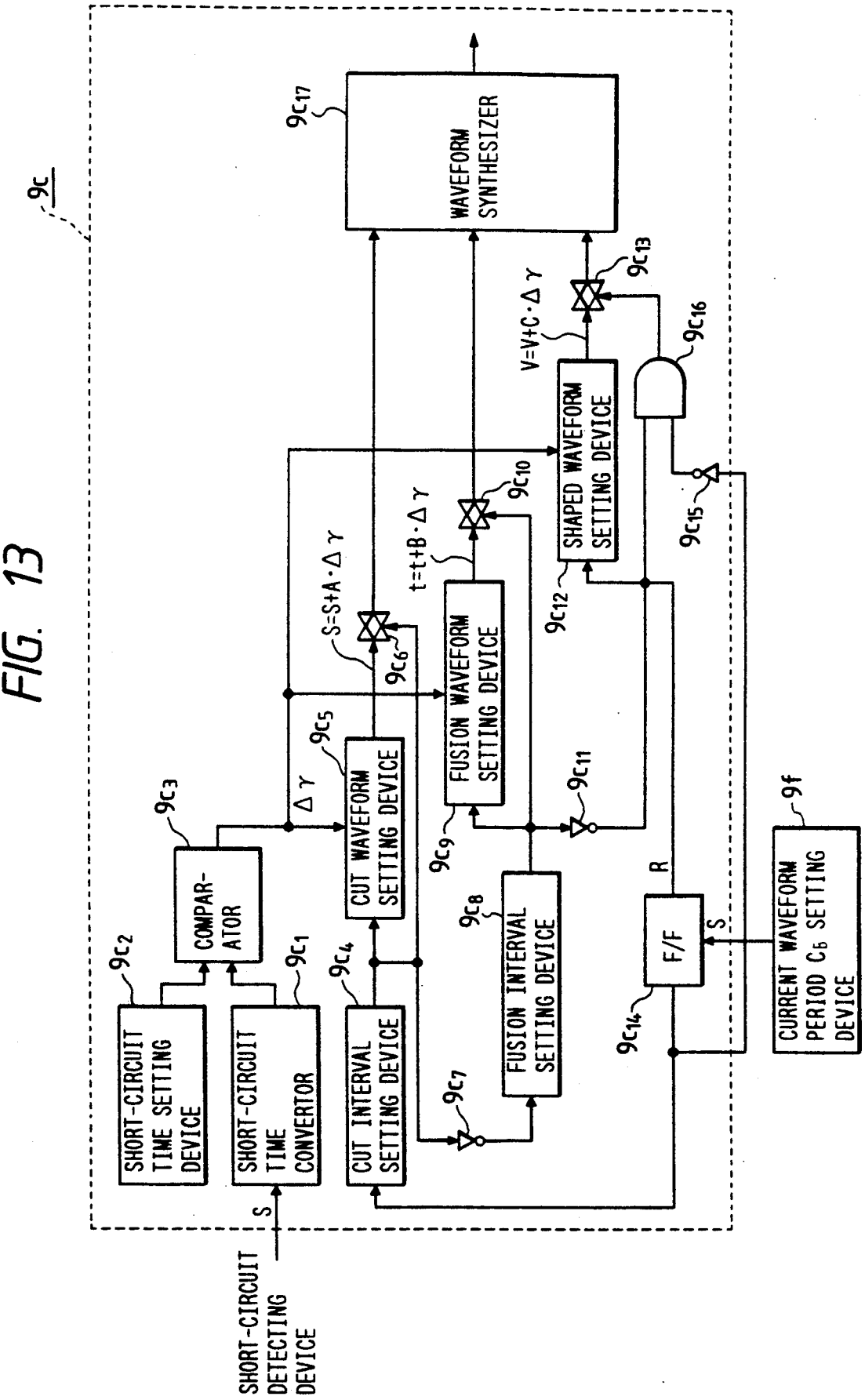
FIG. 13 is an internal block diagram of the arc length setting device embodying the invention.

The arc length setting device $9b$ mentioned above comprises, as shown in FIG. 13, setting devices such as a short-circuit time convertor $9c_1$ for measuring a short-circuit signal per unit time on the basis of the output duration of the short-circuit interval detection signal S received from the short-circuit interval detector $9a$, a short-circuit time setting device $9c_2$ setting a prescribed short-circuit time setting device $9c_2$ for setting a prescribed short-circuit time signal, a comparator $9c_3$ for comparing short-circuit time per unit time with the prescribed short-circuit time signal value so as to output a level modifying signal Δγ of the simulation arc length waveform as a difference signal, the simulation arc length waveform setting device $110b$ and the like, the waveform synthesizer for $9b_{13}$ for synthesizing set waveforms in order so as to obtain a simulation arc length, the analog switches $9b_4$, $9b_8$, $9b_{12}$ for controlling the supply of the respective set waveforms to the waveform synthesizer $9b_{13}$, the invertor elements $9b_4$, $9b_8$, $9b_{12}$ controlling the reading of the respective set waveforms, the flip-flop $9b_{11}$ and the AND gate $9b_{14}$ for setting a shaped waveform output interval on the basis of current waveform period $C_B$ signal output timing.

Figure 15A:
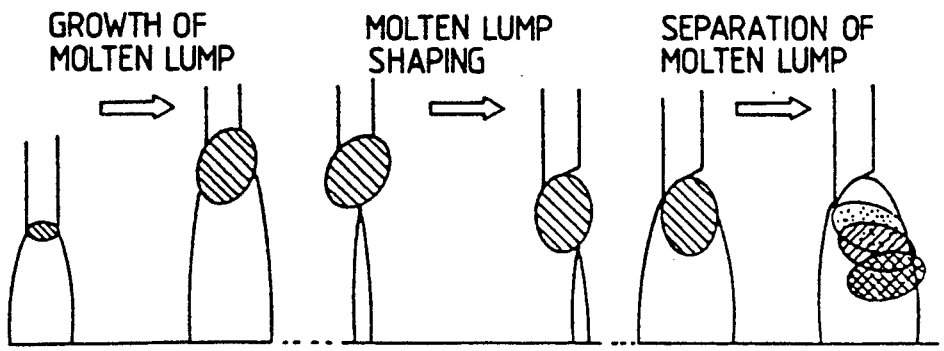
FIG. 15(a) is a diagram illustrating classified welding functions.

The operation of the welding apparatus thus constructed will subsequently be described as follows. As shown in FIG. 15(a), the arc length increases during the process of melting the wire electrode by supplying the arc current and growing the molten lump, and the arc length gradually narrows in view of the balance between the wire feed rate and the growth of the molten lump of the wire electrode resulting from the arc current, at the interval during which the molten lump is shaped to reduce the melting volume by restricting the arc current. At a point of time the molten lump is shaped and the arc length shortens, a large arc current is made to flow so as to separate the molten lump grown by means of the electromagnetic pinch force produced then because of the large arc current. The arc length again increases when the molten lump is separated and the growth-shaping-fusion of the then molten lump are repeated.

When arc welding is actually carried out under normal conditions, the variation of the arc length is exhibited as stated above. By presetting the variation of the arc length as the simulation arc length waveform and controlling the arc current supply to maintain the simulation arc length waveform, stable arc welding with an excellent welding bead can be effected.

Figure 15C:
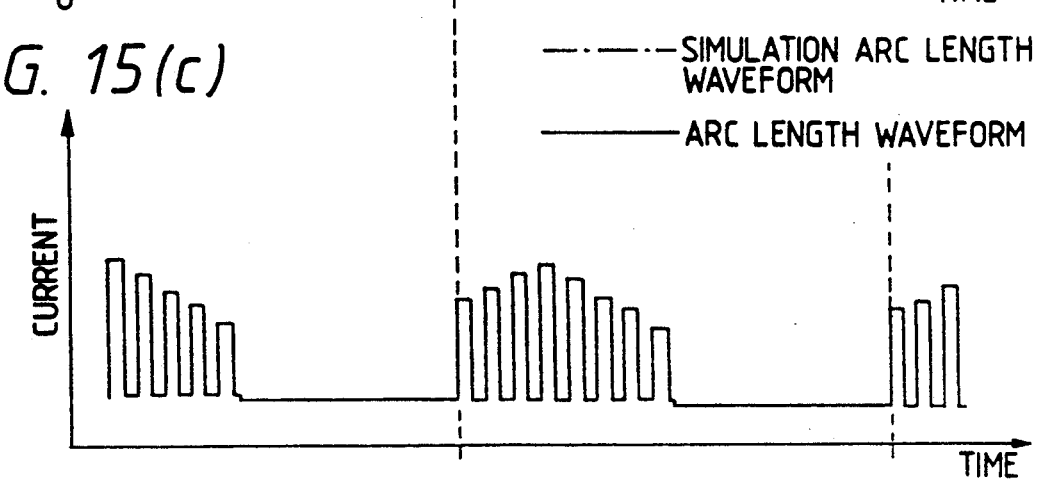
FIG. 15(c) is a simulation current waveform chart.
Figure 16A:
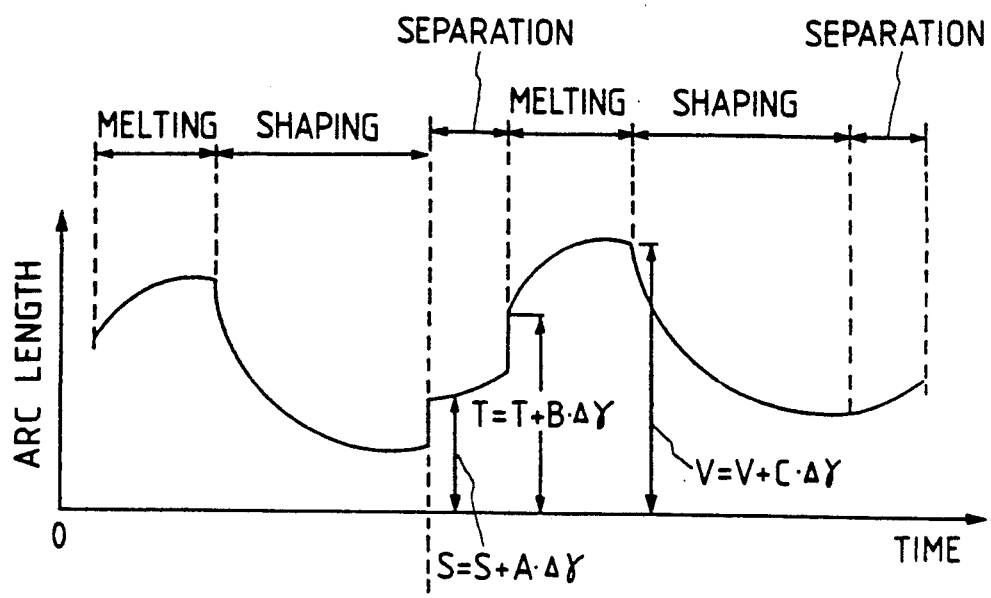
FIGS. 16(a)-16(b) are a diagram illustrating the operation of the arc length setting device.
Figure 16B:
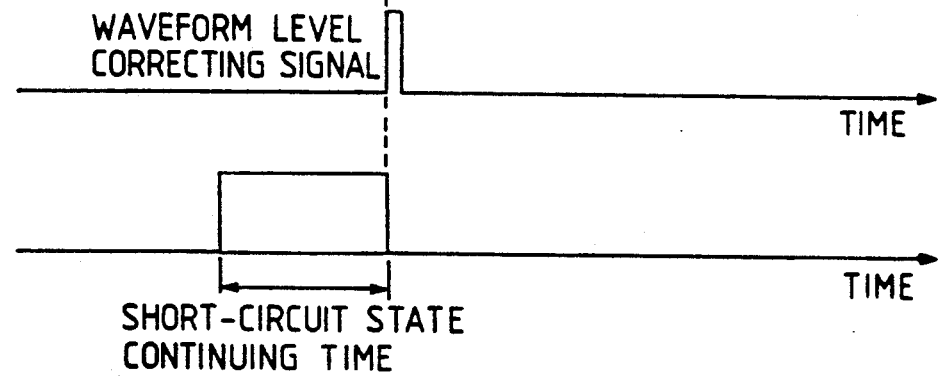

When the arc current becomes easily affected by disturbances simultaneously with the molten lump being frequently short-circuited as welding conditions change, arc welding is carried out by raising the level of the simulation arc length waveform while the arc length is held in line with the simulation arc length waveform. The short-circuit frequency can thus be reduced in order to accomplish non-spatter condition. For this purpose, as shown in the arc length setting device $9b$ of FIG. 13, for instance, the short-circuit interval signal S produced by the short-circuit interval detector $9a$ is applied to the short-circuit time converter $9c_1$ (FIG. 15(c)) so as to convert the signal into short-circuit time per unit time, which is compared with the short-circuit time prescribed by the prescribed short-circuit time setting device $9c_2$ in the comparator $9c_3$. If the short-circuit time per unit time becomes greater than the prescribed short-circuit time as a result of comparison, the waveform modifying signal Δγ is applied to a cut waveform S setting device $9b_2$, a fusion waveform t setting device $9b_6$ and a shaped waveform V setting device $9b_9$ ((b) of FIG. 16) to raise the cut waveform S to (S+AΔγ) level, fusion waveform t to (t+BΔγ) level and the shaped waveform V to (V+CΔtγ) level ((a) of FIG. 16).

When the period signal $C_B$ is applied to the SET terminal of the flip-flop $9b_{11}$ after each waveform level is raised in this manner, an ON signal at 'H' level is applied from the flip-flop $9b_{11}$ to the cut interval setting device $9b_1$ arranged with a timer circuit and the ON signal at 'H' level is applied to the cut waveform S setting device $9b_2$ the analog switch $9b_{3a}$ for a period of time corresponding to the cut interval. As a result, cut waveform data (S in (a) of FIG. 16) is supplied from the cut waveform S setting amplifier $9b_{2a}$ via the analog switch $9b_{3a}$ to the waveform synthesizer $9b_{13}$. Subsequently, when the level of the ON signal delivered from the cut interval setting device $9b_{1a}$ to 'L', the output from the invertor element $9b_{4a}$ is inverted to have 'H' level to become the ON signal of the fusion interval setting device $9b_{5a}$. The ON signal at 'H' level is applied to the fusion waveform T setting device $9b_{6a}$ and analog switch $9b_{7a}$ for a period of time corresponding to the fusion interval and fusion waveform data (T in (b) of FIG. 15) is supplied via the analog switch $9b_{7a}$ to the waveform synthesizer $9b_{13a}$. When the level of the ON signal changes to 'L' upon the termination of the fusion interval, moreover, the output from the invertor element $9b_{8a}$ is inverted to have 'H' level and applied to the reset terminal of the flip-flop $9b_{11d}$ one of the inputs of the AND gate $9b_{14a}$ and the shaped waveform setting device $9b_{9a}$ so that the output from the flip-flop $9c_{14}$ turns to have 'L' level and is applied to the invertor element $9b_{12a}$ connected to the other input of the AND gate $9b_{14a}$. The AND gate $9b_{18a}$ is turned on and turns on the analog switch $9b_{11a}$ and then supplies shaped waveform data (V in (a) of FIG. 15) to the waveform synthesizer $9b_{13a}$, thus starting to synthesize the simulation arc length waveform. When the period signal $C_B$ is subsequently applied to the SET terminal of the flip-flop $9b_{11a}$ the output from the flip-flop $9b_{11a}$ turns to have 'H' level and is fed to the invertor element $9b_{12a}$, whereby the AND gate $9b_{18a}$ is turned off, whereas the analog switch $9b_{10a}$ is also turned off. Therefore, the outputting of the shaped waveform data is thus suspended. Since the output from the flip-flop $9b_{11a}$, however, is supplied to the cut interval setting device $9b_{4a}$ the cut waveform data is read again. As a result, the simulation arc length waveform is synthesized at each time of fusion, shaping and cutting whenever the period signal $C_B$ is applied and the simulation arc length waveform signal Lo ((b) of FIG. 15) is output.

Figure 15B:
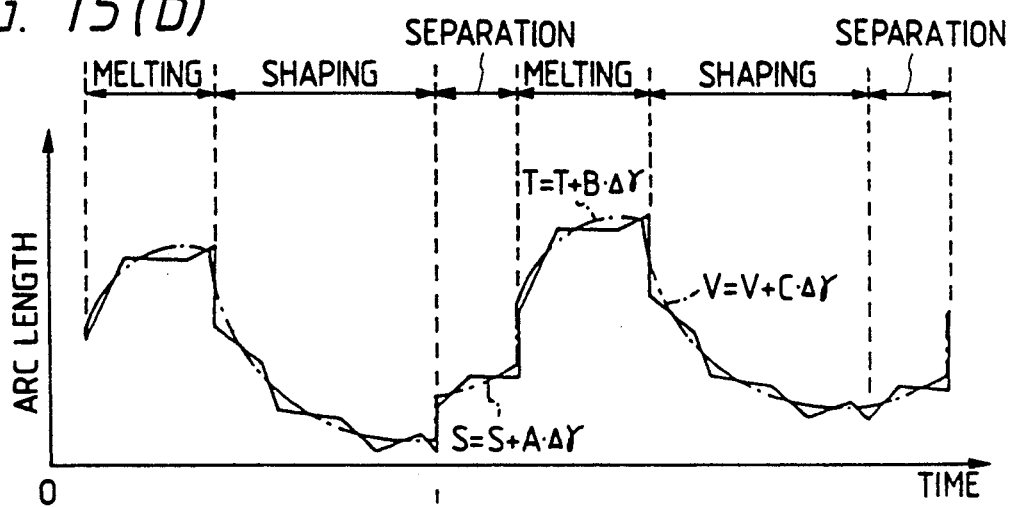
FIG. 15(b) is an arc length waveform chart.

When the simulation arc length waveform is set as described above, the comparator A $10a$ compares the signal level Lo of the arc length waveform with the actual arc length L(l) (the portion indicated by the continuous line in FIG. 15(b)) detected by the arc length detector and computes the difference signal ($\Delta L(l) = L(l) - Lo$). The difference signal $\Delta L(l)$, together with the simulation current waveform ((b) of FIG. 15), is applied to the computing element and the peak value i of the pulse current waveform signal is corrected using the relational expression of $i = i - A \cdot \Delta L(l)$. The pulse width $\tau$ of the pulse current waveform signal is otherwise corrected using the relational expression $\tau = \tau - B \cdot \Delta L(l)$. The pulsating current waveform signal is corrected as the arc length varies so that welding can be carried out while the preset simulation arc length is held in each welding process, whereas the welding current is obtained so as to correct the variation of the arc length. Further, the base current produced by the base current output device $10i$ for preventing an out-of-arc condition is superposed on the welding current in the adder $10h$ and the combination is supplied to the comparator B $10j$. The arc current value detected by the current detector 6 is compared with a reference arc current value in the comparator B $10j$ and if (the detected arc current value) < (the reference arc current value), the ON signal is applied to the invertor drive circuit $1b$ and then the pulsed arc current output from the arc welding power supply 1 is supplied between the wire electrode 3 and the workpieces $4b$. On the other hand, the operation-off signal is applied to the invertor drive circuit $1b$ while (the detected arc current value) > (the reference arc current value).

Figure 14:
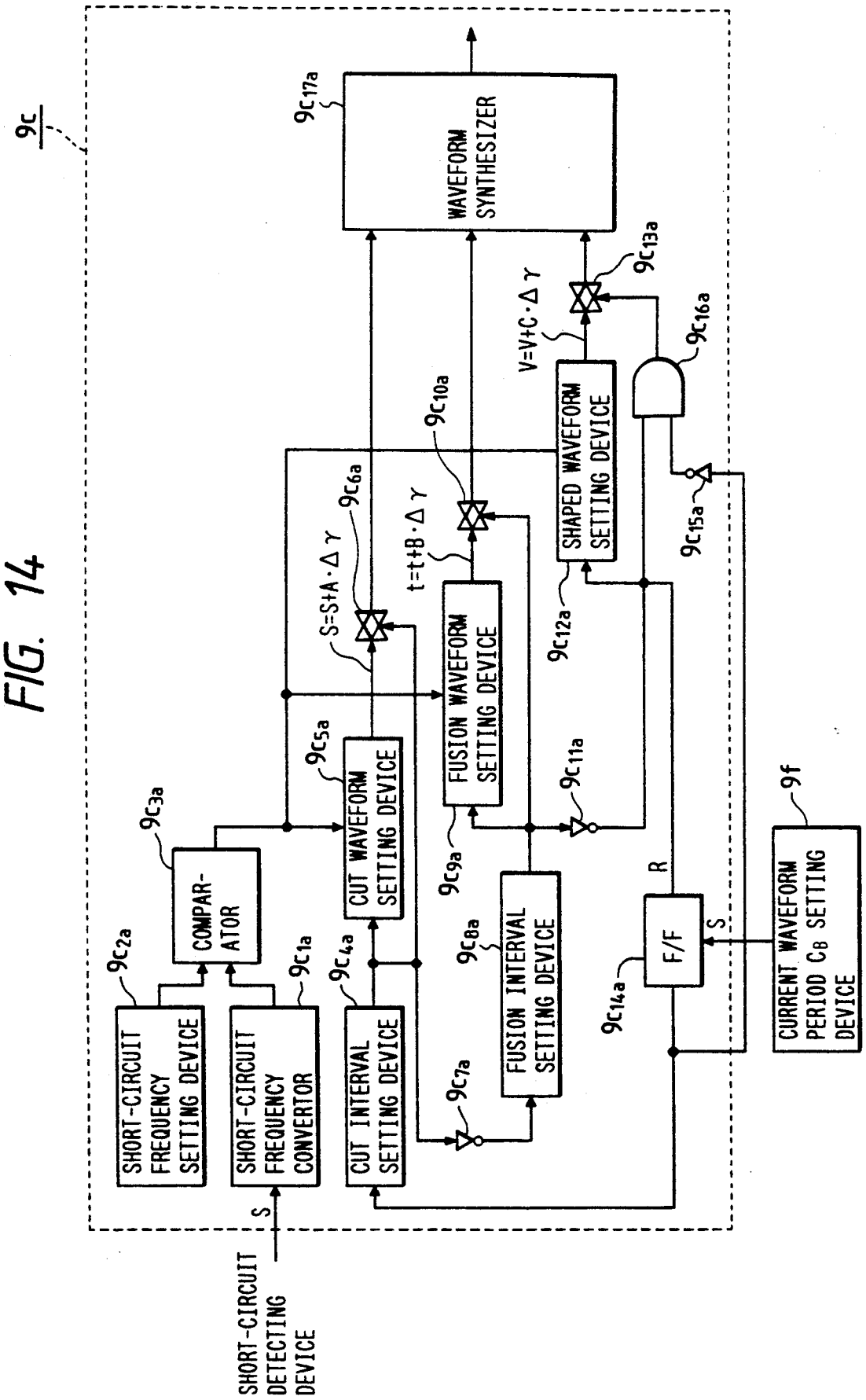
FIG. 14 is an internal block diagram of another arc length setting device embodying the fifth aspect in the invention.

The short-circuit time per unit time for over a predetermined period of time is measured so as to perform the operation of modifying each waveform level in the embodiment shown. As shown in FIG. 14, however, the short-circuit detection signal S is computed in a short-circuit frequency convertor circuit $9c_{1a}$ and when the gross number of the short-circuit occurrences within the predetermined period of time is computed, the value thus computed is compared with the number of short-circuit occurrences set by a short-circuit frequency setting device $9c_{2a}$. If the number of short-circuits exceeds the set number thereof, the short-circuit occurrence frequency is assumed high and as shown in FIG. 2, each waveform level may be raised so as to synthesize the simulation arc length waveform.

Although the above description of the embodiment has been given of the periodic repetition of the plurality of pulse groups (pulse trains), the difference signal $\Delta L$ obtained by comparing the preset simulation arc length in the arc length setting device with the actual arc length detected by the arc length detector may be used to correct the instantaneous current i having a single pulse waveform to $i = i - D \cdot \Delta L$ in effecting welding by periodically repeating the signal pulse.

Moreover, the short-circuit transfer arc welding apparatus for effecting welding by repeating the short-circuit and the arc may replace the pulsed arc welding apparatus in the embodiment shown. In this case, the arc length detector operates only during the arc interval and the comparison between the arc length during the arc interval and the simulation arc length is utilized to correct the instantaneous current i at the arc interval to $i = i - D \cdot \Delta L$ according to the difference signal $\Delta L$, whereby the same effect in the embodiment shown is achieved.

Figure 17:
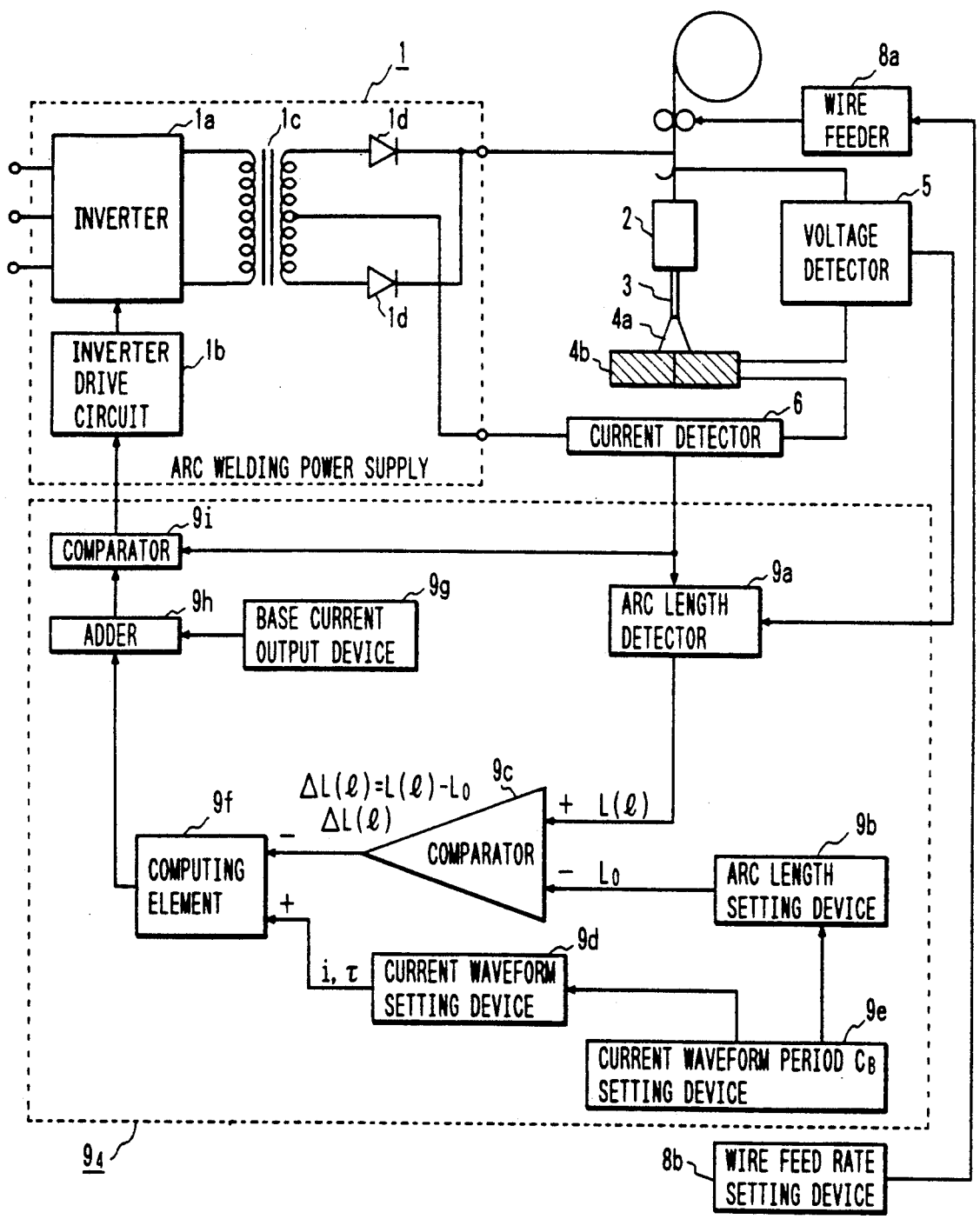
FIG. 17 is an overall block diagram of a pulsed arc welding apparatus embodying a ninth aspect in the invention.
Figure 19A:
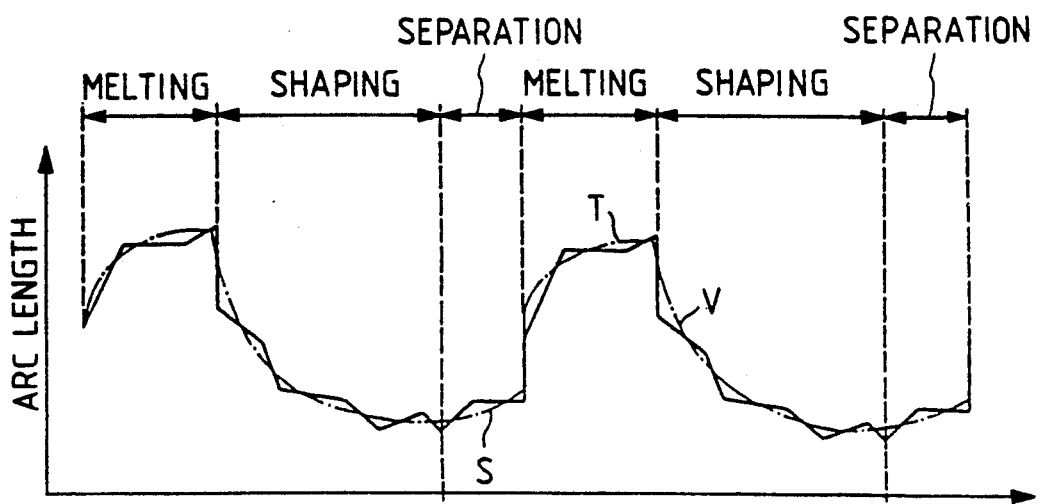
FIGS. 19(a)-19(c) are a waveform chart explanatory of the operation of the current waveform period $C_B$ setting device.

FIG. 17 is an overall block diagram of a pulsed arc welding apparatus embodying a ninth aspect in the invention. In FIG. 17, like reference characters designate like or corresponding parts of FIG. 8 with the omission of the detailed description thereof. The pulsating current waveform control circuit $10_4$ in this embodiment comprises the arc length detector 19 for detecting the true arc length which momentarily varies on the basis of the detected arc voltage and current so as to output the arc length signal L(l), the arc length setting device $9b$ for setting a simulation arc length waveform by simulating the arc length required in welding process as shown by a broken line of FIG. 19(a) in line with a reference welding current as described later, the comparator A $10a$ for comparing the detected arc length value with the simulation arc length so as to output the difference signal $\Delta L(l)$, the current waveform setting device $110b$ for setting a simulation current waveform by simulating the reference waveform of the group of pulsating currents constituting the arc current as shown in (b) of FIG. 19, the current waveform period $C_B$ setting device $9e$ for setting the period of reading the arc length waveform Lo and the current waveform i, the computing element $10_m$ for correcting the peak value or pulse width of the simulation current waveform by means of the difference signal $\Delta L(l)$ so as to output the arc current generated thereby, the base current output device $10i$ for outputting the base current to be superposed on the arc current produced, the adder $10h$ for superposing the base current, and the comparator B $9i$ for comparing the detected arc current value with the arc current supplied so as to control the on/off state of the invertor drive circuit $1b$ in conformity with the result of comparison.

The arc length setting device $9b$ mentioned above comprises, as shown in FIG. 18, setting devices such as a cut internal setting device $9b_1$ for setting an interval during which the cut waveform in the simulation arc length waveform, a cut waveform setting device $9b_2$ for setting the cut waveform, a fusion interval setting device $9b_5$ for setting an interval during which a fusion waveform is output, a fusion waveform setting device $9b_6$ for setting a fusion waveform, a shaped waveform setting device $9b_9$ for setting a shaped waveform and the like, a waveform synthesizer for $9b_{13}$ for synthesizing set waveforms in order so as to obtain a simulation arc length, analog switches $9b_3$, $9b_7$, $9b_{10}$ for controlling the supply of the respective set waveforms to the waveform synthesizer $9b_{13}$, invertor elements $9b_4$, $9b_8$, $9b_{12}$ for controlling the reading of the respective set waveforms, a flip-flop $9b_{11}$ and an AND gate $9b_{14}$ for setting a shaped waveform output interval on the basis of current waveform period $C_B$ signal output timing.

Figure 20A:
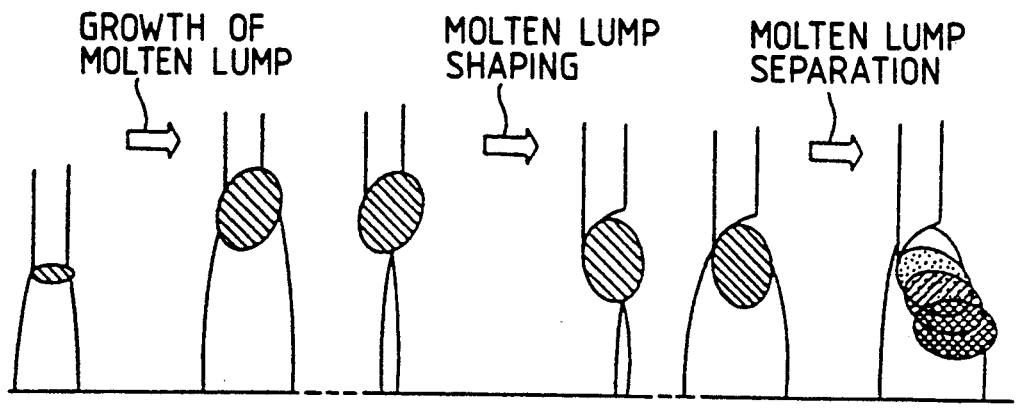
FIGS. 20(a) and 20(b) illustrate classified welding functions.
Figure 20B:
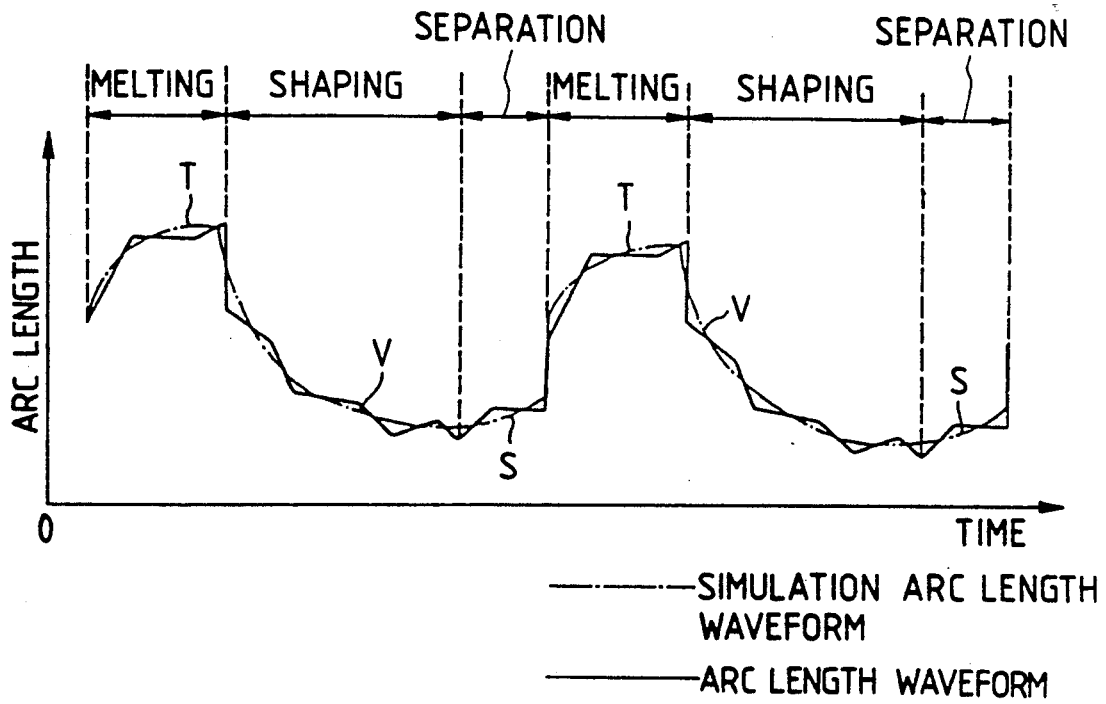

The operation of the welding apparatus thus constructed will subsequently be described. As shown in FIG. 20($a$), the arc length increases during the process of melting the wire electrode by supplying the arc current and growing the molten lump, and the arc length gradually narrows in view of the balance between the wire feed rate and the growth of the molten lump of the wire electrode resulting from the arc current, at the interval during which the molten lump is shaped to reduce the melting volume by restricting the arc current. At a point of time the molten lump is shaped and the arc length shortens, a large arc current is made to flow so as to separate the molten lump grown by means of the electromagnetic pinch force produced then because of the large arc current. The arc length again increases when the molten lump is separated and then the growth-shaping-fusion phenomena of the molten lump repeat.

When arc welding is actually carried out under normal conditions, the variation of the arc length is exhibited as stated above. Stable arc welding with an excellent welding can be effected by presetting the variation of the arc length as the simulation arc length waveform upon utilization of the growth-shaping-cutting phenomena of the molten lump corresponding to the arc current waveform at the timing of the arc current waveform and controlling the arc current supply to maintain the simulation arc length waveform.

Figure 18:
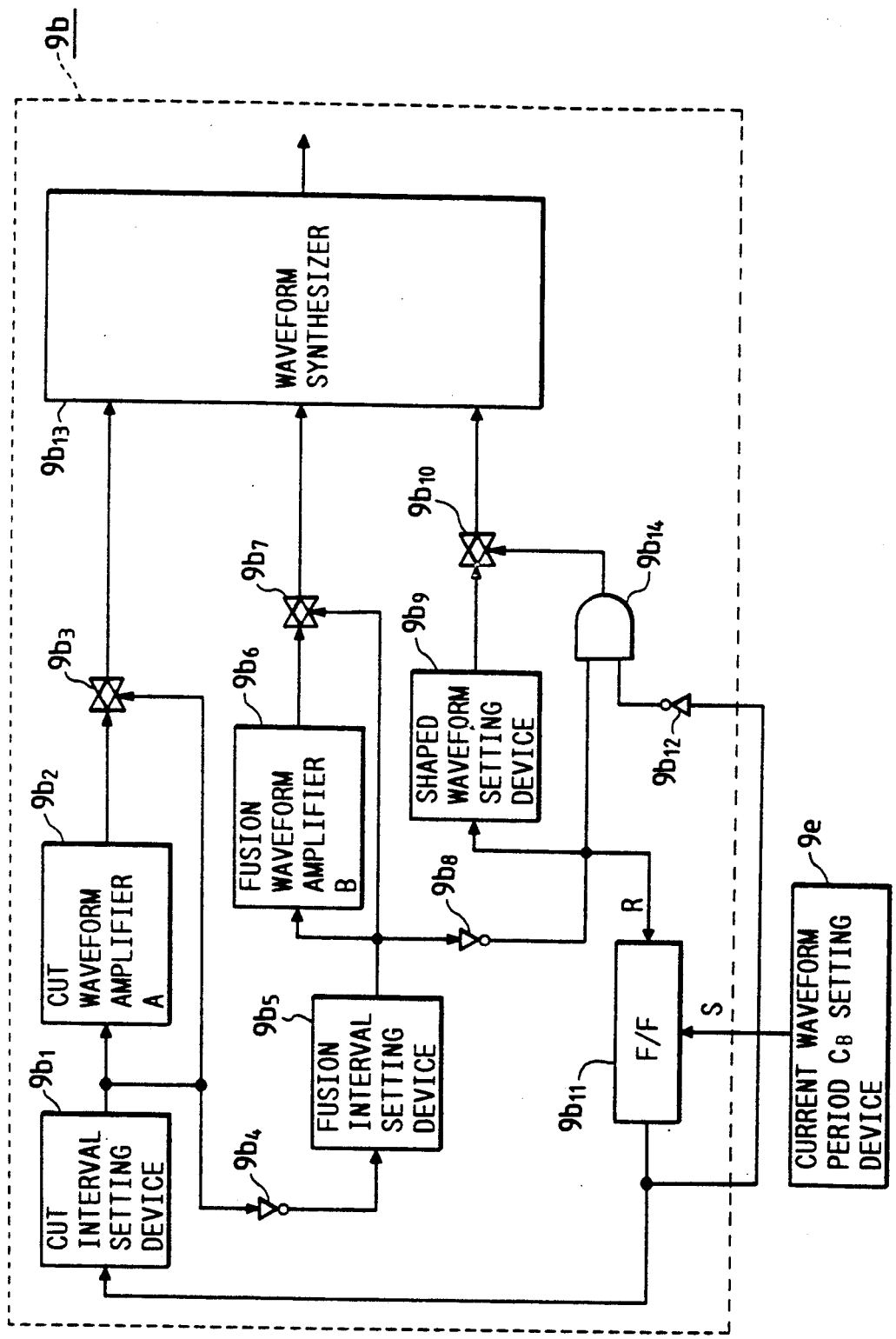
FIG. 18 is an internal block diagram of the arc length setting device.

The repetitive period of each welding process stated above is set long, depending on the welding condition, when the component mixture ratio of the shield gas required for arc welding, for instance, contains much $CO_2$, and set short when it contains much Ar. When the molten lump grown is thrust up by the deflected arc as a unique phenomenon like the magnetic arc blow occurs, the repetitive period is otherwise delayed so as to provide a sufficient long shaping process and the cutting process needs starting after the molten lump thus thrust up is returned to the original condition. For that purpose, the current waveform period signal (hereinafter simply called the period signal) $C_B$ ((c) of FIG. 19) with the output period set in conformity with the conditions stated above is applied from the current waveform period $C_B$ setting device $10f$ to the arc length setting device $9b$ and the current waveform setting device $10f$ simultaneously. As a result, the arc length setting device $9b$ synthesizes and outputs the simulation arc length waveform shown by the broken line of FIG. 19($a$). As for the arc length waveform synthesization, as shown in FIG. 18, an ON signal at 'H' level is applied from the flip-lop $9b_{11}$ to the cut interval setting device $9b_1$ arranged with a timer circuit when the period signal $C_B$ is applied to the SET terminal of the flip-flop $9b_{11}$, and the ON signal at 'H' level is applied to the cut waveform S setting device $9b_2$ and to the analog switch $9b_3$ by an interval corresponding to the cut interval. As a result, cut waveform data (S in (a) of FIG. 19) is supplied from the cut waveform setting device $9b_2$ via the analog switch $9b_3$ to the waveform synthesizer $9b_{13}$. Subsequently, when the level of the ON signal output from the cut interval setting device $9b_1$ changes to 'L', the output from the invertor element $9b_4$ is inverted to have 'H' level and to become the ON signal of the fusion interval setting device $9b_5$. Consequently, the ON signal at 'H' level is applied to the fusion waveform T setting device $9b_5$ and the analog switch $9b_7$ during an interval corresponding to the fusion interval. Fusion waveform data (T in (a) of FIG. 19) is supplied via the analog switch $9b_7$ to the waveform synthesizer $9b_{13}$. When the level of the ON signal changes to 'L' upon the termination of the fusion interval, the output from the invertor element $9b_8$ is inverted to have 'H' level and supplied to the reset terminal of the flip-flop $9b_{11}$, one of the inputs of the AND gate $9b_{14}$ and the shaped waveform setting device $9b_9$. The output from the flip-flop $9b_{11}$ is then inverted to have 'L' level before being supplied to the invertor element $9b_{11}$ connected to the other input of the AND gate $9b_{14}$. The AND gate $9b_{14}$, which has resumed its ON state, turns on the analog switch $9b_{10}$ and supplies waveform shaping data (V in (a) of FIG. 19) to the waveform synthesizer $9b_{13}$ to start the synthesization of the simulation arc length waveform. When the period signal $C_B$ is subsequently applied to the SET terminal of the flip-flop $9b_{11}$, the output from the flip-flop $9b_{11}$ is inverted to have 'H' level before being applied to the invertor element $9b_{12}$. The AND gate $9b_{14}$ is then turned off and the analog switch $9b_{10}$ is also turned off, so that the waveform shaping data is suspended. As the output from the flip-flop $9b_{11}$ is supplied to the cut interval setting device $9b_1$ accordingly, the cut waveform data is read again. Consequently, the simulation arc length waveform is synthesized at the time of fusion, shaping and cutting each time the period signal $C_B$ is applied and the simulation arc length waveform signal Lo ((b) of FIG. 20) is output.

Figure 19B:
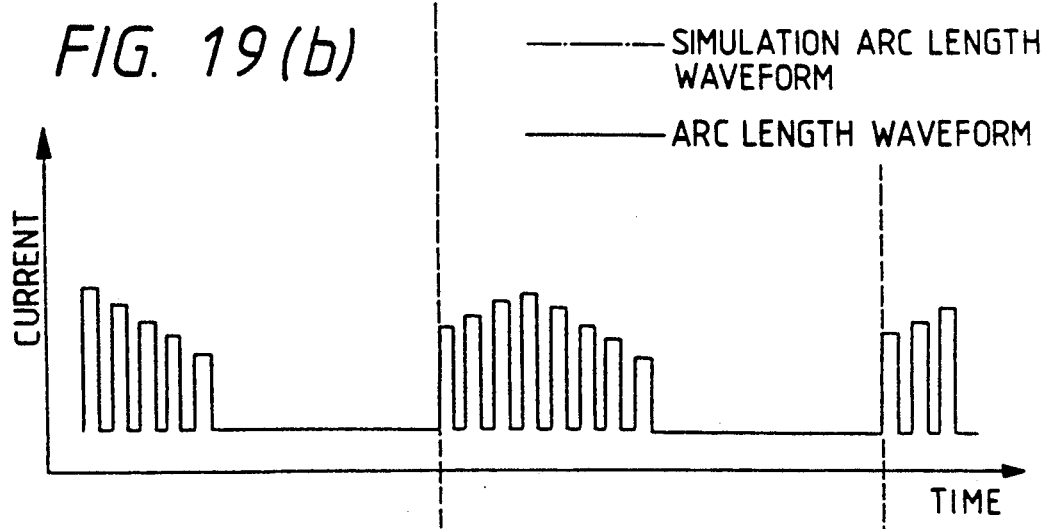
Figure 19C:
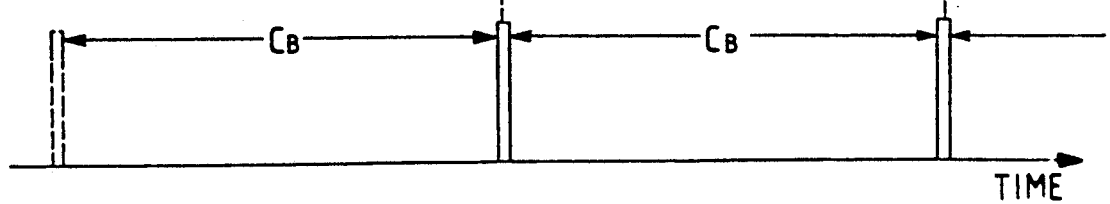

The comparator A $10a$ compares the signal level Lo of the arc length waveform with the true arc length L(l) (the portion (b) of FIG. 19 indicated by a continuous line) detected by the arc length detector when the simulation arc length waveform is set as described above and computes the difference signal ($\Delta L(l) = L(l) - Lo$). The difference signal $\Delta L(l)$, together with the simulation current waveform ((b) of FIG. 19) read from the current waveform setting device $110b$ simultaneously with the signal $C_B$ output, is applied to the computing element where the peak value i of the pulsating current waveform signal is corrected by means of the relational expression $i = i - \Delta \cdot L(l)$. The pulse width $\tau$ of the pulsating current waveform signal is otherwise corrected by means of the relational expression $\tau = \tau - B \cdot \Delta L(l)$. The pulsating current waveform signal is corrected as the arc length varies so that welding can be carried out while the preset simulation arc length is held in each welding process, whereas the welding current is obtained so as to correct the variation of the arc length. Further, the base current produced by the base current output device 10m and used for preventing an out-of-arc condition is superposed on the welding current in the adder 10h and the combination is supplied to the comparator 10j. The arc current value detected by the arc current detector 6 is compared with a reference arc current value in the comparator B 10j and if (the detected arc current value)<(the reference arc current value), the ON signal is applied to the invertor drive circuit 1b and then the pulsed arc current output from the arc welding power supply 1 is supplied between the wire electrode 3 and the workpieces 4b. On the other hand, the operation-off signal is applied to the invertor drive circuit 1b while (the detected arc current value)>(the reference arc current value).

Although a description has been given of the periodic repetition of the plurality of pulse groups (pulse trains) in the embodiment shown, the difference signal $\Delta L$ obtained by comparing the preset simulation arc length in the arc length setting device with the actual arc length detected by the arc length detector may be used to correct the instantaneous current i having a single pulse waveform to $i = i - D \cdot \Delta L$ in effecting welding by periodically repeating the signal pulse.

Moreover, the short-circuit transfer arc welding apparatus for effecting welding by repeating the short-circuit and the arc may replace the pulsed arc welding apparatus in the embodiment shown. In this case, the arc length detector operates only during the arc interval and the comparison between the arc length during the arc interval and the simulation arc length is utilized to correct the instantaneous current i at the arc interval to $i = i - D \cdot \Delta L$ according to the difference signal $\Delta L$, whereby the same effect in the embodiment shown is achieved.

Figure 21:
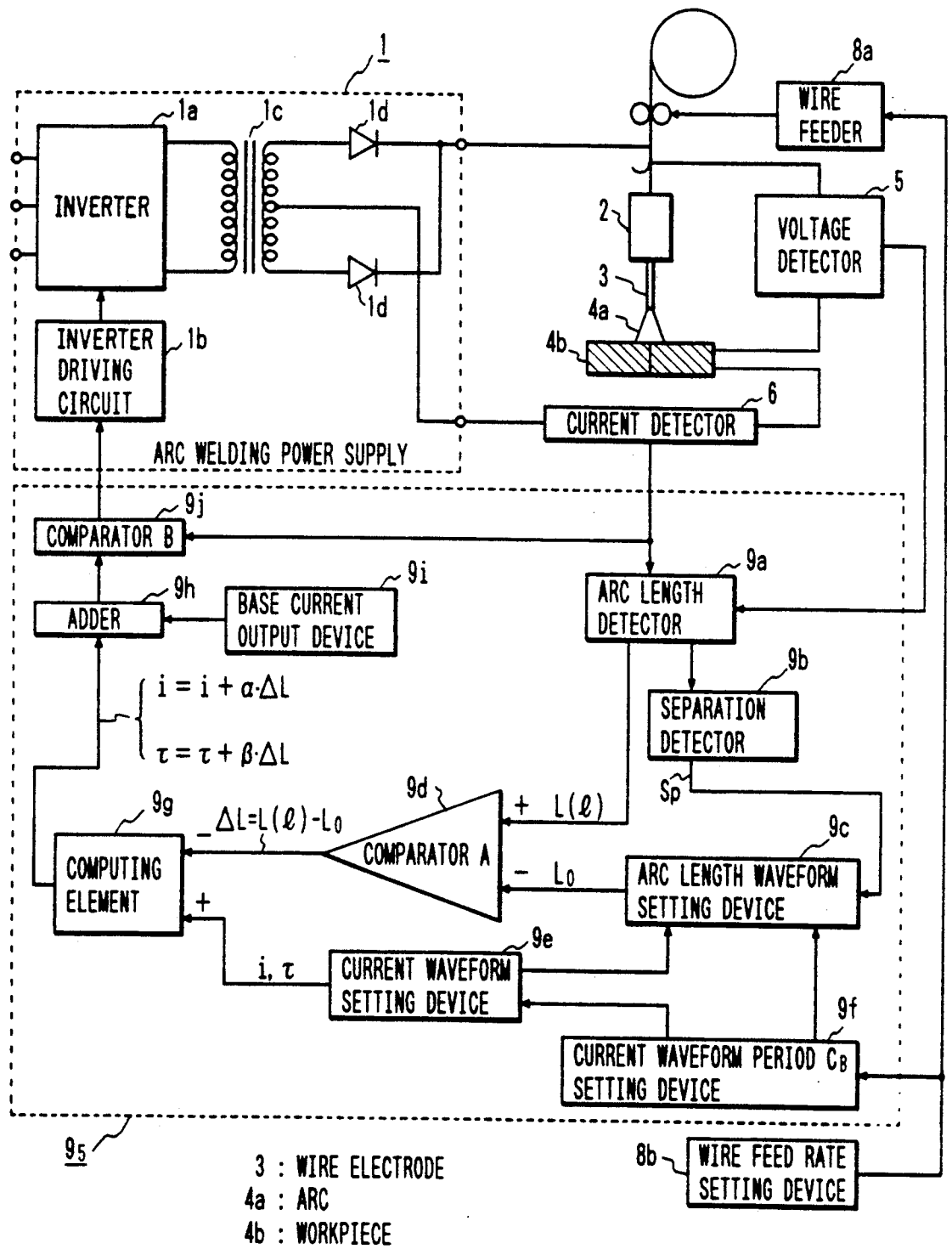
FIG. 21 is an overall block diagram of a pulsed arc welding apparatus embodying a tenth aspect in the invention.

FIG. 21 is an overall block diagram of a pulsed arc welding apparatus embodying a tenth aspect in the invention. In FIG. 21, like reference characters designate like or corresponding parts of FIG. 17 with the omission of the detailed description thereof. The pulsating current waveform control circuit $10_5$ in this embodiment comprises the arc length detector 19 for detecting the true arc length which momentarily varies on the basis of the detected arc voltage and current so as to output the arc length signal L(l), a separation detector 9b for detecting the separation of the molten lump according to the arc length signal L(l) so as to output a separation signal, the arc length waveform setting device 9b for setting a simulation arc length waveform by simulating the arc length required in welding process as shown by a broken line in (b) of FIG. 24 in line with a reference welding current as described later, the comparator A 10a for comparing the detected arc length value with the simulation arc length so as to output the difference signal $\Delta L(l)$, the current waveform setting device 110b for setting a simulation current waveform by simulating the reference waveform of the group of pulsating currents constituting the arc current as shown in (c) of FIG. 4, the current waveform period $C_B$ setting device 10f for setting the period of reading the arc length waveform Lo and the current waveform i in accordance with the wire feed rate, the computing element 10m for correcting the peak value or pulse width of the simulation current waveform according to the difference signal $\Delta L(l)$ so as to output the arc current generated thereby, the base current output device 10h for outputting the base current to be superposed on the arc current produced, the adder 10i for superposing the base current, and the comparator B 10j for comparing the detected arc current value with the arc current supplied so as to control the on/off state of the invertor drive circuit 1b in conformity with the result of comparison.

The separation detector 9c differentiates the arc length signal received from the arc length detector 19 to obtain a differential signal and if the level of the signal is positive as shown in (b) of FIG. 23, outputs the state in which the molten lump at the tip of the wire electrode becomes separated (in the form of a separation signal SD ((d) of FIG. 23) as (a) of FIG. 23).

Moreover, the arc length setting device 9b mentioned above comprises, as shown in FIG. 22, setting devices such as a cut interval setting device $9b_1$ for setting an interval during which the cut waveform T in the simulation arc length waveform is output, a cut waveforms setting device $9b_2$ for setting the cut waveform S, an OR gate $9c_4$ for controlling the outputting of not only the cut waveform but also the fusion waveform T according to the separation signal, an invertor element $9b_4$, flip-flops (hereinafter called F/F) $9c_6$, $9c_7$, a fusion interval setting device $9b_3$ for setting an interval during which fusion waveform T is output, a fusion waveform T $9b_6$ for setting the fusion waveform T, a shaped waveform V setting device $9b_9$ for setting the shaped waveform V and the like, a waveform synthesizer $9b_{13}$ for synthesizing set waveforms in order to obtain a simulation arc length, analog switches $9b_3$, $9b_7$, $9b_{10}$ for controlling the supply of the respective set waveforms to the waveform synthesizer $9b_{14}$, invertor elements $9b_8$, $9b_{12}$ for controlling the reading of the respective set waveforms, a flip-flop $9b_{11}$ and an AND gate $9b_{14}$ for setting a shaped waveform output interval on the basis of current waveform period $C_B$ signal output timing.

The operation of the welding apparatus thus constructed will subsequently be described. As shown in (a) of FIG. 23, the arc length increases during the process of melting the wire electrode by supplying the arc current and growing the molten lump, and the arc length gradually narrows in view of the balance between the wire feed rate and the growth of the molten lump of the wire electrode resulting from the arc current, at the interval during which the molten lump is shaped to reduce the melting volume by restricting the are current. At a point of time the molten lump is shaped and the arc length shortens, a large arc current is made to flow so as to separate the molten lump grown by means of the electromagnetic pinch force produced then because of the large arc current. The arc length again increases when the molten lump is separated and then the growth-shaping-fusion phenomena of the molten lump repeat.

If the arc current is otherwise sharply raised when the arc length signal is suddenly reduced in the negative direction by the short-circuit between the molten lump grown during the shaping interval and the workpieces occurs, the short-circuited molten lump separates, whereas the arc length increases in the positive direction and remains at the fusion interval.

When arc welding is actually carried out under normal conditions, the variation of the arc length is exhibited as stated above. By presetting the variation of the arc length as the simulation arc length waveform and controlling the arc current supply to maintain the simulation arc length waveform, stable arc welding with an excellent welding bead can be effected.

The time at which the molten lump separates is not necessarily fixed but may be disturbed because of the alteration of the welding condition or the disturbance with respect to the arc current. If the arc length is controlled in accordance with the simulation arc length waveform set on the assumption that the normal arc welding is feasible, there develops no welding current for exercising arc length control conforming to the variation of the actual arc length. The simulation arc length waveform conforming to the variation of the actual arc length can be synthesized by switching the cut waveform S over to the fusion waveform T synchronously with the separation of the molten lump and subsequently forming the shaped waveform v to synthesize the respective waveforms.

Figure 22:
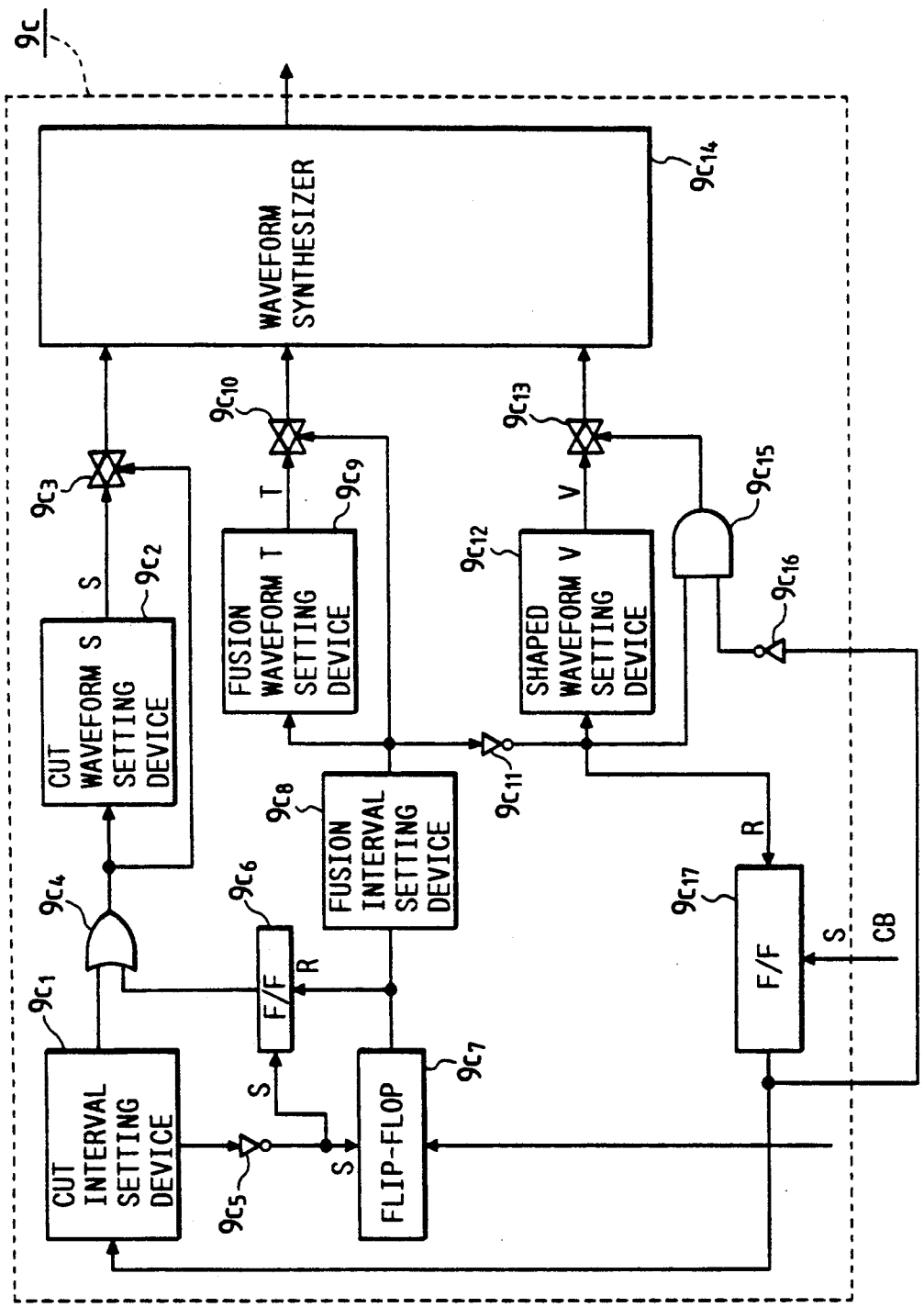
FIG. 22 is an internal block diagram of the arc length waveform setting device.

The synthesization of the simulation arc length waveform in conformity with the conditions stated above will subsequently be described with reference to the arc length waveform setting circuit of FIG. 22 and the signal waveform charts of FIG. 23. The current waveform period signal (hereinafter simply called the period signal) $C_B$ set in accordance with the wire feed rate is first applied from the current waveform period $C_B$ setting device 9c to the arc length waveform setting device 9b. An ON signal at 'H' level is applied from the flip-lop $9b_{11}$ to the cut interval setting device $9b_1$ arranged with a timer circuit when the period signal $C_B$ is applied to the SET terminal of the flip-flop $9b_{11}$ and the ON signal at 'H' level is applied to the cut waveform S setting device $9b_2$ and to the analog switch $9b_3$ by an interval corresponding to the cut interval. As a result, cut waveform data S is supplied from the cut waveform amplifier $9b_2$ via the analog switch $9b_3$ to the waveform synthesizer $9b_{13}$. In this manner, the switching of the cut interval over to the fusion interval is carried out at a point of time the separation signal S is applied from the separation detector 9c to the arc length waveform setting device 9b and hence the cut waveform has to be continued until the separation signal is applied. To cause the cut waveform S to be continued, the ON signal at 'H' level applied from the cut interval setting device $9b_1$ is first applied via the OR gate $9c_4$ to the cut waveform setting device $9b_2$ and simultaneously applied via the invertor element $9b_4$ to the F/Fs $9c_6$, $9b_6$ a signal at 'L' level. Although both F/F $9b_6$, $9c_9$ output no signal at this point of time, the cut interval terminates and the ON signal turns to the 'L' lever therein. When the output from the invertor element $9b_4$ turns to have 'H' level, the F/F $9c_7$ is set, whereas the F/F $9c_6$ applies the ON signal via the OR gate $9c_4$ to the cut waveform S setting device $9c_2$. So, the cut waveform S setting device $9c_2$ can keep outputting the cut waveform S. When a separation signal SP ((c) of FIG. 23) is applied to the F/F $9c_7$ in the set condition as a trigger, subsequently, the F/F $9c_7$ applies the output signal to the reset terminal of the F/F $9c_6$ as a reset signal, stops applying the ON signal to the cut waveform S setting device $9b_2$ and applies the ON signal to the fusion interval setting device $9b_5$. Consequently, the cut waveform S continuous output is switched over to the fusion waveform T output.

The ON signal at 'H' level of the fusion interval setting device $9b_5$ is applied to the fusion waveform T setting device $9b_5$ and the analog switch $9_7$ during an interval corresponding to the fusion interval. Fusion waveform data (T in (b) of FIG. 24) is supplied via the analog switch $9b_7$ to the waveform synthesizer $9b_{13}$. When the level of the ON signal changes to 'L' upon the termination of the fusion interval, the output from the invertor element $9b_8$ is inverted to have 'H' level and supplied to the reset terminal of the flip-flop $9b_{10}$, one of the inputs of the AND gate $9b_{15}$ and the shaped waveform setting device $9b_9$. The output from the flip-flop $9b_{11}$ is then inverted to have 'L' level before being supplied to the invertor element $9b_{12}$ connected to the other input of the AND gate $9b_{14}$. The AND gate $9b_{14}$, which has resumed its ON state, turns on the analog switch $9b_{15}$ and supplies waveform shaping data V to the waveform synthesizer $9b_{13}$ to start the synthesization of the simulation arc length waveform. When the period signal $C_B$ is subsequently applied to the SET terminal of the flip-flop $9b_{17}$, the output from the flip-flop $9b_{11}$ is inverted to have 'H' level before being applied to the invertor element $9b_{12}$. The AND gate $9b_{14}$ then turned off and the analog switch $9b_{10}$ is also turned off, so that the waveform shaping data is suspended. As the output from the flip-flop $9b_{11}$ is supplied to the cut interval setting device $9b_1$ accordingly, the cut waveform data is read again. Consequently, the simulation arc length waveform is synthesized at the time of fusion, shaping and cutting each time the period signal $C_B$ is applied and the simulation arc length waveform signal Lo ((b) of FIG. 24) is output.

Figure 24A:
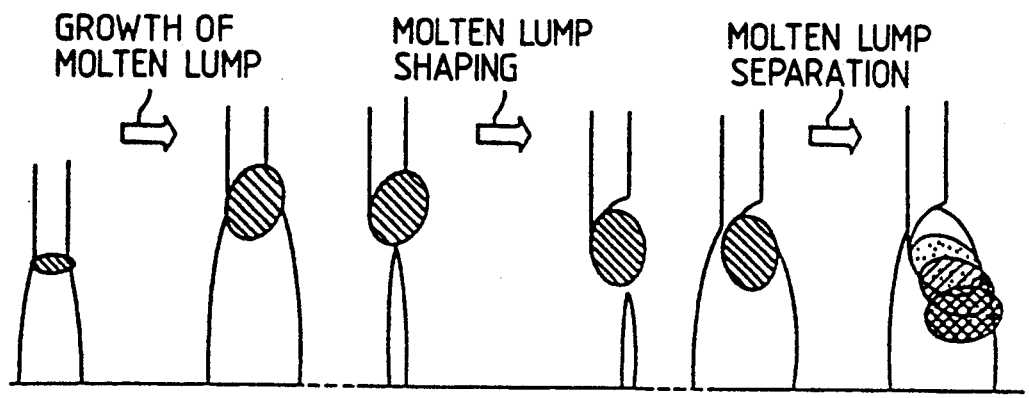
FIG. 24(a) is a diagram illustrating classified welding functions.
Figure 24B:
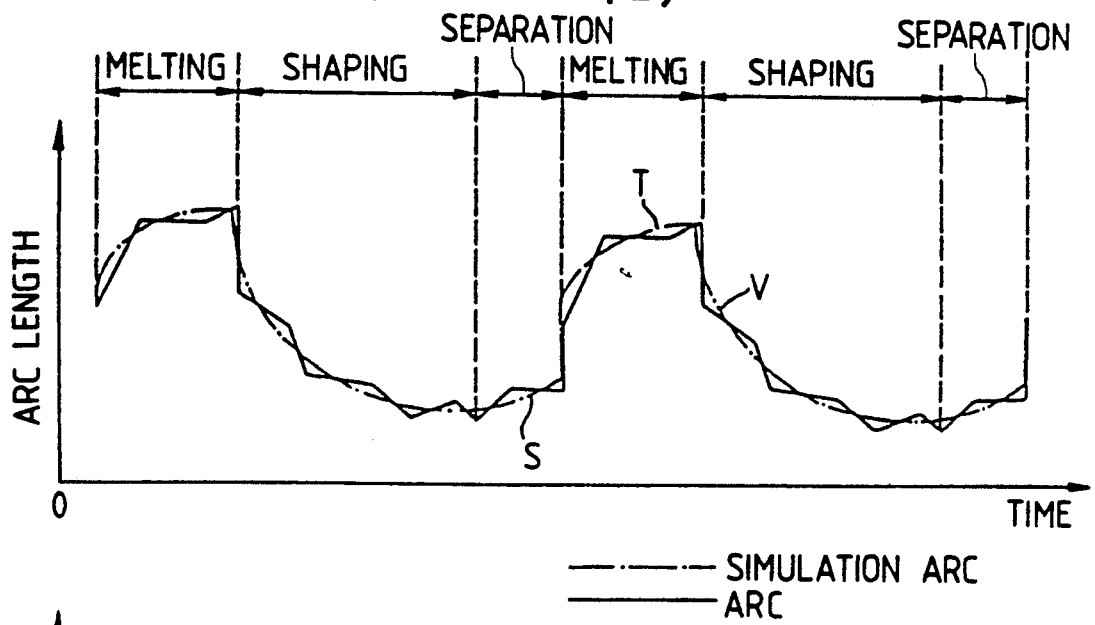
FIG. 24(b) is an arc length waveform chart.
Figure 24C:
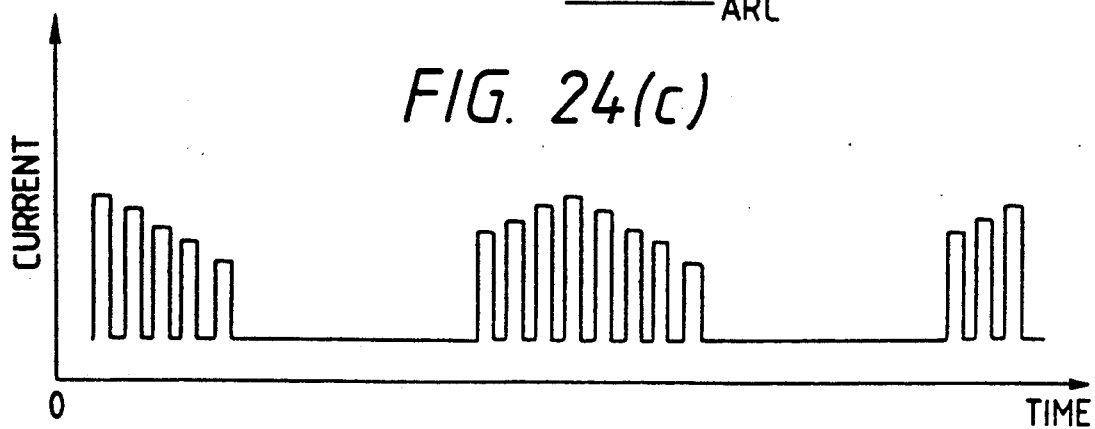
FIG. 24(c) is a simulation current waveform chart.

The comparator A 10a compares the signal level Lo of the arc length waveform with the true arc length L(l) (the portion (b) of FIG. 24 indicated by a continuous line) detected by the arc length detector when the simulation arc length waveform is set as described above, and computes the difference signal ($\Delta L(l) = L(l) - Lo$). The difference signal $\Delta L(l)$, together with the simulation current waveform ((c) of FIG. 24) read from the current waveform setting device 110b simultaneously with the period signal $C_B$ output, is applied to the computing element 10m where the peak value i of the pulsating current waveform signal is corrected by means of the relational expression $i = i + A \cdot \Delta L(l)$. The pulse width $\tau$ of the pulsating current waveform signal is otherwise corrected by means of the relational expression $\tau = \tau - B \cdot \Delta L(l)$. The pulsating current waveform signal is corrected as the arc length varies so that welding can be carried output while the simulation arc length, including the variation of the arc length due to the variation of the separation time of the molten lump, is held, whereas the welding current is obtained so as to correct the variation of the arc length.

Further, the base current produced by the base current output device 10i and used for preventing an out-of-arc condition is superposed on the welding current in the adder 10h and the combination is supplied to the comparator 10j. The arc current value detected by the current detector 6 is compared with a reference arc current value in the comparator B 10j and if (the detected arc current value) < (the reference arc current value), the ON signal is applied to the invertor drive circuit 16 and then the pulsed arc current output from the arc welding power supply 1 is supplied between the wire electrode 3 and the workpieces 4b. On the other hand, the operation-off signal is applied to the invertor drive circuit 1b while (the detected arc current value) > (the reference arc current value).

Although a description has been given of the periodic repetition of the plurality of pulse groups (pulse trains) in the embodiment shown, the difference signal $\Delta L$ obtained by comparing the preset simulation arc length in the arc length setting device with the actual arc length detected by the arc length detector may be used to correct the instantaneous current i having a single pulse waveform to i=i−D·ΔL in effecting welding by periodically repeating the signal pulse.

Moreover, the short-circuit transfer arc welding apparatus for effecting welding by repeating the short-circuit and the arc may replace the pulsed arc welding apparatus in the embodiment shown. In this case, the arc length detector operates only during the arc interval and the comparison between the arc length during the arc interval and the simulation arc length is utilized to correct the instantaneous current i at the arc interval to i=i−D·ΔL according to the difference signal ΔL, whereby the same effect in the embodiment shown is achieved.

Figure 25:
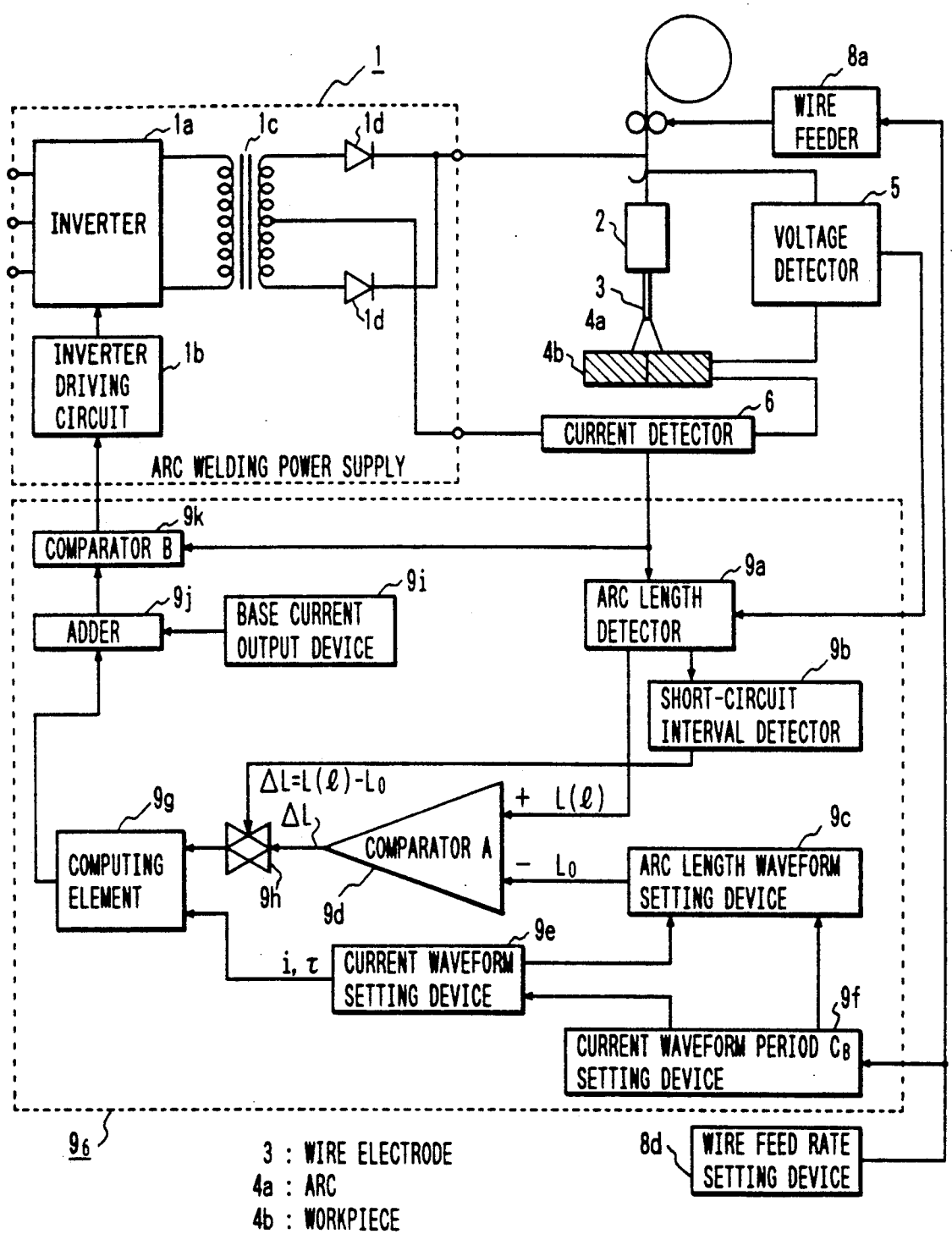
FIG. 25 is an overall block diagram of a pulsed arc welding apparatus embodying an eleventh aspect in the invention.

An embodiment of an eleventh aspect in the invention will subsequently be described with reference to FIG. 25 as an overall block diagram of a pulsed arc welding apparatus embodying the eleventh aspect in the invention. In FIG. 25, like reference characters designate like or corresponding parts of FIG. 21 with the omission of the detailed description thereof. The pulsating current waveform control circuit $10_6$ in this embodiment comprises the arc length detector 19 for detecting the true arc length which momentarily varies on the basis of the detected arc voltage and current so as to output the arc length signal L(l), the short-circuit interval detector 9b for outputting the short-circuit interval signal when it is judged that the molten lump short-circuits as the arc signal varies, the arc length waveform setting device 9c for setting a simulation arc length waveform by simulating the arc length required in welding process as shown by a broken line in FIG. 27(b) in line with a reference welding current as described later, the comparator A 10a for comparing the detected arc length value with the simulation arc length so as to output the difference signal ΔL(l), the current waveform setting device 110b for setting a simulation current waveform by simulating the reference waveform of the group of pulsating currents constituting the arc current as shown in (a) of FIG. 28, the current waveform period $C_B$ setting device 10f for setting the period of reading the arc length waveform Lo and the current waveform i in accordance with the wire feed rate, the computing element 10m for correcting the peak value or pulse width of the simulation current waveform according to the difference signal ΔL(l) so as to output the arc current generated thereby, an analog switch 9n for cutting the difference signal directed, from the comparator A 10a to the computing element 10m upon receipt of the short-circuit interval signal, the base current output device 10i for outputting the base current to be superposed on the arc current produced, the adder 10h for superposing the base current, and the comparator B 10j for comparing the detected arc current value with the arc current supplied so as to control the on/off state of the invertor drive circuit 1b in conformity with the result of comparison.

Figure 26:
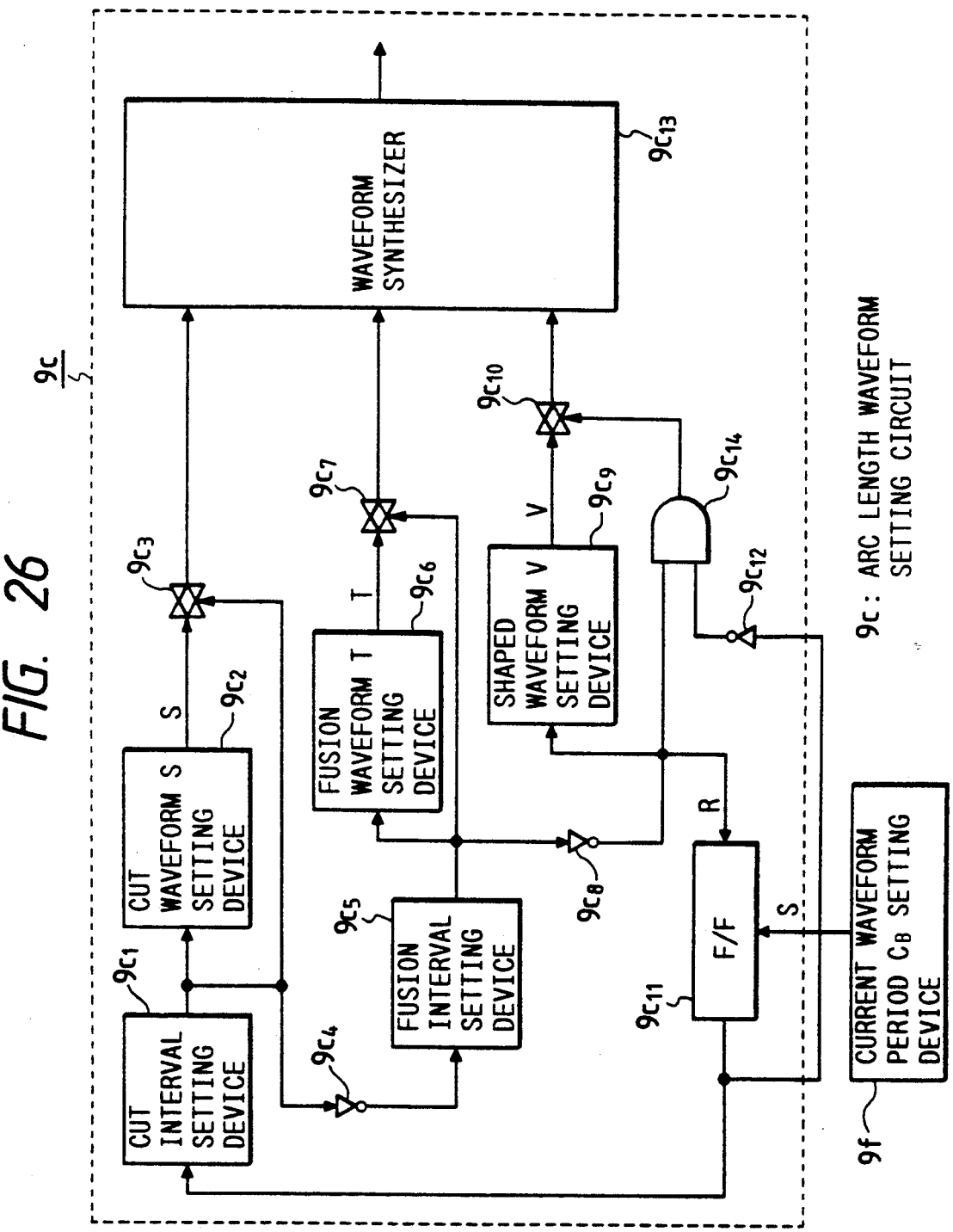
FIG. 26 is an internal block diagram of the arc length waveform setting device.

Moreover, the arc length setting device 9b mentioned above comprises, as shown in FIG. 26, setting devices such as the cut interval setting device $9b_1$ for setting an interval during which the cut waveform S in the simulation arc length waveform is output, the cut waveform S setting device $9b_2$ for setting the cut process waveform S, the fusion interval setting device $9b_5$ for setting an interval during which the fusion waveform T is output, the fusion waveform setting device $9b_6$ for setting the fusion waveform T, the shaped waveform V setting device $9b_9$ for setting the shaped waveform and the like, the waveform synthesizer $9b_{13}$ for synthesizing the set waveforms in order to obtain the simulation arc length, the analog switches $9b_3$, $9b_7$, $9b_{10}$ for controlling the supply of the respective set waveforms to the waveform synthesizer $9b_{13}$, invertor elements $9b_4$, $9b_8$, $9b_{12}$ for controlling the reading of the respective set waveforms, the flip-flop $9b_{11}$ and the AND gate $9b_{14}$ for setting a shaped waveform output interval on the basis of current waveform period $C_B$ signal output timing.

The operation of the welding apparatus thus constructed will subsequently be described. As shown in (a) of FIG. 27, the arc length increases during the process of melting the wire electrode by supplying the arc current and growing the molten lump and the arc length gradually narrows in view of the balance between the wire feed rate and the growth of the molten lump of the wire electrode resulting from the arc current, at the interval during which the molten lump is shaped to reduce the melting volume by restricting the arc current. At a point of time the molten lump is shaped and the arc length shortens, a large arc current is made to flow so as to separate the molten lump grown by means of the electromagnetic pinch force produced then because of the large arc current. The arc length again increases when the molten lump is separated and then the growth-shaping-fusion phenomena of the molten lump repeat.

When arc welding is actually carried out under normal conditions, the variation of the arc length is exhibited as stated above. By presetting the variation of the arc length as the simulation arc length waveform and controlling the arc current supply to maintain the simulation arc length waveform, stable arc welding with an excellent welding bead can be effected.

Figure 28A:
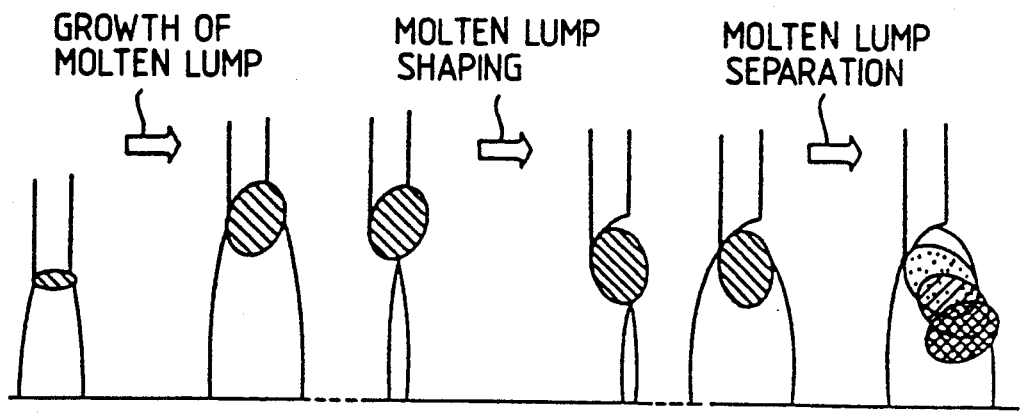
FIG. 28(a) is a diagram illustrating classified welding functions.
Figure 28B:
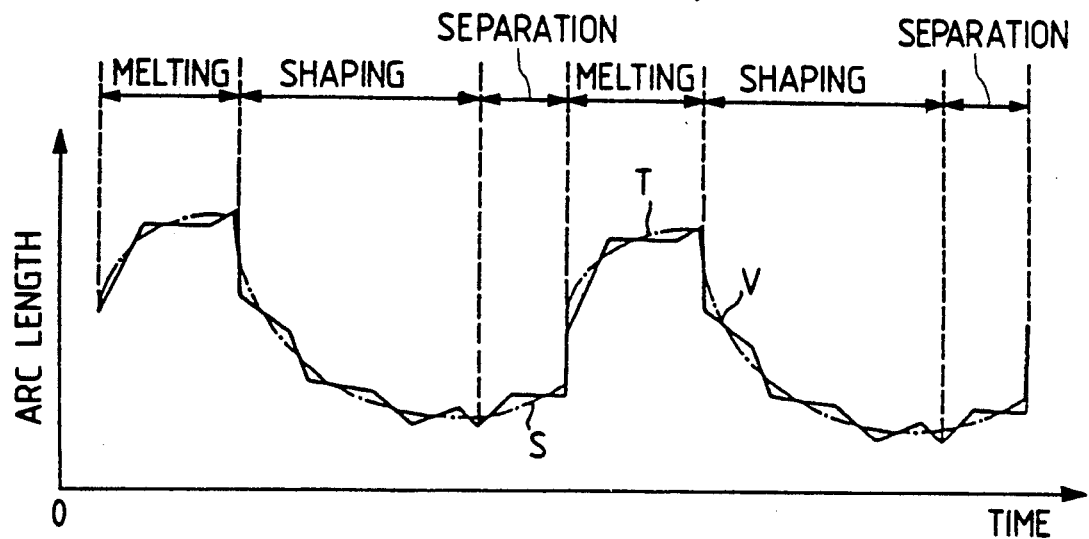
FIG. 28(b) is an arc length waveform chart.
Figure 28C:
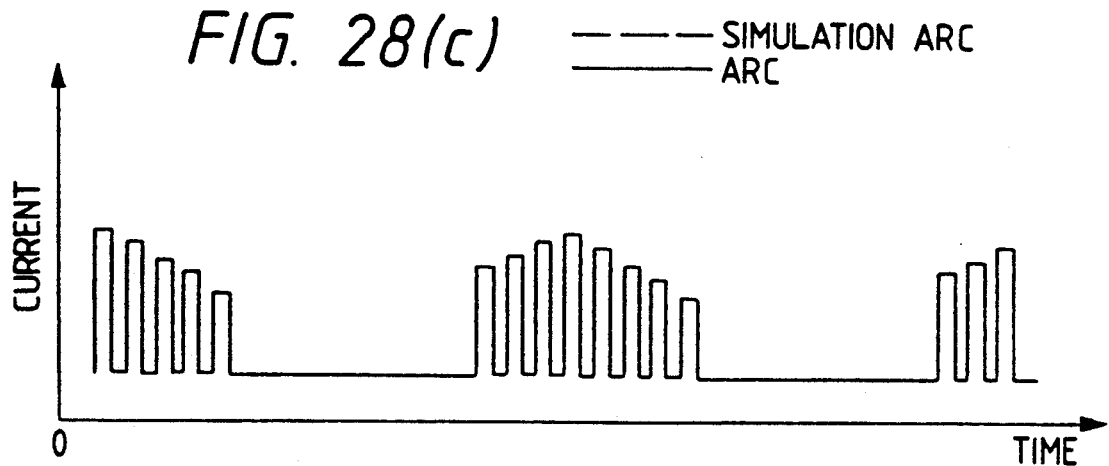
FIG. 28(c) is a simulation current waveform chart.

For that purpose, the current waveform period signal (hereinafter simply called the period signal) $C_B$ set in proportion to the wire feed rate is synchronized at a point of time the signal is applied by the current waveform period $C_B$ setting device 110b to the current waveform setting device 10a and the simulation arc length waveform shown by a broken line in (b) of FIG. 28 is first formed by the arc length setting device 9b. As for the arc length waveform synthesization, the ON signal at 'H' level is applied from the flip-lop $9b_{11}$ to the cut interval setting device $9b_1$ arranged with a timer circuit when the period signal $C_B$ is applied from the current waveform period $C_B$ setting device 10j the SET terminal of the flip-flop $9b_{11}$, and the ON signal at 'H' level is applied to the cut waveform amplifier $9b_2$ and to the analog switch $9b_3$ by an interval corresponding to the cut interval. As a result, cut waveform data S is supplied from the cut waveform setting device $9b_2$ via the analog switch $9b_3$ to the waveform synthesizer $9b_{13}$. Subsequently, when the level of the ON signal output from the out interval setting device $9b_1$ changes to 'L', the output from the invertor element $9b_4$ is inverted to have 'H' level and to become the ON signal of the fusion interval setting device $9b_5$. Consequently, the ON signal at 'H' level is applied to the fusion waveform T setting device $9b_6$ and the analog switch $9b_7$ by an interval corresponding to the fusion interval. Fusion waveform data T is supplied via the analog switch $9b_7$ to the waveform synthesizer $9b_{13}$. When the level of the ON signal changes to 'L' upon the termination of the fusion interval, the output from the invertor element $9b_8$ is inverted to have 'H' level and supplied to the reset terminal of the flip-flop $9b_{11}$, one of the inputs of the AND gate $9b_{15}$ and the shaped waveform setting device $9b_7$. The output from the flip-flop $9b_{11}$ is then inverted to have 'L' level before being supplied to the invertor element $9b_{12}$ connected to the other input of the AND gate $9b_{15}$. The AND gate $9b_{15}$, which has resumed its ON state, turns on the analog switch $9b_{10}$ and supplies waveform shaping data V to the waveform synthesizer $9b_{13}$ to start the synthesization of the simulation arc length waveform. When the period signal $C_B$ is subsequently applied to the SET terminal of the flip-flop $9b_{11}$, the output from the flip-flop $9b_{11}$ is inverted to have 'H' level before being applied to the invertor element $9b_{12}$. The AND gate $9b_{15}$ then turned off and the analog switch $9b_{10}$ is also turned off, so that the waveform shaping data is suspended. As the output from the flip-flop $9b_{11}$ is supplied to the cut interval setting device $9b_1$ accordingly, the cut waveform data is read again. Consequently, the simulation arc length waveform is synthesized at the time of fusion, shaping and cutting each time the period signal $C_B$ is applied and the simulation arc length waveform signal Lo ((c) of FIG. 28) is output.

The comparator A 10a compares the signal level Lo of the arc length waveform with the true arc length L(l) (the portion (c) of FIG. 4 indicated by a continuous line) detected by the arc length detector when the simulation arc length waveform is set as described above and computes the difference signal ($\Delta L(l) = L(l) - Lo$). The difference signal $\Delta L(l)$, together with the simulation current waveform ((c) of FIG. 28) read from the current waveform setting device 110b simultaneously with the period signal $C_B$ output, is applied to the computing element where the peak value i of the pulsating current waveform signal is corrected by means of the relational expression $i = i - A \cdot \Delta L(l)$. The pulse width $\tau$ of the pulsating current waveform signal is otherwise corrected by means of the relational expression $\tau = \tau - B \cdot \Delta L(l)$. The pulsating current waveform signal is corrected as the arc length varies so that welding can be carried out while the preset simulation arc length is held in each welding process, whereas the welding current is obtained so as to correct the variation of the arc length.

In case the cut interval becomes irregular, which causes the molten lump to be unseparated and hence causes the short-circuit between the molten lump and the workpieces 4b as shown in (a) of FIG. 27, the arc length detector 19 is led to output the arc length signal L(l) decreasing in the negative direction. If the set arc length value Lo is used for comparison in the comparator 10a with the arc length signal L(l) as what is to be compared, moreover, the difference signal $\Delta L$ produced from the comparator 10a becomes extremely great. For this reason, the welding current flows as an instantaneously large current if the difference signal $\Delta L$ is applied to the computing element 10m in order to correct the simulation current waveform and to form and output a welding current. As instable welding may be caused thereby, the short-circuit interval signal is applied to the analog switch 10n ((c) of FIG. 27) while the short-circuit interval detector 9a operates ((a), (b) of FIG. 27) and the difference signal to be supplied from the comparator 10a to the computing element 10m intercepted. By suppressing the correction of the current waveform, an excessive welding current is prevented from flowing when the molten lump short-circuits. The welding current formed and output by the simulation current waveform provided with the out-of-arc preventive base current produced by the base current output device 10i and superposed in the adder 10h is applied to the comparator B 10i. In the comparator B 10i, the arc current value detected in the current detector 6 is compared with the reference arc current value and if (the detected arc current value) < (the reference arc current value), the ON signal is applied to the invertor drive circuit 1b and then the pulsed arc current output from the arc welding power supply 1 is supplied between the wire electrode 3 and the workpieces 4b, whereas the operation-off signal is applied to the invertor drive circuit 1b while (the detected arc current value) > (the reference arc current value).

Although a description has been given of the periodic repetition of the plurality of pulse groups (pulse trains) in the embodiment shown, the difference signal $\Delta L$ obtained by comparing the preset simulation arc length in the arc length setting device with the actual arc length detected by the arc length detector may be used to correct the instantaneous current i having a single pulse waveform to $i = i - D \cdot \Delta L$ in effecting welding by periodically repeating the signal pulse.

Moreover, the short-circuit transfer arc welding apparatus for effecting welding by repeating the short-circuit and the arc may replace the pulsed arc welding apparatus in the embodiment shown. In this case, the arc length detector operates only during the arc interval and the comparison between the arc length during the arc interval and the simulation arc length is utilized to correct the instantaneous current i at the arc interval to $i = i - D \cdot \Delta L$ according to the difference signal $\Delta L$, whereby the same effect in the embodiment shown is achieved.

Figure 29A:
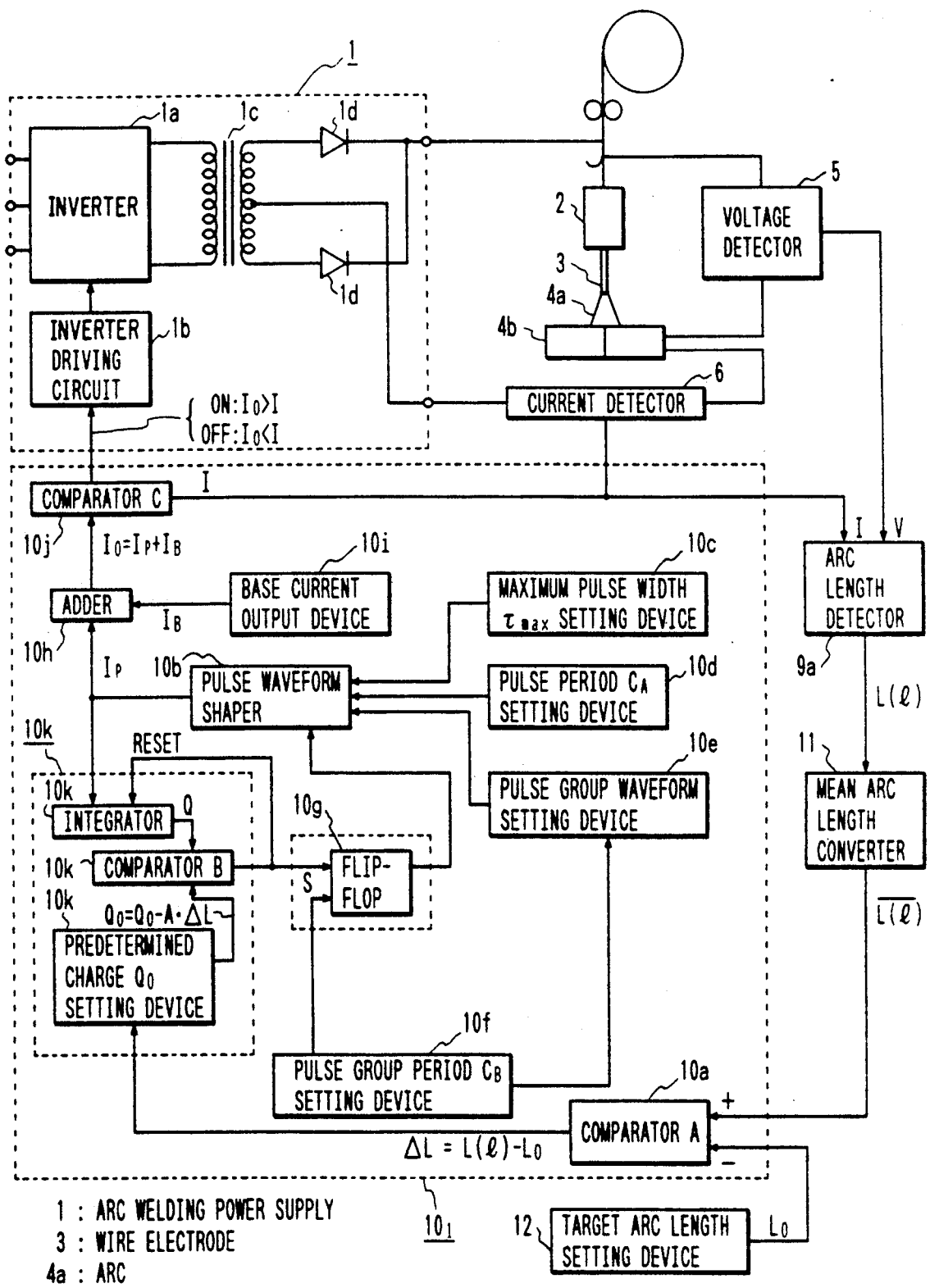
FIG. 29(a) is an overall block diagram of a pulsed arc welding apparatus embodying a twelfth aspect in the invention.

FIG. 29(a) is an overall block diagram of a pulsed arc welding apparatus embodying a twelfth aspect in the invention. In FIG. 29(a), like reference characters designate like or corresponding parts of FIG. 25. In FIG. 29(a), the apparatus comprises a mean arc length convertor 11 for outputting a mean arc length signal $\overline{L}(l)$ for obtaining the arc length which momentarily varies according to the arc length signal L(l), a target arc length setting device 12 for setting a target arc length Lo, and a pulsating current waveform control circuit $10_1$ for forming a pulsating current and for controlling the output thereof. The pulsating current waveform control circuit further comprises the comparator A 10a for comparing the mean arc length $\overline{L}(l)$ with the target arc length Lo so as to output the difference signal $\Delta L$ ($= \overline{L}(l) - Lo$), a pulse waveform shaper 10b for shaping a pulsating current group waveform and for outputting a group of pulsating currents $I_P$ constituting an arc current, a maximum pulse width $\tau_{max}$ setting device 10c for setting the maximum pulse width $\tau_{max}$ of each of the single pulses constituting the group of pulsating currents $I_P$, a pulse period $C_A$ setting device 10d for setting each pulse output period $C_A$, a pulse group waveform setting device 10e for setting a pulsating current group waveform, a pulse group period $C_B$ setting device 10f for setting the output period $C_B$ of the pulsating current, a pulse group interval X setting device 10g for controlling a pulsating current output so as to set the power supply interval of the group of pulsating currents, an adder 10h for superposing the base current $I_B$ produced by a base current output device 10i on the group of pulsating currents $I_P$ produced, a comparator C 10j for comparing the pulsating current Io ($= I_P + I_B$) to be output with the arc current I detected by the current detector 6 so as to control the ON-OFF state of the invertor drive circuit 1b according to the result of comparison, and a pulse group charge amount setting unit $10k$ for setting the charge amount, i.e., pulse width, of the group of pulsating currents $I_P$ to be supplied. The charge amount setting unit $10k$ further comprises an integrator $10k_1$ for obtaining the charge amount Q of the group of pulsating currents to be supplied, a predetermined charge Qo setting device $10k_2$ for presetting the charge amount Qo ($=$Qo$-$A·$\Delta$L where A$=$proportionality factor) of the group of pulsating currents to be supplied according to the difference signal $\Delta$L produced by the comparator $10a$, and a comparator B $10k_3$ for applying a reset signal to the pulse group interval X setting device $10g$ and to the integrator $10k_1$ when the charge amount Q thus obtained reaches the predetermined charge amount Qo so as to suspend the power supply to the group of pulsating currents $I_P$ with a predetermined pulse width.

With the arrangement stated above, the operation will be described with reference to a waveform chart of FIG. 30(a).

The mean arc length varies with the deflection of the welding torch, the thermal distortion of the workpieces or the thrusting up of the molten lump due to the variation of the pulse group width of the group of pulsating currents. For this reason, it is necessary to control the amount of arc current to be supplied and melting amount of the molten lump so as to suppress the variation of the mean arc length resulting from the nonconformity of the molten lump and to make the mean arc length constant.

Therefore, the arc length detector 19 detects the true arc length varying as the welding process proceeds (cutting, melting, shaping and cutting of the molten lump) in accordance with the arc voltage V and the arc current I detected by the voltage detector 5 and the current detector 6 and from time to time applies the arc length signal L(l) to the mean arc convertor 11. The mean arc length convertor 11 forms the mean value (mean arc length) $\bar{L}$(l) of the true arc lengths received in the respective welding processes and supplies the mean value to the comparator A $10a$. The mean arc length $\bar{L}$(l) thus formed is compared with the target mean arc length (target arc length) Lo set by the target arc length setting device 12 in the comparator A $10a$, which outputs the difference signal $\Delta$L corresponding the difference ($\bar{L}$(l)$-$Lo) therebetween.

Consequently, the pulse charge amount setting unit $10k$ causes the predetermined charge amount Qo setting device $10k_2$ to set the charge amount Qo of the group of pulsating currents to be supplied according to the difference signal $\Delta$L and supplies the amount thus set to the comparator $10k_3$ as data for comparison. After the single maximum pulse width $\tau_{max}$ constituting the group of pulsating currents $I_P$ is set in the maximum pulse width $\tau_{max}$ setting device $10c$, after the output period $C_A$ of each single pulse is set in the pulse period $C_A$ setting device $10d$ and after the pulse group waveform is set in the pulse group waveform setting device $10e$, the group of pulsating currents $I_P$ to be supplied as the arc current are shaped into a predetermined pulse group waveform in the pulse waveform shaper $10b$ on the basis of the values thus set.

The group of pulsating currents $I_P$ having the predetermined pulse group waveform are subsequently supplied from the pulse waveform shaper $10b$ to the adder $10h$ and the integrator $10k_1$ of the pulse charge amount setting device $10k$ synchronously with the pulse group period $C_B$ signal ((c) of FIG. 30(a)) from the pulse period group $C_B$ setting device $10f$. The adder $10h$ receives a base current $I_B$ as a minimum arc maintenance current for preventing out-of-arc from the base current output device $10i$ and superposes the current on the pulsating current $I_P$ ((a) of FIG. 30(a)) and applies the resulting current to the comparator C $10j$ as the arc current Io ($=I_P+I_B$). By integrating each single pulse of the group of pulsating currents $I_P$, on the other hand, the integrator $10k_1$ supplies the pulsating current group charge amount Q ((b) of FIG. 30(a)) to the comparator $10k_3$ while raising its output level in line with the variation of the pulsating current supply time. The predetermined charge amount Qo ($=$Qo$-$A·$\Delta$L where A$=$proportionality factor) of the pulsating current to be supplied is set by the predetermined charge amount Qo setting device $10k_2$ and supplied to the comparator B $10k_3$ according to the difference signal $\Delta$L. When the pulse charge amount Q consequently reaches the predetermined charge amount Qo, the reset signal ((d) of FIG. 2(a)) is applied from the comparator B $10k_3$ to the integrator $10k_1$ so as to suspend the integral operation and also to the flip-flop forming the pulse group interval X setting device $10g$, so that an output suspension signal is applied to the pulse waveform shaper $10b$. As a result, the group of pulsating currents $I_P$ output from the pulse waveform shaper $10b$ are made to have the pulse width ((a) of FIG. 30(a)) for determining the predetermined charge amount and supplied to the adder $10f$ where the base current $I_B$ is superposed thereon. The arc current Io ($=I_P+I_B$) thus formed is applied to the comparator C $10j$. The comparator C $10j$ compares the detected arc current value I with the Io thus formed and if Io$>$I, an ON signal is applied to the invertor drive circuit $1b$ so as to supply the arc current from the arc welding power supply 1 to the welder proper, whereas if Io$<$I, the comparator receives an OFF signal and suspends arc current supply.

Figure 29B:
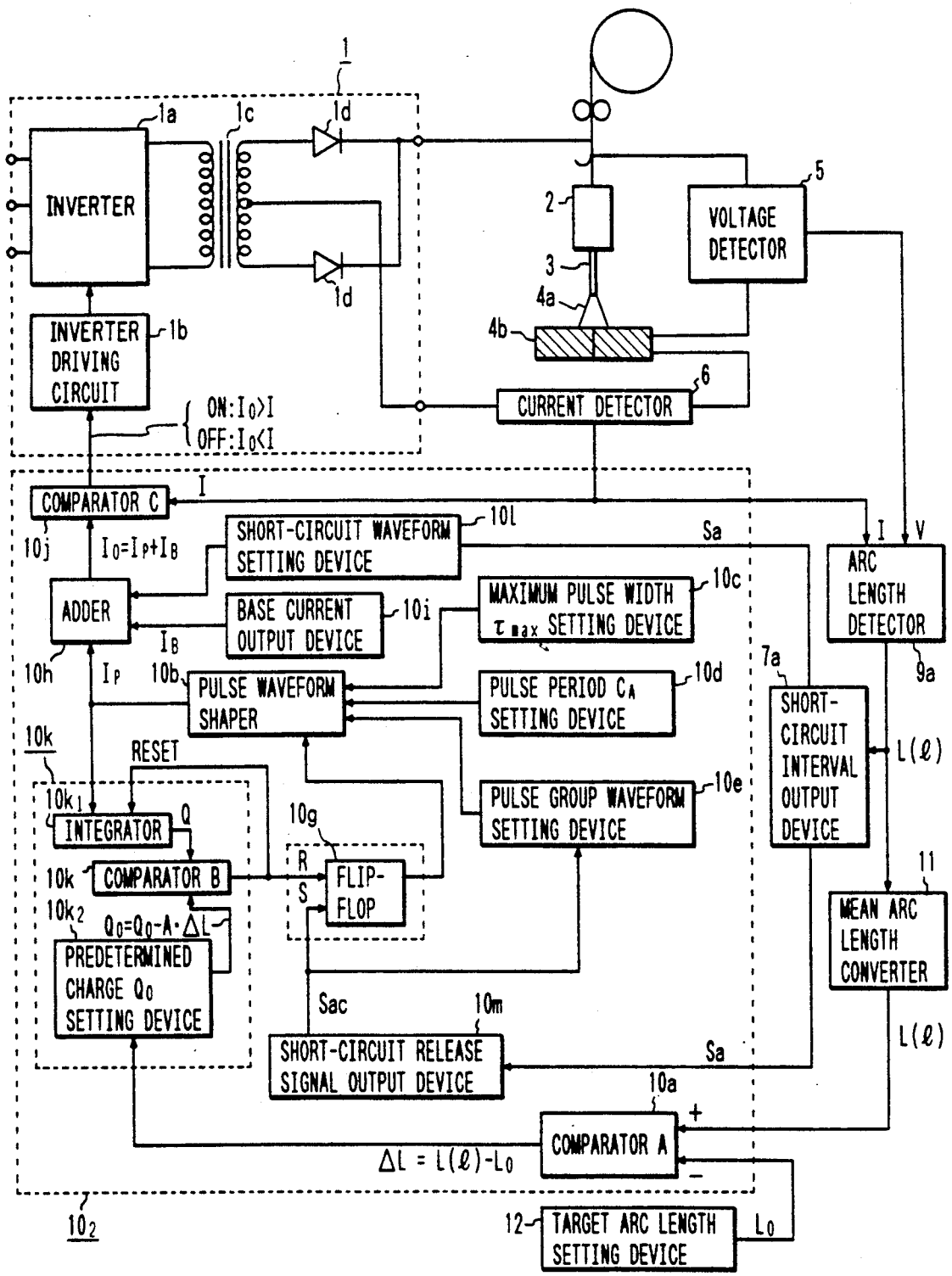
FIG. 29(b) is an overall block diagram of a short-circuit transfer type pulsed arc welding apparatus embodying a thirteenth aspect in the invention.

A description will subsequently given of a case where control over the charge amount of the group of pulsating currents $I_P$ is applied to the short-circuit transfer type arc welding apparatus embodying the thirteenth aspect in the invention with reference to FIGS. 29(b) and 30(b). FIG. 29(b) is an overall block diagram of a shirt-circuit transfer type arc welding apparatus, wherein like reference characters designate like or corresponding pars of FIG. 29(a). As shown in FIG. 29(b), the welding apparatus includes a short-circuit interval output device $9a$ for outputting a short-circuit detection signal Sa upon detection of the short-circuit interval of the molten lump, a short-circuit release signal output device $10p$ for setting the output at 'L' while receiving the short-circuit detection signal Sa and for outputting a short-circuit release signal Sac at 'H' level at the time of loosing the short-circuit detection signal Sa, and a short-circuit waveform setting device $10l$ for setting the arc current waveform to be supplied to the short-circuit molten lump at the time of receiving the arc current waveform so as to supply the set waveform to the adder $10h$.

With the arrangement stated above, the operation of the short-circuit transfer type arc welding apparatus will be described with reference to a waveform chart of FIG. 30(b). The short-circuit interval output device $9a$ applies to the short-circuit release signal output device $10a$ and the short-circuit waveform setting device 10L, the short-circuit detection signal Sa to be output as a 'H' level signal during the time the molten lump short-circuits in accordance with the sharp decrease of the arc length level of the arc length signal L(l). Then the short-circuit waveform setting device 10L applies to the adder 10h, a short-circuit current waveform Is having an optimum current rise waveform so that the molten lump formed at the tip of the wire electrode may be transferred smoothly (while the short-circuit interval signal is at 'H' level) to the workpieces as it short-circuits with respect thereto ((a) of FIG. 30(b)). On the other hand, the short-circuit release signal output device 10p for receiving the short-circuit interval signal Sa keeps applying a short-circuit release signal Sac to the pulsating current group interval setting device 10g and the pulse waveform setting device 10e while the short-circuit interval signal Sa rises from 'H' to 'L' level. Consequently, the pulsating current waveform shaper 10b will not operate during the short-circuit interval and when the short-circuit is released, the pulsating current waveform shaper 10b is operated by the short-circuit release signal Sac and supplies the pulse waveform to the adder 10h. When the short-circuit release signal Sac ((c) of FIG. 30(b)) is produced from the short-circuit release signal output device 10p as the short-circuit state is released, the group of pulsating currents $I_P$ having the predetermined pulse group waveform are supplied from the pulse waveform shaper 10b to the adder 10h and the integrator $10k_1$ of the pulse charge amount setting unit 10k. The adder 10h receives the base current $I_B$ as a minimum arc maintenance current for preventing out-of-arc from the base current output device 10i and superposes the current on the pulsating current $I_P$ ((a) of FIG. 2(b)) and applies the resulting current to the comparator C 10j as the arc current Io ($=I_P+I_B$). By integrating each single pulse of the group of pulsating currents $I_P$, on the other hand, the integrator $10k_1$ supplies the pulsating current group charge amount Q ((b) of FIG. 30(b)) to the comparator B $10k_3$ while raising its output level in line with the variation of the pulsating current supply time. The predetermined charge amount Qo ($=Qo-A\cdot\Delta L$ where A=proportionality factor) of the pulsating current to be supplied is set by the predetermined charge amount Qo setting device $10k_2$ and supplied to the comparator B $10k_3$ according to the difference signal $\Delta L$. When the pulse charge amount Q consequently reaches the predetermined charge amount Qo, the reset signal ((d) of FIG. 30(b)) is applied from the comparator B $10k_3$ to the integrator $10k_1$ so as to suspend the integral operation and also to the flip-flop forming the pulse group interval X setting device 10g, thus causing the application of an output suspension signal to the pulse waveform shaper 10b. As a result, the group of pulsating currents $I_P$ output from the pulse waveform shaper 10b are made to have the pulse width ((a) of FIG. 30(b)) for determining the predetermined charge amount and supplied to the adder 10f where the base current $I_B$ is superposed thereon to become the arc current Io ($=I_P+I_B$). When the welding current is supplied to the wire electrode 3 in accordance with the arc current Io again, the molten lump at the tip of the wire electrode 3 grows and short-circuits with the workpieces 4b again. The short-circuit current Is employed during the short-circuit interval to carry out welding by transferring the molten lump to the workpieces. Moreover, the short-circuit interval output device 9a supplies the short-circuit interval signal Sa to the short-circuit release signal output device 10p at this time and when the short-circuit interval signal Sa turns to have 'L' level, the short-circuit release signal Sac is output.

Figure 31:
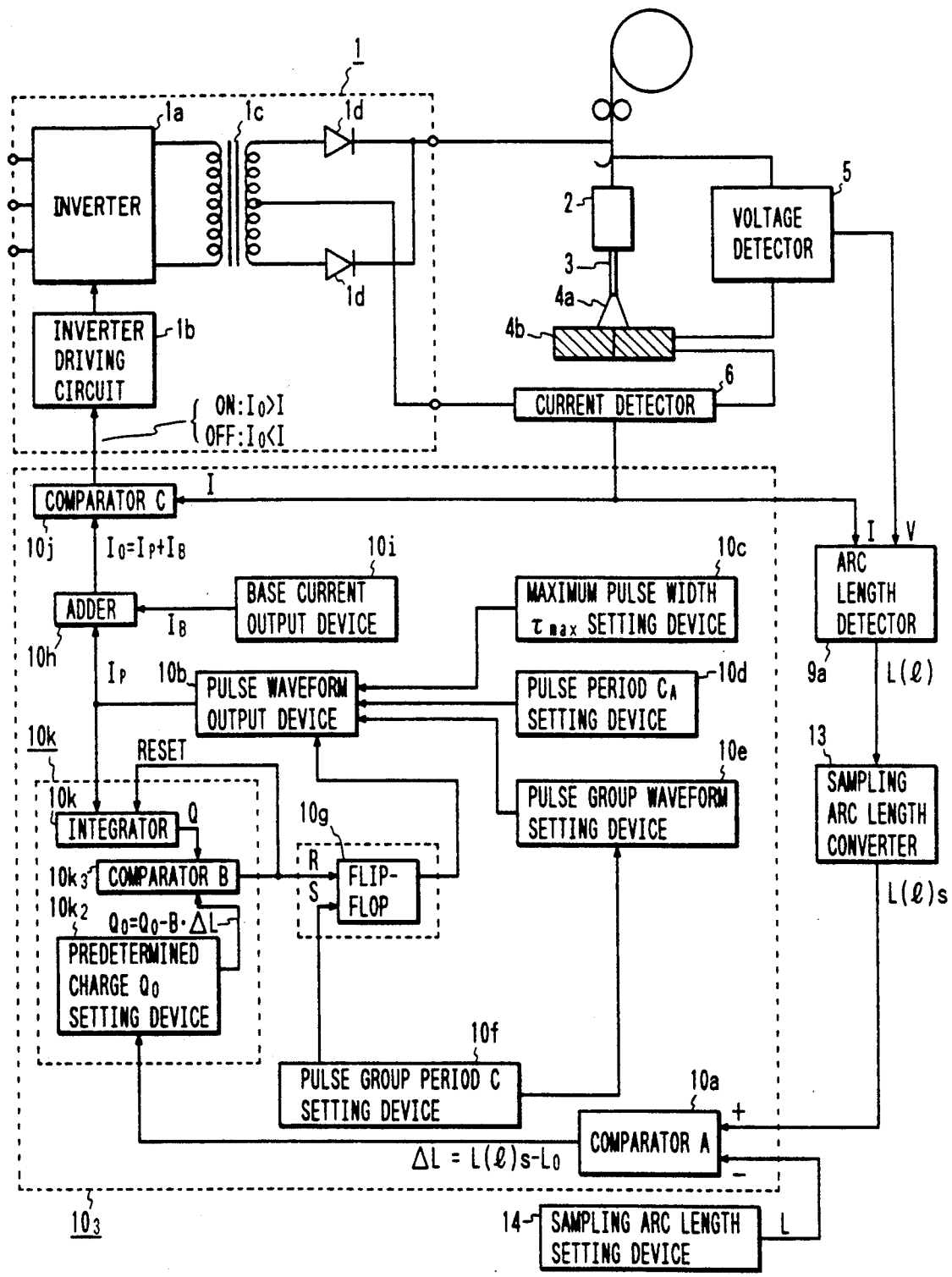
FIG. 31 is an overall block diagram of a pulsed arc welding apparatus embodying a fourteenth aspect in the invention.

According to the twelfth aspect in the invention, there has been shown the method of controlling the charge amount of the group of pulsating currents to be supplied in accordance with the variation of the mean arc length after obtaining the mean value of the varying arc length. As shown in the tenth aspect in the invention of FIG. 31, an arc signal at specific time is sampled in a sampling arc length convertor 13 and the arc length L(l)S thus sampled is compared with the target sampling arc length Lo set by a target sampling arc length setting device 14 at specific time. The same effect is accordingly achievable by controlling the time during which the group of pulsating currents are supplied according to the difference signal $\Delta L(=L(l)S-Lo)$.

As a fourteenth aspect in the invention is similar in operation to the ninth aspect in the invention except for what is compared to detect the variation of the arc length, the description of its operation will be omitted.

Although the signal applied to the integrator $10k_1$ of the pulse charge amount setting unit 10k was set as $I_P$ in the twelfth to fourteenth aspects in the invention, it may be Io as the output from the adder 10h or the signal I detected by the current detector 6. Moreover, there may be provided a means for limiting the signal to what is effective only during the arc interval.

Figure 32:
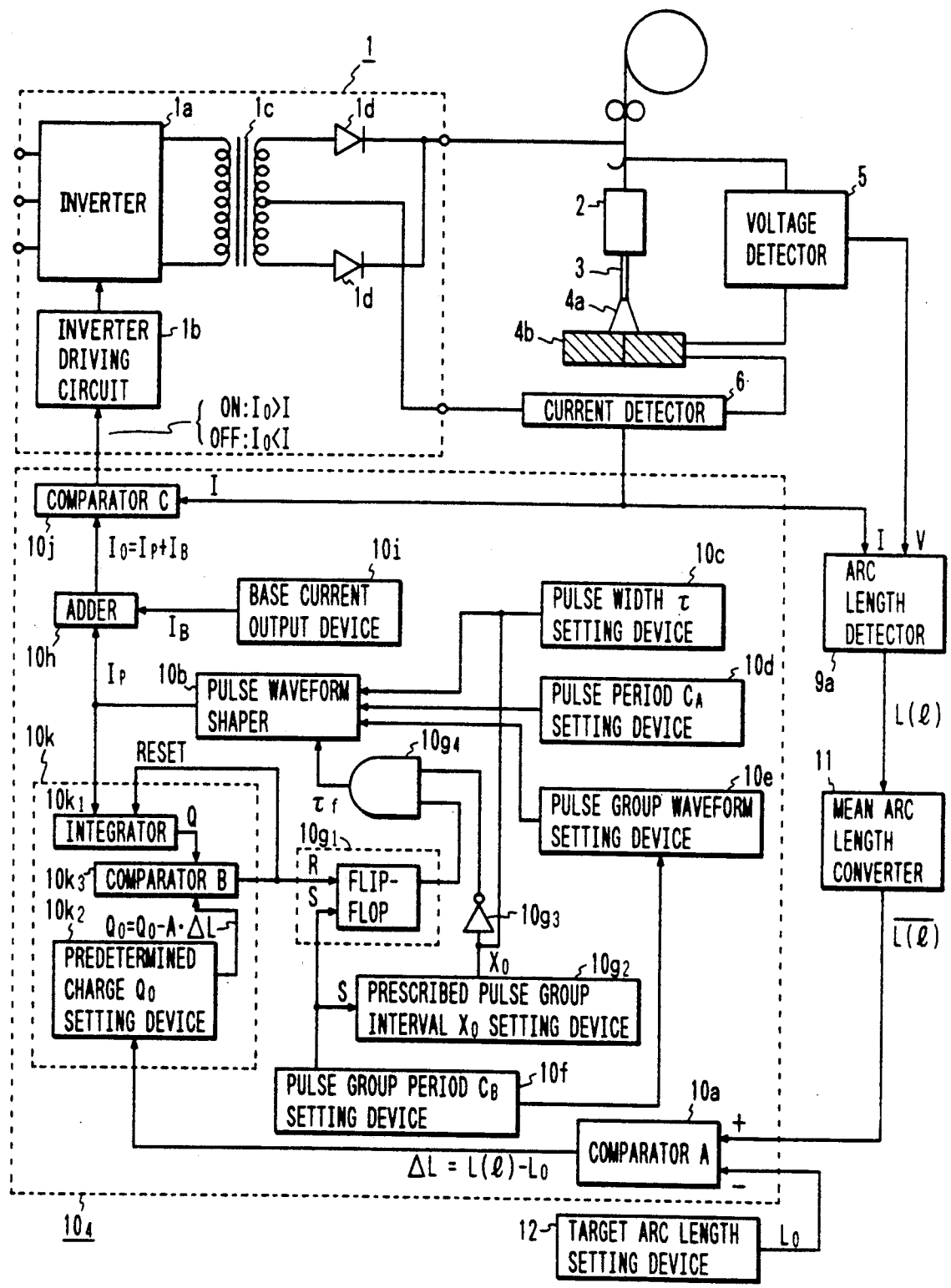
FIG. 32 is an overall block diagram of a pulsed arc welding apparatus embodying fifteenth aspect in the invention.

FIG. 32 is an overall block diagram of a pulsed arc welding apparatus embodying a fifteenth aspect in the invention. In FIG. 32, like reference characters designate like or corresponding parts of FIG. 29. Numeral $10_{10}$ denotes the pulsating current waveform control circuit comprises the comparator A 10a for comparing the mean arc length $\overline{L}(l)$ with the target arc length Lo so as to output a difference signal $\Delta L$ ($=\overline{L}(l)-Lo$), the pulse waveform shaper 10b for shaping the pulsating current group waveform and for outputting the group of pulsating currents $I_P$ constituting the arc current, the pulse width $\tau$ setting device 10c for setting the pulse width $\tau$ of the single pulses constituting the group of pulsating currents $I_P$, the pulse period $C_A$ setting device 10d for setting each pulse output period $C_A$, the pulse group waveform setting device 10e for setting a pulsating current group waveform, the pulse group period $C_B$ setting device 10f for setting the Output period $C_B$ of the pulsating current, a pulse group interval X setting device $10g_1$ for controlling a pulsating current output so as to set the power supply interval of the group of pulsating currents, the device being formed with a flip-flop (hereinafter simply called F/F), a prescribed pulse group interval xo setting device $10g_2$ for setting the output interval of the group of pulsating currents composed of the prescribed number of pulses, an invertor element $10g_3$, an AND gate $10g_4$ for controlling the pulse waveform shaper 10b in terms of the pulse output control other than the prescribed pulse group interval xo by means of these logical elements, the adder 10h for superposing the base current $I_B$ produced by a base current output device 10i on the group of pulsating currents $I_P$ produced, the comparator C 10j for comparing the pulsating current Io ($=I_P+I_B$) to be output with the arc current I detected by the current detector 6 so as to control the ON-OFF state of the invertor drive circuit 1b according to the result of comparison, and the pulse group charge amount setting unit 10k for setting the charge amount, i.e., pulse width, of the group of pulsating currents $I_P$ to be supplied. The charge amount setting unit 10k further comprises the integrator $10k_1$ for obtaining the charge amount Q of the group of pulsating currents to be supplied, the predetermined charge Qo setting device $10k_2$ for presetting the charge amount Qo ($=Qo-A\cdot\Delta L$ where $A=$ proportionality factor) of the group of pulsating currents to be supplied according to the difference signal $\Delta L$ produced by the comparator $10a$, and the comparator B $10k_3$ for applying a reset signal to the pulse group interval X setting device $10g$ and the integrator $10k_1$ when the charge amount Q thus obtained reaches the predetermined charge amount Qo so as to suspend the power supply to the group of pulsating currents $I_P$ with a predetermined pulse width.

Figure 33:
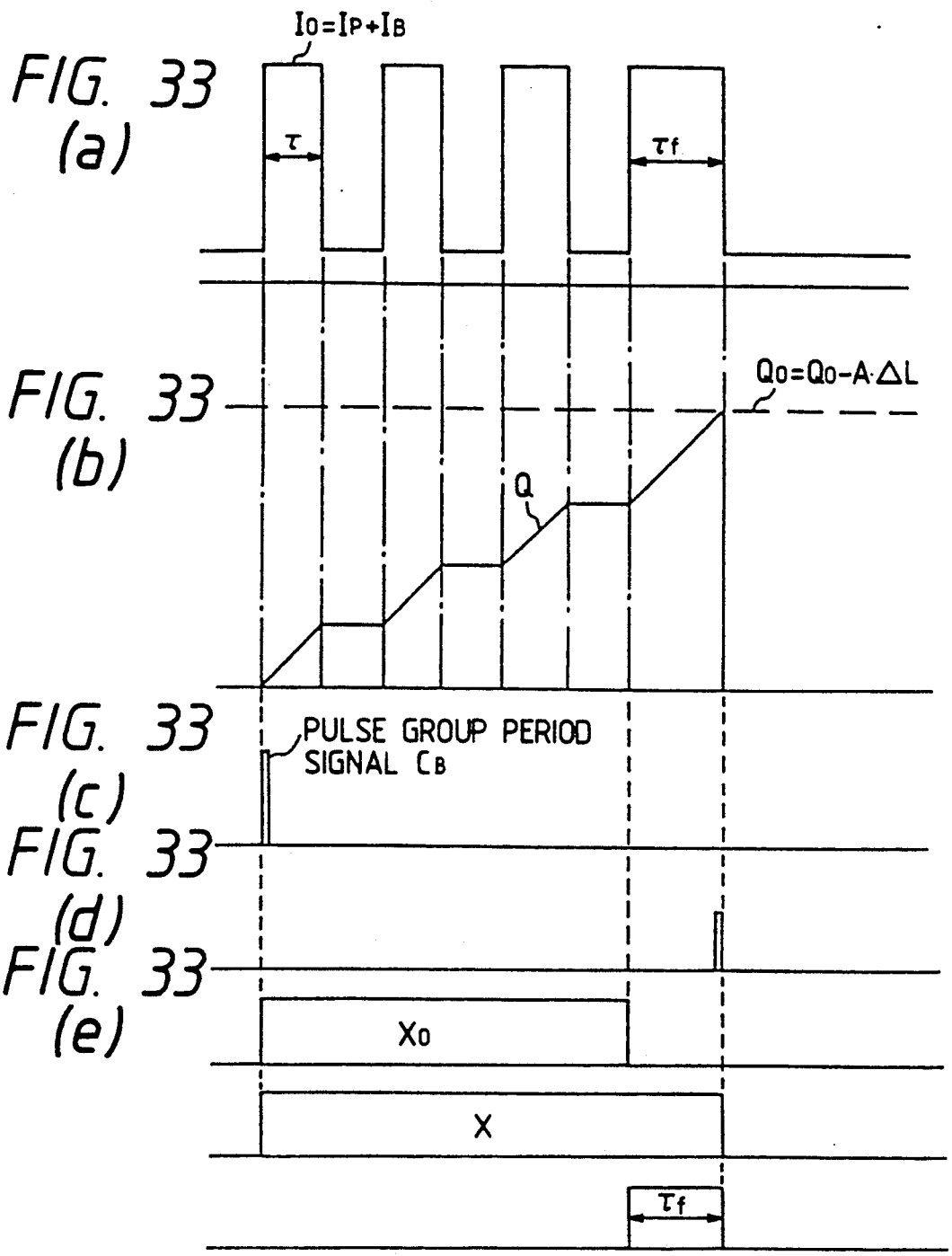
FIGS. 33(a)-33(e) are a signal waveform chart explanatory of the operation of the apparatus embodying the fifteenth aspect in the invention.

With the arrangement stated above, the operation will be described with reference to a waveform chart of FIG. 33.

The mean arc length varies with the deflection of the welding torch, the thermal distortion of the workpieces or the thrusting up of the molten lump due to the variation of the pulse group width of the group of pulsating currents. For this reason, it is necessary to control the amount of arc current to be supplied and melting amount of the molten lump so as to suppress the variation of the mean arc length resulting from the nonconformity of the molten lump and to make the mean arc length constant.

Therefore, the arc length detector 19 detects the true arc length varying as the welding process proceeds (cutting, melting, shaping and cutting of the molten lump) in accordance with the arc voltage V and the arc current I detected by the voltage detector 5 and the current detector 6 and from time to time applies the arc length signal L(l) to the mean arc length convertor 11. The mean arc length convertor 11 forms the mean value (mean arc length) $\overline{L}(l)$ of the true arc lengths received in the respective welding processes and supplies the mean value to the comparator A $10a$. The mean arc length $\overline{L}(l)$ thus formed is compared with the target mean arc length (target arc length) Lo set by the target arc length setting device 12 in the comparator A $10a$, which outputs the difference signal $\Delta L$ corresponding the difference ($\overline{L}(l)-$Lo) therebetween.

Consequently, the pulse charge amount setting unit $10k$ causes the predetermined charge amount Qo setting device $10k_2$ to set the charge amount Qo of the group of pulsating currents to be supplied according to the difference signal $\Delta L$ and supplies the amount thus set to the comparator $10k_3$ as data for comparison. On the other hand, the group of pulsating currents $I_P$ causes the pulse width $\tau$ setting device $10c$ to set the single pulse width forming the group of pulsating currents, the pulse period $C_A$ setting device $10e$ to set the output period $C_A$ of each single pulse, further the pulse group waveform setting device $10e$ to set the pulse group waveform, and the prescribed pulse group interval xo setting device $10g_2$ to set the output interval of the single pulse having the width set by the pulse width setting device $10c$ so as to apply the set signal to the pulse width $\tau$ setting device $10c$. After each set element is determined in each setting device as described above, the pulse group period $C_B$ signal ((c) of FIG. 33) is output from the pulse group period $C_B$ setting device $10f$. The set signal S is then applied to the F/F forming the pulse group interval x setting device $10g_1$ and the prescribed pulse group interval xo setting device $10g_2$ synchronously with the signal stated above. As a result, while the set interval signal xo applied from the prescribed pulse group interval xo setting device $10g_2$ remains at 'H' level ((e) of FIG. 33), the pulse waveform shaper $10b$ applies the group of pulsating currents Io with pulse width $\tau$ and pulse synchronization $C_A$ to the adder $10h$ and the integrator $10k_1$ of the pulse charge amount setting unit $10k$. The adder $10h$ receives the base current $I_B$ as a minimum arc maintenance current for preventing out-of-arc from the base current output device $10i$ and superposes the current on the pulsating current $I_P$ ((a) of FIG. 33) and applies the resulting current to the comparator C $10j$ as the arc current Io ($=I_P+I_B$). By integrating each single pulse of the group of pulsating currents $I_P$, on the other hand, the integrator $10k_1$ supplies the pulsating current group charge amount Q ((b) of FIG. 33) to the comparator $10k_3$ while raising its output level in line with the variation of the pulsating current supply time. The predetermined charge amount Qo ($=Qo-A\cdot\Delta L$ where A $=$ proportionality factor) of the pulsating current to be supplied is set by the predetermined charge amount Qo setting device $10k_2$ and supplied to the comparator B $10k_3$ according to the difference signal $\Delta L$. When the charge amount of the group of pulsating currents supplied during the prescribed pulse group interval xo is smaller than the charge amount set by the pulse group charge amount setting device $10k$, the pulsating current has to be kept being supplied in order to make the mean arc length approximate to the target arc length.

To supply the pulsating current continuously, the interval setting signal xo that has turned to have 'L' level, together with the 'H' output of the F/F, is applied via the invertor element $10g_3$ to the AND gate $10g_4$. On receiving the output $\tau f$ ((g) of FIG. 33) of the AND gate, the pulse waveform shaper $10b$ supplies a stepped arc current at the pulsating current level to the adder $10h$ and the integrator $10k_1$. When the pulse charge amount Q consequently reaches the predetermined charge amount Qo, the reset signal ((d) of FIG. 33) is applied from the comparator B $10k_3$ to the integrator $10k_1$ so as to suspend the integral operation and also to the F/F forming the pulse group interval X setting device $10g$, so that the output suspension signal is applied to the pulse waveform shaper $10b$. As a result, the group of pulsating currents $I_P$ output from the pulse waveform shaper $10b$ are extended to have the pulse width $\tau f$ ($\tau f$ shown in (a) of FIG. 33) conforming to the predetermined charge amount and supplied to the adder $10f$ where the base current $I_B$ is superposed thereon. The arc current Io ($=I_P+I_B$) thus formed is applied to the comparator C $10j$. The comparator C $10j$ compares the detected arc current value I with the Io thus formed and if Io $>$I, an ON signal is applied to the invertor drive circuit $1b$ so as to supply the arc current from the arc welding power supply 1 to the welder proper, whereas if Io $<$I, the comparator receives an OFF signal and suspends arc current supply.

Figure 34:
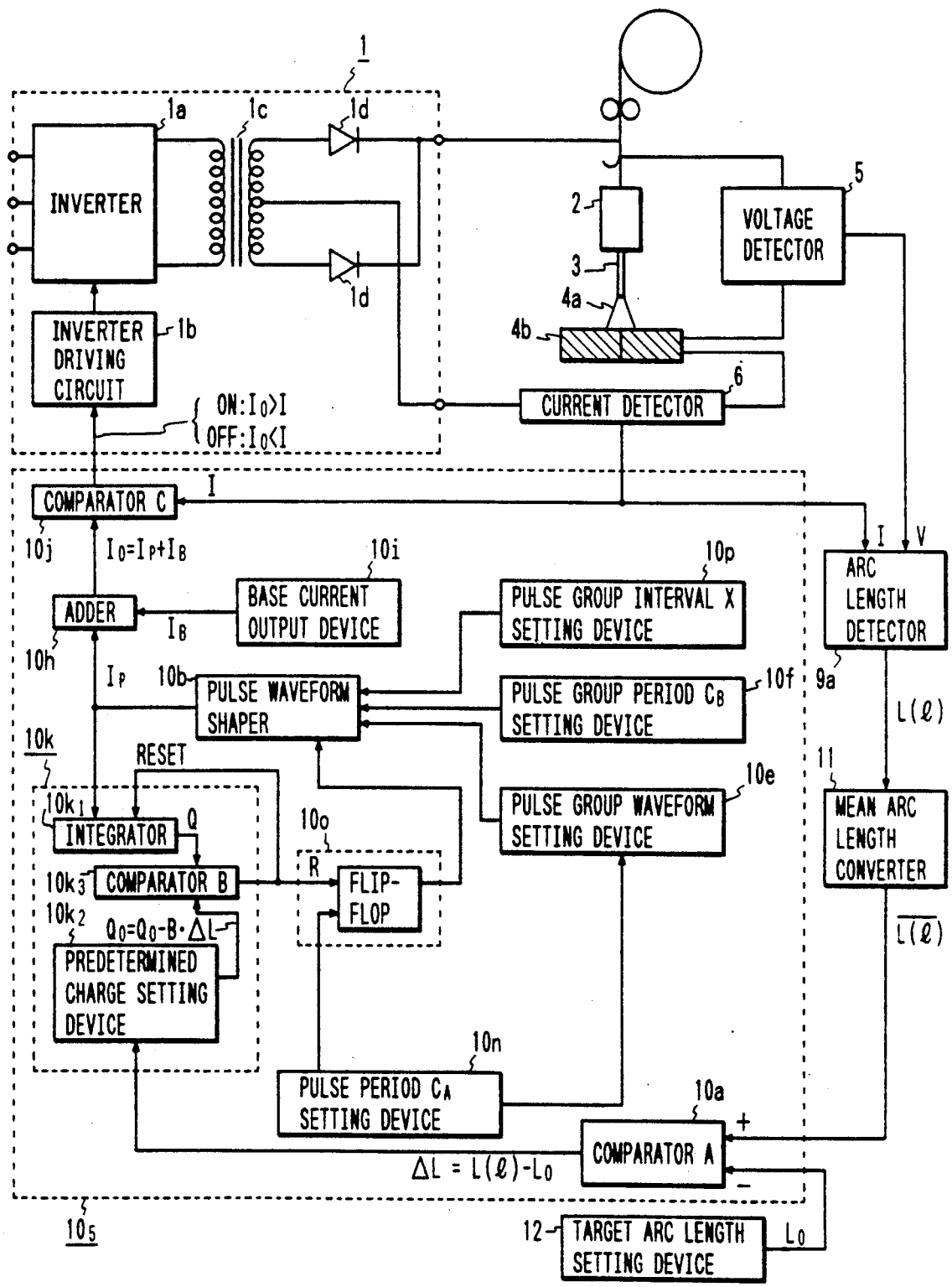
FIG. 34 is an overall block diagram of another pulsed arc welding apparatus embodying fifteenth aspect in the invention.

In the embodiment shown, the ultimate single pulse width in the group of pulsating currents $I_P$ is extended to make the charge amount of the group of pulsating currents $I_P$ coincide with the set pulse group current charge amount value. However, as shown in a signal waveform chart of FIG. 35, the width of each unit pulse produced with each pulse period $C_A$ in the group of pulsating currents may be extended to increase the overall width so as to let the charge amount of the group of pulsating currents $I_P$ coincide with the set charge amount. FIG. 34 shows a pulsed arc welding apparatus embodying a sixteenth aspect in the invention to which the aforementioned charge amount control method is applied. As shown in FIG. 34, the welding apparatus includes a pulse period $C_A$ setting device $10n$ for setting the output period $C_A$ of a single pulse in the group of pulsating currents, a pulse width setting device 10g setting the pulse width of the signal pulse, and a pulse group interval setting device 10q for setting the output interval x of the group of pulsating currents, wherein like reference characters designate like or corresponding parts of FIG. 32 with the omission of the detailed description thereof.

With the arrangement stated above, the operation will subsequently be described with reference to a signal waveform chart of FIG. 35.

The pulse waveform shaper 10b causes the pulse group interval x setting device 10q set the output interval x of the group of pulsating currents, the pulse group period $C_B$ setting device 10f to set the output period $C_B$ of the group of pulsating currents, and the pulse group waveform setting device 10e. When the pulse period signal CA ((c) of FIG. 35) is applied from the pulse period CA setting device 10d to the set terminal of the pulse width setting device 10m formed with F/F and the pulse group waveform setting device 10e after each of the aforementioned elements is set, the pulse waveform shaper 10b applies the high level signal of the single pulse set by the pulse group waveform setting device 10e to the adder 10h and the integrator $10k_1$ of the pulse group charge amount setting device 10k and holds the signal therein while the output ((e) of FIG. 35) of the F/F 10p remains at 'H' level. The high level signal is subjected to the integration process in the integrator $10k_1$ before being applied to the comparator $10k_3$ as the charge amount Q. The comparator $10k_3$ holds the predetermined charge amount Qo set by the predetermined charge amount setting device $10k_2$ and when the charge amount Q reaches the predetermined charge amount Qo ((b) of FIG. 35), applies the reset signal ((d) of FIG. 35) to the F/F 10p to invert the output ((e) of FIG. 35) directed to the pulse waveform shaper 10b to let it have 'L' level. As a result, the pulse waveform shaper 10b intercepts the high level signal being output and dorms a single pulsating current corresponding to the predetermined charge amount Qo. After the single pulsating current is formed, the base current is output as the arc current until the next pulse period signal $C_A$ is output. By controlling the pulse width of the pulsating current output from the pulse waveform shaper 10b each time the pulse period signal $C_A$ is output as stated above, the group of pulsating currents having the charge amount corresponding to the set pulse group charge amount value can be supplied as the arc current.

Figure 36:
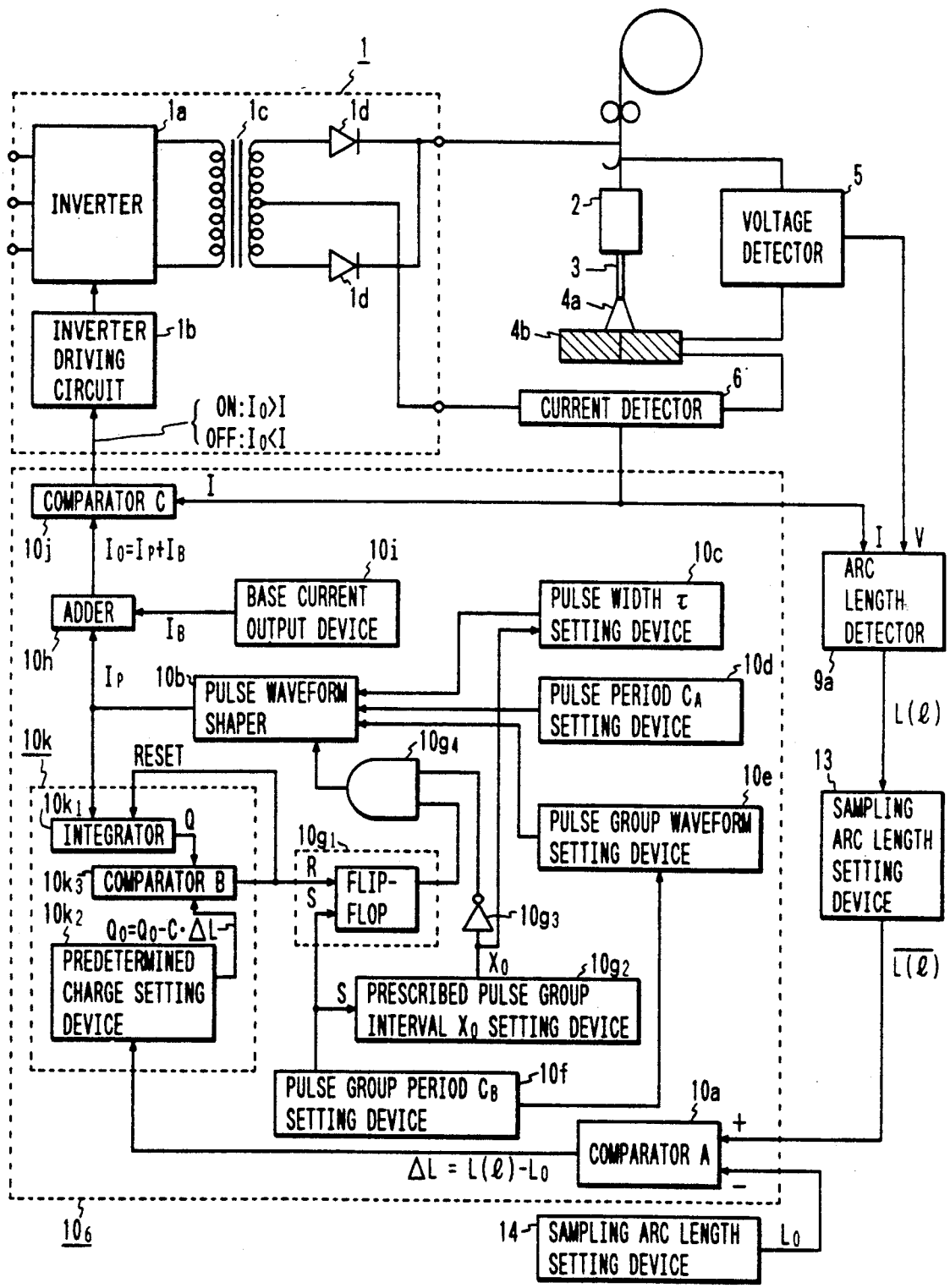
FIG. 36 is an overall block diagram of a pulsed arc welding apparatus embodying sixteenth aspect in the invention.

According to the fifteenth aspect in the invention, there has been shown the method of controlling the charge amount of the group of pulsating currents to be supplied in accordance with the variation of the mean arc length after obtaining the mean value of the varying arc length. As shown in the sixteenth aspect in the invention of FIG. 36, the arc signal at specific time is sampled in the sampling arc length convertor 13 and the arc length L(l)S thus sampled is compared with the target sampling arc length Lo set by the target sampling arc length setting device 19 at specific time. The same effect is accordingly achievable by controlling the pulse width of the group of pulsating currents likewise according to the difference signal $\Delta L(=L(l)S-Lo)$.

As a sixteenth aspect in the invention is similar in operation to the fifteenth aspect in the invention except for what is compared to detect the variation of the arc length, the description of its operation will be omitted.

Figure 37:
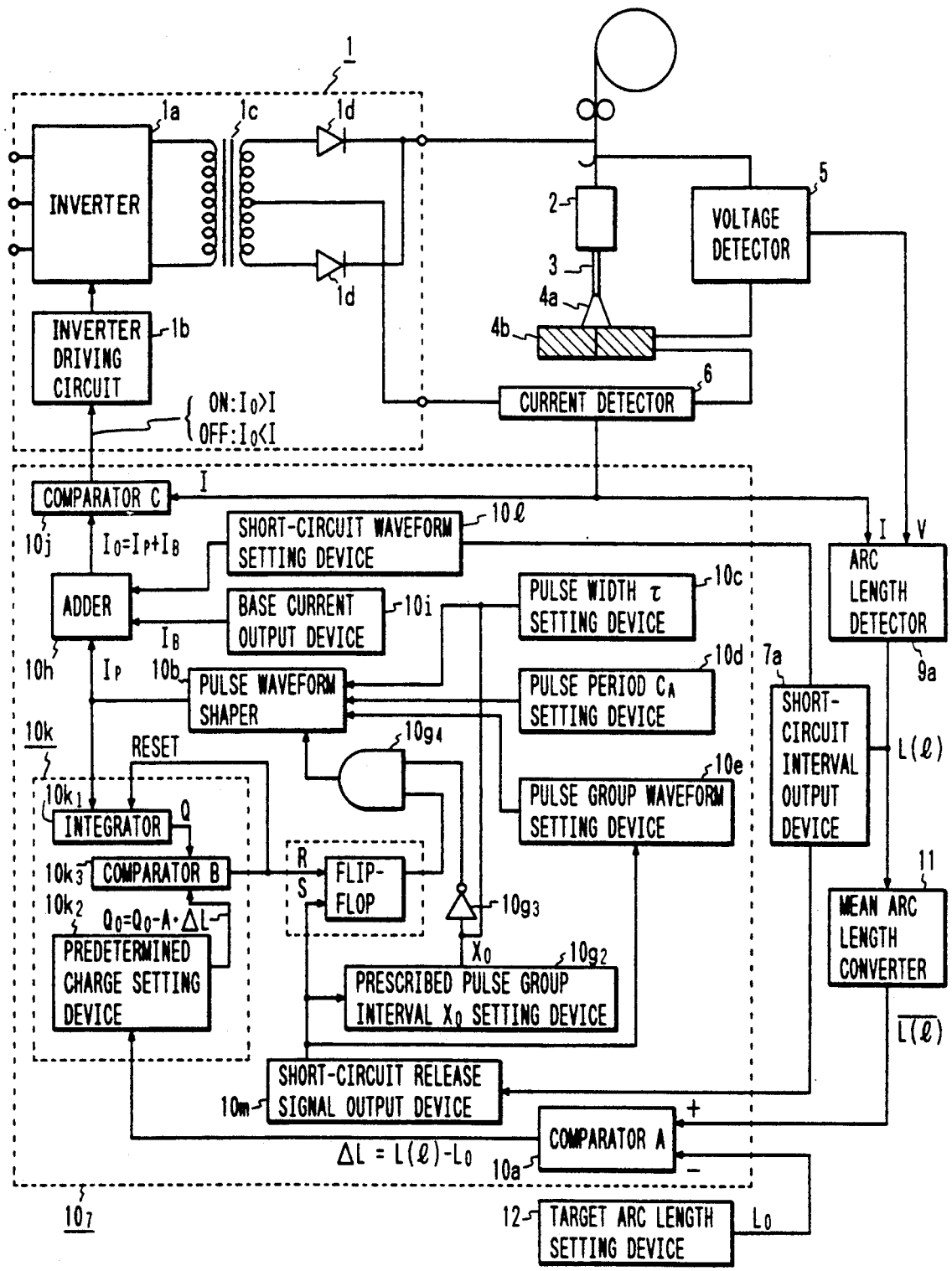
FIG. 37 is an overall block diagram of a short-circuit transfer type pulsed arc welding apparatus embodying a seventeenth aspect in the invention.

A description will subsequently be given of a seventeenth aspect in the invention to which control over the supply of charge amount of the group of pulsating currents is applied to the short-circuit transfer type arc welding apparatus with reference to FIGS. 37 and 38. FIG. 37 is an overall block diagram of a short-circuit transfer type arc welding apparatus, wherein like reference characters designate like or corresponding parts of FIG. 36. As shown in FIG. 37, the welding apparatus includes the short-circuit interval output device 9a for outputting a short-circuit detection signal Sa upon detection of the short-circuit interval of the molten lump, the pulsating current waveform control circuit $10_{12}$ in this embodiment, the short-circuit release signal output device 10m for setting the output at 'L' while receiving the short-circuit detection signal Sa and for outputting the short-circuit release signal Sac at 'H' level at the time of loosing the short-circuit detection signal Sa, and the short-circuit waveform setting device 10L for setting the arc current waveform to be supplied to the short-circuit molten lump at the time of receiving the arc current waveform so as to supply the set waveform to the adder 10h.

With the arrangement stated above, the operation of the short-circuit transfer type arc welding apparatus will be described with reference to a waveform chart of FIG. 38. The short-circuit interval output device 9a applies to the short-circuit release signal output device 10m and the short-circuit waveform setting device 10L, the short-circuit detection signal Sa to be output as a 'H' level signal during the time the molten lump short-circuits in accordance with the sharp decrease of the arc length level of the arc length signal L(l). Then the short-circuit waveform setting device 10L applies to the adder 10h, a short-circuit current waveform Is having an optimum current rise waveform so that the molten lump formed at the tip of the wire electrode may be transferred smoothly (while the short-circuit interval signal is at 'H' level) to the workpieces as it short-circuits with respect thereto ((a) of FIG. 38).

On the other hand, the short-circuit release signal output device 10m for receiving the short-circuit interval signal Sa keeps applying a short-circuit release signal Sac to the pulsating current group interval setting device 10g and the pulse waveform setting device 10e while the short-circuit interval signal Sa rises from 'H' to 'L' level. Consequently, the pulsating current waveform shaper 10b will not operate during the short-circuit interval and when the short-circuit is released, the pulsating current waveform shaper 10b is operated by the short-circuit release signal Sac and supplies the pulse waveform to the adder 10h. When the short-circuit release signal Sac ((c) of FIG. 38) is produced from the short-circuit release signal output device 10m as the short-circuit state is released, the group of pulsating currents $I_P$ having the predetermined pulse group waveform whose peak value has been corrected in conformity with the variation of the mean arc length L(l) are supplied from the pulse waveform shaper 10b to the adder 10h and the integrator $10k_1$ of the pulse charge amount setting unit 10k. The adder 10h receives the base current $I_B$ as a minimum arc maintenance current for preventing out-of-arc from the base current output device 10i and superposes the current on the pulsating current $I_P$ ((a) of FIG. 38) and applies the resulting current to the comparator C 10j as the arc current Io ($=I_P+I_B$). By integrating each single pulse of the group of pulsating currents $I_P$, on the other hand, the integrator $10k_1$ supplies the pulsating current group charge amount Q ((b) of FIG. 38) to the comparator B $10k_3$ while raising its output level in line with the variation of the pulsating current supply time. The predetermined charge amount Qo (=Qo−A·ΔL where A=- proportionality factor) of the pulsating current to be supplied is preset by the predetermined charge amount Qo setting device $10k_2$ and supplied to the comparator B $10k_3$ according to the difference signal ΔL. When the charge amount of the group of pulsating currents supplied during the prescribed pulse group interval xo is smaller than the charge amount set by the pulse group charge amount setting device $10k$, the pulsating current has to be kept being supplied in order to make the mean arc length approximate to the target arc length.

To supply the pulsating current continuously, the interval setting signal xo that has turned to have 'L' level, together with the 'H' output of the F/F, is applied via the invertor element $10g_3$ to the AND gate $10g_4$. On receiving the output τf ((g) of FIG. 33) of the AND gate, the pulse waveform shaper $10b$ supplies a stepped arc current at the pulsating current level to the adder $10h$ and the integrator $10k_1$. When the pulse charge amount Q consequently reaches the predetermined charge amount Qo, the reset signal ((d) of FIG. 38) is applied from the comparator B $10k_3$ to the integrator $10k_1$ so as to suspend the integral operation and also to the F/F forming the pulse group interval X setting device $10g$, so that the output suspension signal is applied to the pulse waveform shaper $10b$. As a result, the group of pulsating currents $I_P$ output from the pulse waveform shaper $10b$ are extended to have the pulse width τf (τf in (a) of FIG. 38) conforming to the predetermined charge amount and supplied to the adder $10f$ where the base current $I_B$ is superposed thereon to become the arc current Io (=$I_P+I_B$). When the welding current is supplied to the wire electrode 3 in accordance with the arc current Io again, the molten lump at the tip of the wire electrode 3 grows and short-circuits with the workpieces $4b$ again. The short-circuit current Is employed during the short-circuit interval to carry out welding by transferring the molten lump to the workpieces. Moreover, the short-circuit interval output device $9a$ supplies the short-circuit interval signal Sa to the short-circuit release signal output device $10p$ at this time and when the short-circuit interval signal Sa turns to have 'L' level, the short-circuit release signal Sac is output.

Figure 39:
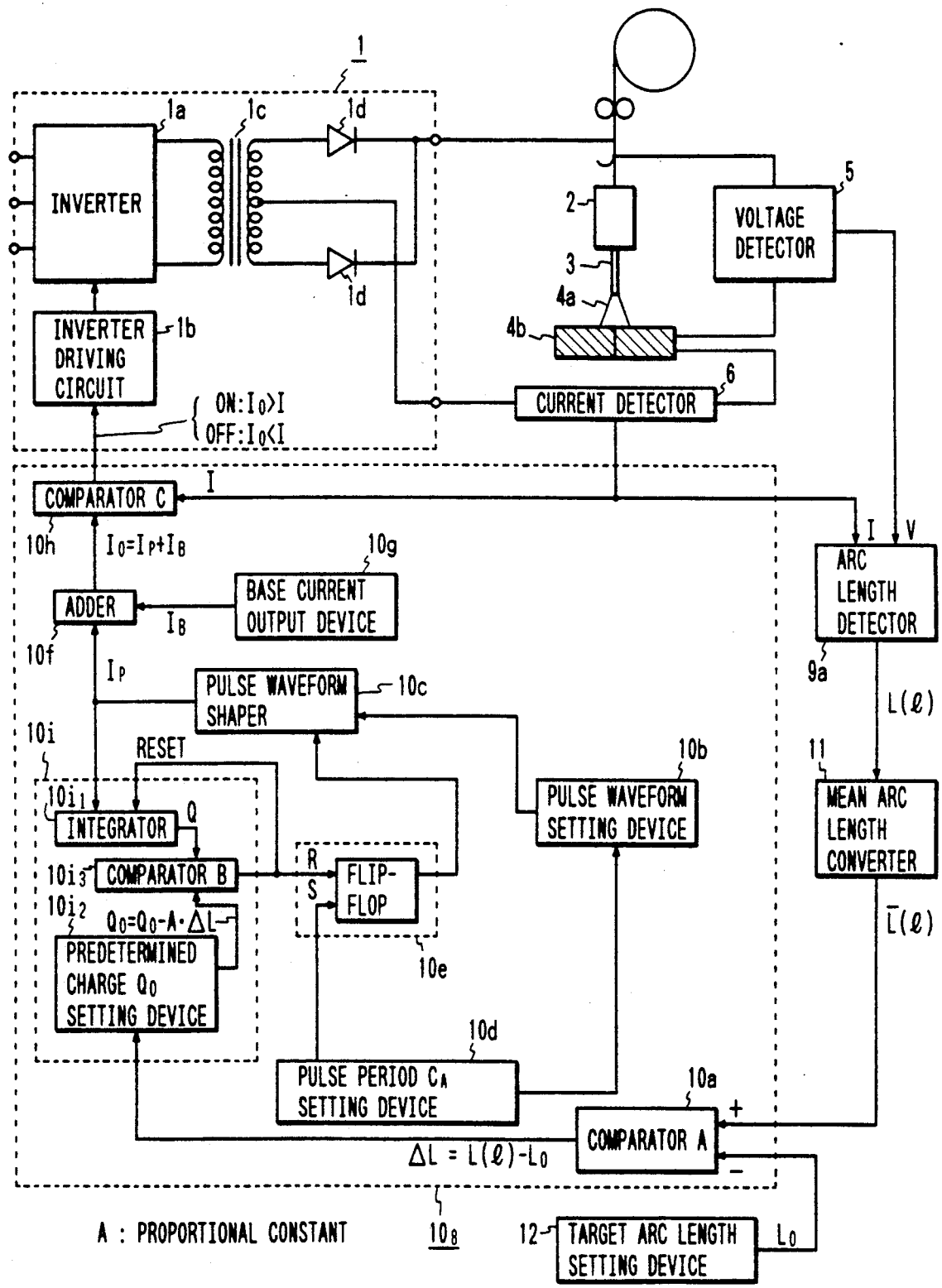
FIG. 39 is an overall block diagram of a pulsed arc welding apparatus embodying an eighteenth aspect in the invention.

FIG. 39 is an overall block diagram of a pulsed arc welding apparatus embodying an eighteenth aspect in the invention, wherein like reference characters designate like or corresponding parts of FIG. 29. Numeral $10_{13}$ denotes the pulsating current waveform control circuit comprises the comparator A $10a$ for comparing the mean arc length $\overline{L}(l)$ with the target arc length Lo so as to output the difference signal ΔL (=$\overline{L}(l)$−Lo), the pulse waveform setting device $10b$ for setting the pulsating current waveform for reference and for outputting the pulsating current $I_P$ having a predetermined pulse width, the pulse waveform shaper $10c$ for shaping and outputting the pulse waveform corrected, the pulse period $C_A$ setting device $10d$ for setting the output period $C_A$ of the pulsating current, the pulse width setting device $10e$ for controlling the pulsating current output so as to set the pulse width of the pulsating current $I_P$ supplied, the adder $10f$ for superposing the base current $I_B$ produced from the base current output device $10g$ on the pulsating current $I_P$ produced, the comparator C $10h$ for comparing the pulsating current Io (=$I_P+I_B$) to be output with the arc current I detected by the current detector 6 so as to control the ON-OFF state of the invertor drive circuit $1b$ in accordance with the result of comparison, and the pulse charge amount setting unit $10i$ for setting the charge amount, i.e., pulse width, of the pulsating currents $I_P$ to be supplied. The charge amount setting unit $10i$ further comprises the integrator $10i_1$ for obtaining the charge amount Q of the pulsating current to be supplied, the predetermined charge Qo setting device $10i_2$ for presetting the charge amount Qo (=Qo−A·ΔL where A=proportionality factor) of the pulsating current to be supplied according to the difference signal ΔL produced by the comparator $10a$, and the comparator B $10i_3$ for applying a reset signal to the pulse width setting device $10e$ and the integrator $10i_1$ when the charge amount Q thus obtained reaches the predetermined charge amount Qo so as to suspend the power supply to the pulsating current $I_P$ with a predetermined pulse width.

With the arrangement stated above, the operation will be described with reference to a waveform chart of FIG. 40.

The mean arc length varies with the deflection of the welding torch and the thermal distortion of the workpieces. For this reason, it is necessary to control the amount of arc current to be supplied and melting amount of the molten lump so as to suppress the variation of the mean arc length resulting from the nonconformity of the molten lump and to make the mean arc length constant.

Therefore, the arc length detector 19 detects the true arc length varying as the welding process proceeds (cutting, melting, shaping and cutting of the molten lump) in accordance with the arc voltage V and the arc current I detected by the voltage detector 5 and the current detector 6 and from time to time applies the arc length signal L(l) to the mean arc length convertor 11. The mean arc length convertor 11 forms the mean value (mean arc length) $\overline{L}(l)$ of the true arc lengths received in the respective welding processes and supplies the mean value to the comparator A $10a$. The mean arc length $\overline{L}(l)$ thus formed is compared with the target mean arc length (target arc length) Lo set by the target arc length setting device 12 in the comparator A $10a$, which outputs the difference signal ΔL corresponding the difference ($\overline{L}(l)$−Lo) therebetween.

Consequently, the pulse charge amount setting unit $10i$ causes the predetermined charge amount Qo setting device $10i_2$ to set the charge amount Qo of the pulsating current to be supplied according to the difference signal ΔL and supplies the amount thus set to the comparator $10i_3$ as data for comparison. On the other hand, the pulsating current to be supplied as the arc current is provided with the pulse width and pulse level of the pulsating current waveform in the pulse waveform setting device $10b$ before being supplied to the pulse waveform shaper. Subsequently, the pulsating current having the predetermined pulse waveform is supplied from the pulse waveform shaper $10c$ to the adder $10f$ and the integrator $10i_1$ of the pulse charge amount setting unit $10i$ synchronously with the pulse period signal $C_A$ ((b) of FIG. 40) produced from the pulse period $C_A$ setting device. The adder $10f$ receives the base current $I_B$ as a minimum arc maintenance current for preventing out-of-arc from the base current output device $10g$ and superposes the current on the pulsating current $I_P$ ((a) of FIG. 40) and applies the resulting current to the comparator C $10h$ as the arc current Io ($=I_P+I_B$). By integrating each single pulse of the pulsating current $I_P$, on the other hand, the integrator $10i_1$ supplies the pulsating current charge amount Q ((c) of FIG. 40) to the comparator B $10i_3$ while raising its output level in line with the variation of the pulsating current supply time. The predetermined charge amount Qo ($=$Qo$-$A·$\Delta$L) of the pulsating current to be supplied is set by the predetermined charge amount setting device $10i_2$ and supplied to the comparator B $10i_3$ according to the difference signal $\Delta$L. When the pulse charge amount Q consequently reaches the predetermined charge amount Qo, the reset signal ((d) of FIG. 40) is applied from the comparator B $10i_3$ to the integrator $10i_1$ so as to suspend the integral operation and also to the F/F forming the pulse width setting device $10e$, so that the output suspension signal is applied to the pulse waveform shaper $10c$. The pulsating current produced from the pulse waveform shaper $10c$ is provided with the pulse width ((e) of FIG. 40) determining the predetermined charge amount before being applied to the adder $10f$ where the base current $I_B$ is superposed thereon. The arc Current Io ($=I_P+I_B$) thus produced is applied to the comparator C $10h$. The comparator C $10h$ compares the detected arc current value I with the Io thus formed and if Io$>$I, an ON signal is applied to the invertor drive circuit $1b$ so as to supply the arc current from the arc welding power supply 1 to the welder proper, whereas if Io$<$I, the comparator receives an OFF signal and suspends the arc current supply.

Although a description has been given of the periodic repetition of the single pulse in the embodiment shown, the difference signal $\Delta$L obtained by comparing the mean arc length preset by the target arc length setting device with the mean arc length obtained from the actual arc length detected by the arc length detector may be used to correct the width of the pulse group in pulsed arc welding wherein the pulse group constituted by the plurality of pulse groups is periodically repeated.

Figure 41A:
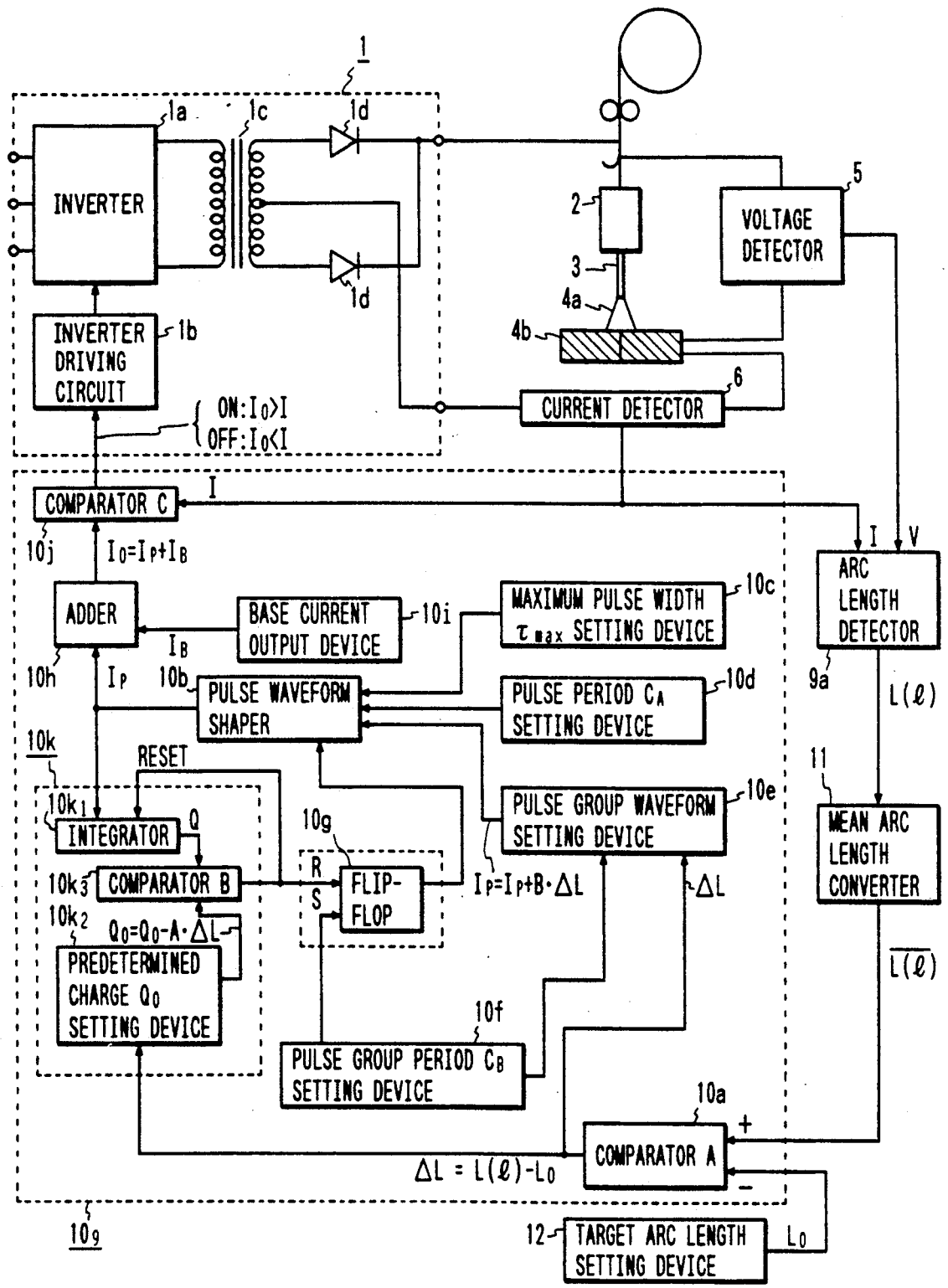
FIG. 41(a) is an overall block diagram of a pulsed arc welding apparatus embodying a nineteenth aspect in the invention.

FIG. 41($a$) is an overall block diagram of a pulsed arc welding apparatus embodying a nineteenth aspect in the invention. In FIG. 41($a$), like reference characters designate like or corresponding parts of FIG. 29(A). In FIG. 41($a$), the apparatus includes the pulsating current waveform control circuit $10_9$ for forming a pulsating current and for controlling the output thereof. The pulsating current waveform control circuit further comprises the comparator A $10a$ for comparing the mean arc length $\overline{L}(l)$ with the target arc length Lo so as to output the difference signal $\Delta$L ($=\overline{L}(l)-$Lo), the pulse waveform shaper $10b$ for shaping a pulsating current group waveform and for outputting the group of pulsating currents $I_P$ constituting an arc current, the maximum pulse width $\tau_{max}$ setting device $10c$ for setting the maximum pulse width $\tau_{max}$ of each of the single pulses constituting the group of pulsating Currents $I_P$, the pulse period $C_A$ setting device $10d$ for setting each pulse output period $C_A$, the pulse group waveform setting device $10e$ for setting the pulsating current group waveform and for determining the peak value of the group of pulsating currents according to the difference signal $\Delta$L, the pulse group period $C_B$ setting device $10f$ for setting the output period $C_B$ of the pulsating current, the pulse group interval X setting device $10g$ for controlling a pulsating current output so as to set the power supply interval of the group of pulsating currents, the adder $10h$ for superposing the base current $I_B$ produced by the base current output device $10i$ on the group of pulsating currents $I_P$ produced, the comparator C $10j$ for comparing the pulsating current Io ($=I_P+I_B$) to be output with the arc current I detected by the current detector 6 so as to control the ON-OFF state of the invertor drive circuit $1b$ according to the result of comparison, and the pulse group charge amount setting unit $10k$ for setting the charge amount, i.e., pulse width, of the group of pulsating currents $I_P$ to be supplied. The charge amount setting unit $10k$ further comprises the integrator $10k_1$ for obtaining the charge amount Q of the group of pulsating currents to be supplied, the predetermined charge Qo setting device $10k_2$ for presetting the charge amount Qo ($=$Qo$-$A·$\Delta$L where A$=$proportionality factor) of the group of pulsating currents to be supplied according to the difference signal $\Delta$L produced by the comparator A $10a$, and the comparator B $10k_3$ for applying a reset signal to the pulse group interval X setting device $10g$ and to the integrator $10k_1$ when the charge amount Q thus obtained reaches the predetermined charge amount Qo so as to suspend the power supply to the group of pulsating currents $I_P$ with a predetermined pulse width.

With the arrangement stated above, the operation will be described with reference to a waveform chart of FIG. 42($a$).

The mean arc length varies with the deflection of the welding torch, the thermal distortion of the workpieces or the thrusting up of the molten lump due to the variation of the pulse group width of the group of pulsating currents. For this reason, it is necessary to control the amount of arc current to be supplied and melting amount of the molten lump so as to suppress the variation of the mean arc length resulting from the nonconformity of the molten lump and to make the mean arc length constant.

Therefore, the arc length detector 19 detects the true arc length varying as the welding process proceeds (cutting, melting, shaping and cutting of the molten lump) in accordance with the arc voltage V and the arc current I detected by the voltage detector 5 and the current detector 6 and from time to time applies the arc length signal L(l) to the mean arc length convertor 11. The mean arc length convertor 11 forms the mean value (mean arc length) $\overline{L}(l)$ of the true arc lengths received in the respective welding processes and supplies the mean value to the comparator A $10a$. The mean arc length L(l) thus formed is compared with the target mean arc length (target arc length) Lo set by the target arc length setting device 9 in the comparator A $10a$, which supplies the difference signal $\Delta$L corresponding the difference ($\overline{L}(l)-$Lo) to the pulse group waveform setting device $10e$ and the pulse charge amount setting unit 15.

Figure 42:
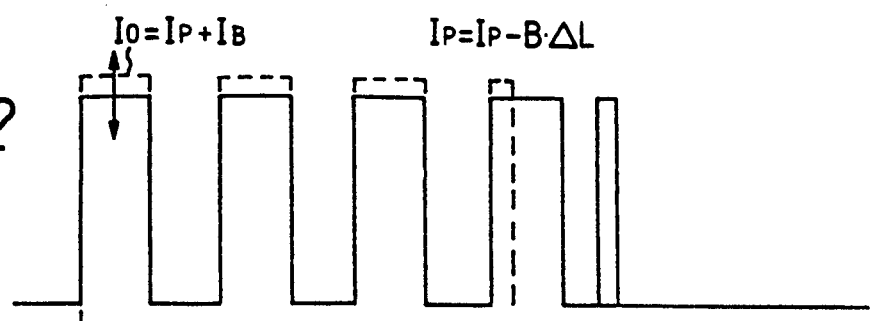
FIGS. 42(a)-42(e) are a signal waveform chart explanatory of the operation of the apparatus embodying the present invention.
FIGS. 42(f)-42(j) are a signal waveform chart explanatory of the operation of the apparatus embodying the present invention.
Figure 42:
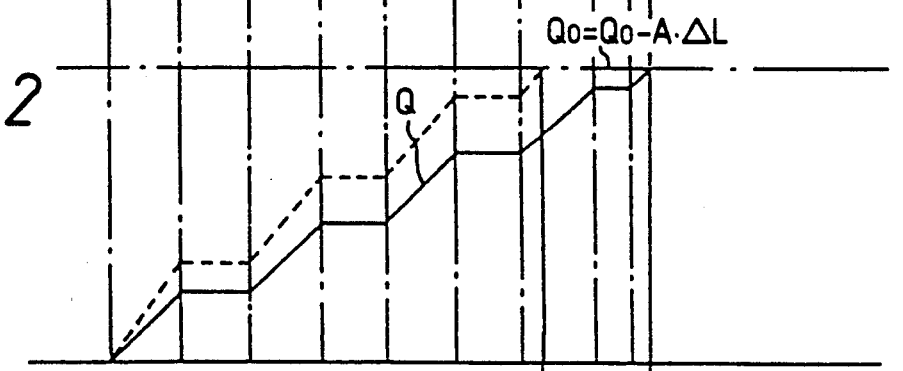
Figure 42:
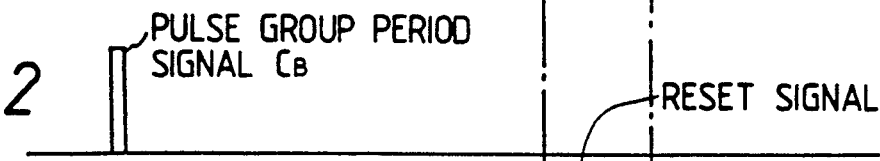
Figure 42:
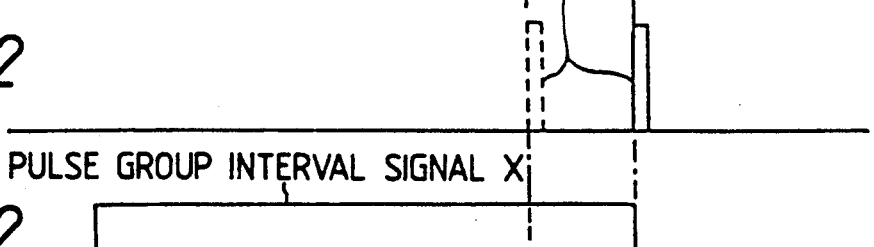
Figure 42:
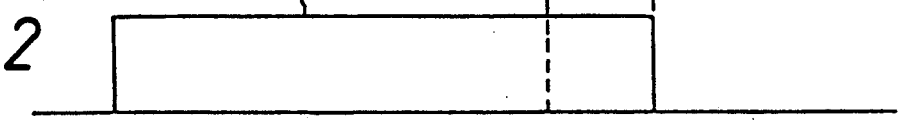

Consequently, the pulse group waveform setting device raises the peak value of the pulse group waveform by the variation B·$\Delta$L (B: proportionality factor) of the mean arc length as shown by a broken line of FIG. 42($a$) and set the new pulse group waveform to the pulse waveform shaper $10b$. Moreover, the maximum pulse width $\tau_{max}$ of each single pulse in the group of pulsating currents set in the maximum pulse width $\tau$max setting device $10c$ and the output period $C_A$ of each single pulse set in the pulse period $C_A$ setting device $10d$ are set in the pulse waveform shaper $10b$. Based on these set values, the pulse waveform shaper $10b$ shapes and outputs the predetermined pulse group waveform of the group of pulsating currents $I_P$. The pulse charge amount setting unit $10k$ causes the predetermined charge amount Qo setting device $10k_2$ to set the charge amount Qo of the group of pulsating currents to be supplied according to the difference signal ΔL so as to supply it to the comparator $10k_3$ as data for comparison.

Subsequently, the group of pulsating currents $I_P$ having the predetermined pulse waveform are supplied from the pulse waveform shaper 10b to the adder 10h and the integrator $10k_1$ of the pulse charge amount setting unit 10k synchronously with the pulse period signal $C_B$ ((c) of FIG. 42) produced from the pulse period $C_B$ setting device 10f. The adder 10h receives the base current $I_B$ as a minimum arc maintenance current for preventing out-of-arc from the base current output device 10i and superposes the current on the pulsating current $I_P$ ((a) of FIG. 2(a) and applies the resulting current to the comparator C 10j as the arc current Io ($=I_P+I_B$). By integrating each single pulse of the group of pulsating currents $I_P$, on the other hand, the integrator $10k_1$ supplies the pulsating current group charge amount Q ((b) of FIG. 42(a)) to the comparator B $10k_3$ while raising its output level in line with the variation of the pulsating current supply time. The predetermined charge amount Qo ($=$Qo$-$A·ΔL where A$=$proportionality factor) of the pulsating current to be supplied is set by the predetermined charge amount Qo setting device $10k_2$ and supplied to the comparator B $10k_3$ according to the difference signal ΔL. When the pulse charge amount Q consequently reaches the predetermined charge amount Qo, the reset signal ((d) of FIG. 42(a)) is applied from the comparator B $10k_3$ to the integrator $10k_1$ so as to suspend the integral operation and also to be flip-flop forming the pulse group interval X setting device 10g, thus causing the application of an output suspension signal to the pulse waveform shaper 10b. As a result, the group of pulsating currents $I_P$ output from the pulse waveform shaper 10b are made to have the pulse width ((a) of FIG. 42(a)) for determining the predetermined charge amount and supplied to the adder 10f where the base current $I_B$ is superposed thereon. The pulse group width (the portion of (a) of FIG. 42(a) indicated by a broken line) of the group of pulsating currents then becomes narrower than the pulse group width (the portion of (a) of FIG. 42(a)) indicated by a continuous line), if the mean arc length does not vary. The arc Current Io ($=I_P+I_B$) in the group of pulsating currents $I_P$ thus controlled in terms of the charge amount supply is applied to the comparator C 10j. The comparator C 10j compares the detected arc current value I with the Io thus formed and if Io$>$I, an ON signal is applied to the invertor drive circuit 1b so as to supply the arc current from the arc welding power supply 1 to the welder proper, whereas if Io$<$I, the comparator receives an OFF signal and suspends arc current supply.

Figure 41B:
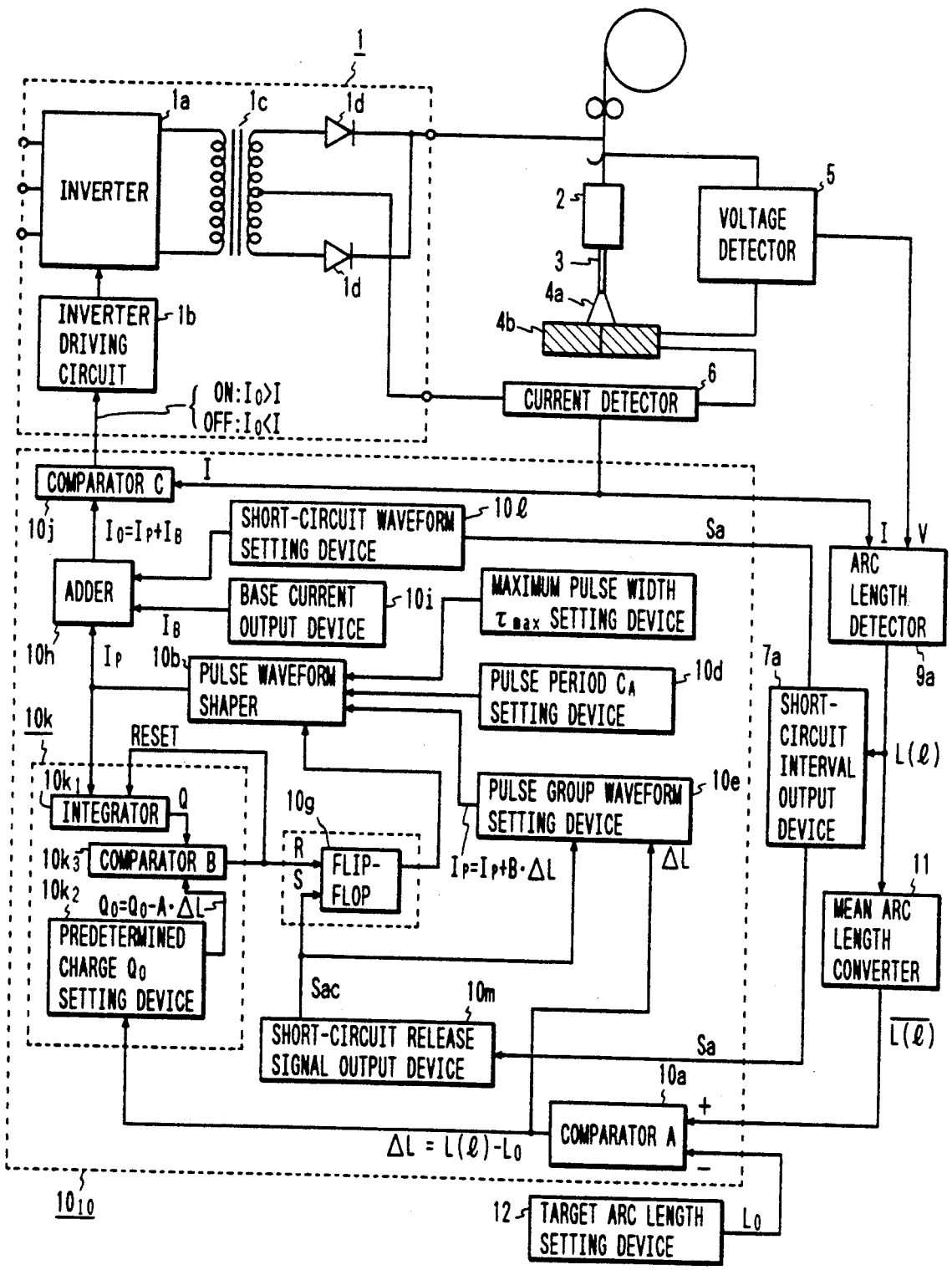
FIG. 41(b) is an overall block diagram of a pulsed arc welding apparatus embodying a nineteenth aspect in the invention.

A description will subsequently be given of a twentieth aspect in the invention to which control over the supply of charge amount of the group of pulsating currents is applied to the short-circuit transfer type arc welding apparatus with reference to FIG. 41(b) and FIG. 42(b). FIG. 41(b) is an overall block diagram of a short-circuit transfer type arc welding apparatus, wherein like reference characters designate like or corresponding parts of FIG. 41(a). As shown in FIG. 41(b), the welding apparatus includes the short-circuit interval output device 9a for outputting a short-circuit detection signal Sa upon detection of the short-circuit interval of the molten lump, the short-circuit release signal output device 10m for setting the output at 'L' while receiving the short-circuit detection signal Sa and for outputting the short-circuit release signal Sac at 'H' level at the time of loosing the short-circuit detection signal Sa, and the short-circuit waveform setting device 10L for setting the arc current waveform to be supplied to the short-circuit molten lump at the time of receiving the arc current waveform so as to supply the set waveform to the adder 10h.

With the arrangement stated above, the operation of the short-circuit transfer type arc welding apparatus will be described with reference to a waveform chart of FIG. 42(b). The short-circuit interval output device 9a applies to the short-circuit release signal output device 10a and the short-circuit waveform setting device 10L, the short-circuit detection signal Sa to be output as a 'H' level signal during the time the molten lump short-circuits in accordance with the sharp decrease of the arc length level of the arc length signal L(l). Then the short-circuit waveform setting device 10L applies to the adder 10h, a short-circuit current waveform Is having an optimum current rise waveform so that the molten lump formed at the tip of the wire electrode may be transferred smoothly (while the short-circuit interval signal is at 'H' level) to the workpieces as it short-circuits with respect thereto ((a) of FIG. 42(b)). On the other hand, the short-circuit release signal output device 10m for receiving the short-circuit interval signal Sa keeps applying a short-circuit release signal Sac to the pulsating current group interval setting device 10g and the pulse waveform setting device 10e while the short-circuit interval signal Sa rises from 'H' to 'L' level. Consequently, the pulsating current waveform shaper 10b will not operate during the short-circuit interval and when the short-circuit is released, the pulsating current waveform shaper 10b is operated by the short-circuit release signal Sac and supplies the pulse waveform to the adder 10h. When the short-circuit release signal Sac ((c) of FIG. 42(b)) is produced from the short-circuit release signal output device 10m as the short-circuit state is released, the group of pulsating currents $I_P$ having the predetermined pulse group waveform whose peak value has been corrected in conformity with the variation of the mean arc length $\bar{L}$(l) are supplied from the pulse waveform shaper 10b to the adder 10h and the integrator $10k_1$ of the pulse charge amount setting unit 10k. The adder 10h receives the base current $I_B$ as a minimum arc maintenance current for preventing out-of-arc from the base current output device 10i and superposes the current on the pulsating current $I_P$ ((a) of FIG. 42(b)) and applies the resulting current to the comparator C 10j as the arc current Io ($=I_P+I_B$). By integrating each single pulse of the group of pulsating currents $I_P$, on the other hand, the integrator $10k_1$ supplies the pulsating current group charge amount Q ((b) of FIG. 42(b)) to the comparator B $10k_3$ while raising its output level in line with the variation of the pulsating current supply time. The predetermined charge amount Qo ($=$Qo$-$A·ΔL where A$=$proportionality factor) of the pulsating current to be supplied is preset by the predetermined charge amount Qo setting device $10k_2$ and supplied to the comparator B $10k_3$ according to the difference signal ΔL. When the pulse charge amount Q consequently reaches the predetermined charge amount Qo, the reset signal ((d) of FIG. 42(b)) is applied from the comparator B $10k_3$ to the integrator $10k_1$ so as to suspend the integral operation and also to the flip-flop forming the pulse group interval X setting device 10g, thus causing the application of an output suspension signal to the pulse waveform shaper 10b. As a result, the group of pulsating currents $I_P$ output from the pulse waveform shaper 10b are made to have the pulse width ((a) of FIG. 42(b)) for determining the predetermined charge amount and supplied to the adder 10f where the base current $I_B$ is superposed thereon to become the arc current Io (=$I_P$ +$I_B$). When the welding current is supplied to the wire electrode 3 in accordance with the arc current Io again, the molten lump at the tip of the wire electrode 3 grows and short-circuits with the workpieces 4b again. The short-circuit current Is employed during the short-circuit interval to carry out welding by transferring the molten lump to the workpieces. Moreover, the short-circuit interval output device 7a supplies the short-circuit interval signal Sa to the short-circuit release signal output device 10m at this time and when the short-circuit interval signal Sa turns to have 'L' level, the short-circuit release signal Sac is output.

Figure 43:
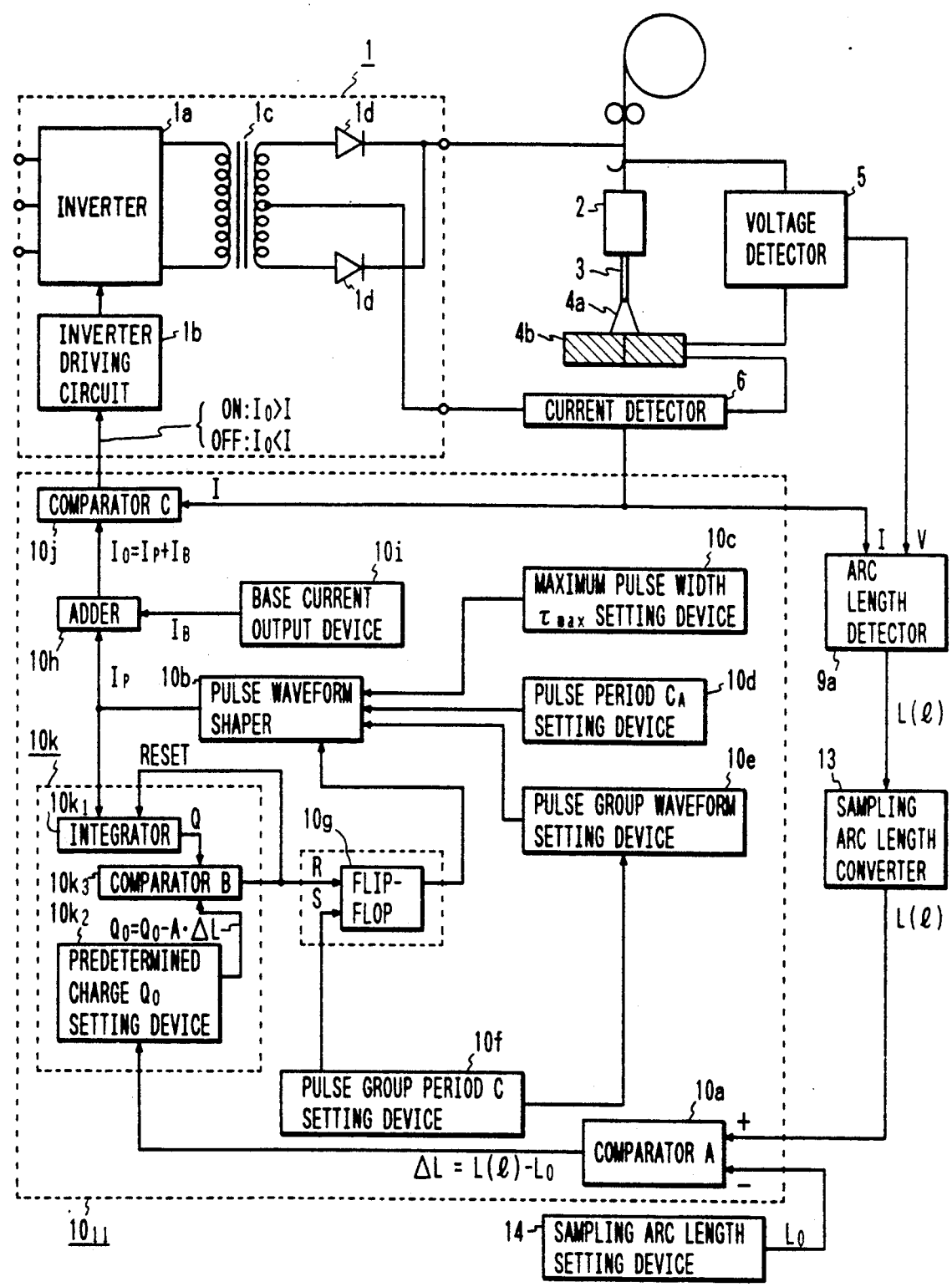
FIG. 43 is an overall block diagram of a pulsed arc welding apparatus embodying a twenty-first aspect in the invention.
Figure 44:
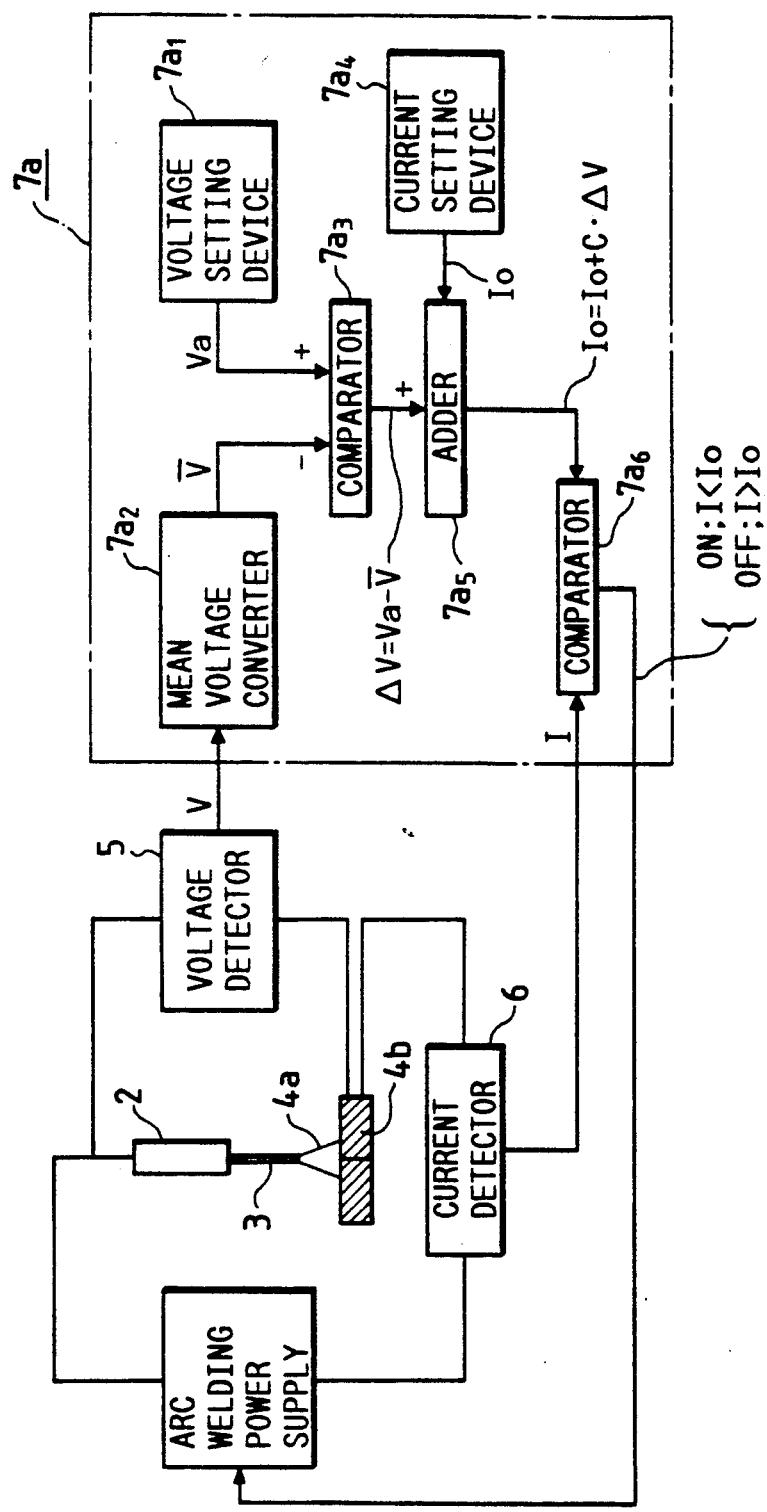
FIGS. 44, 45 are block diagrams of conventional apparatus.
Figure 45:
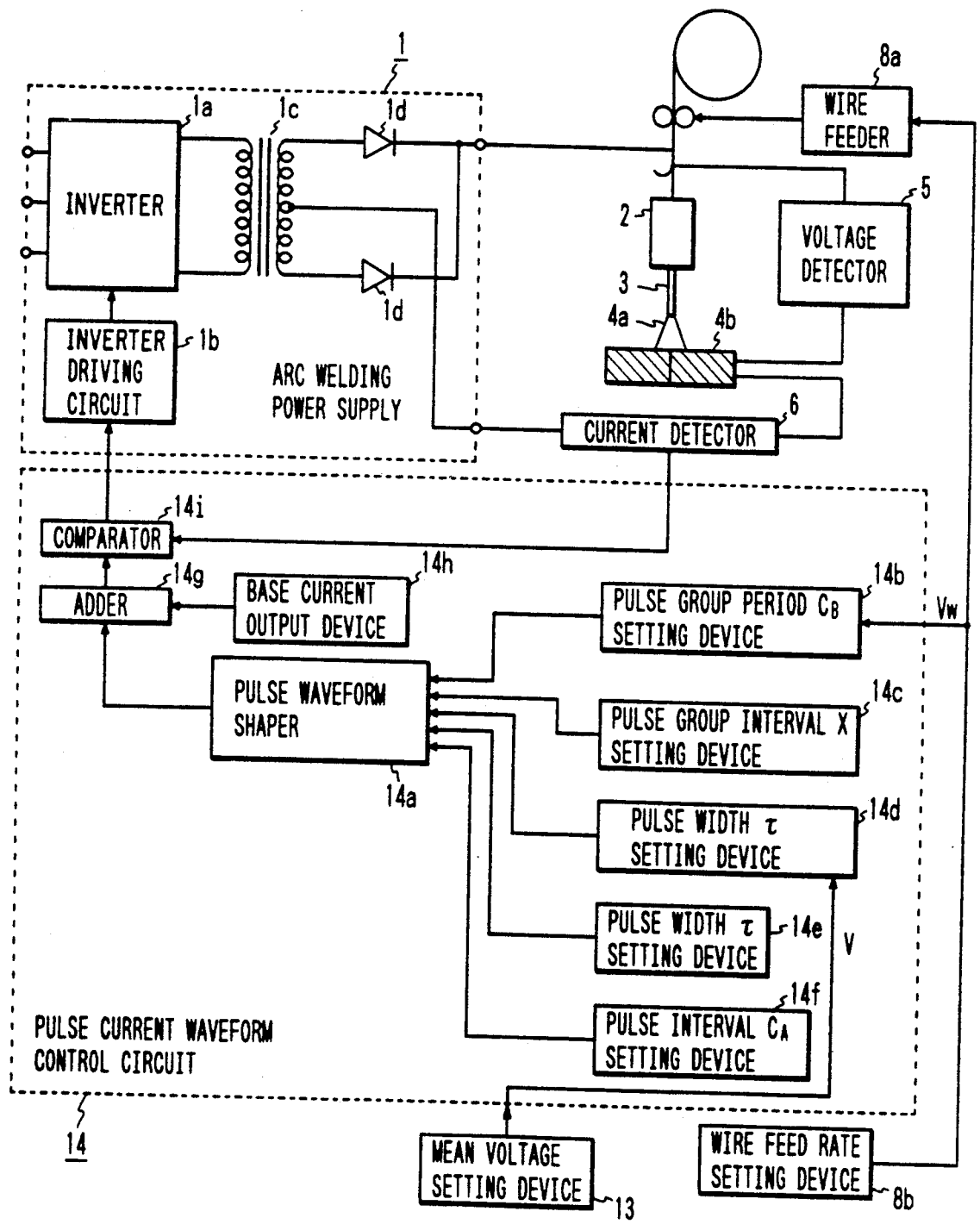
Figure 46A:
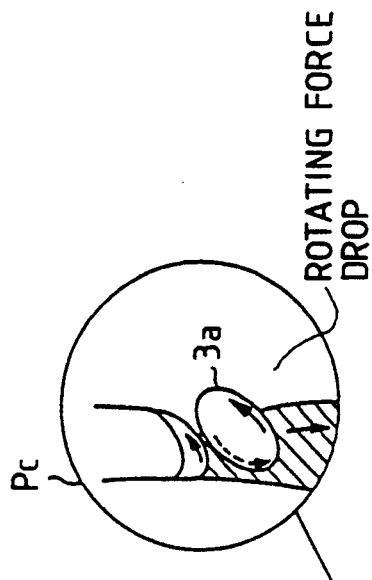
FIG. 46 is a diagram explanatory of each welding process with a group of pulsating currents for use as an arc current.
Figure 46B:
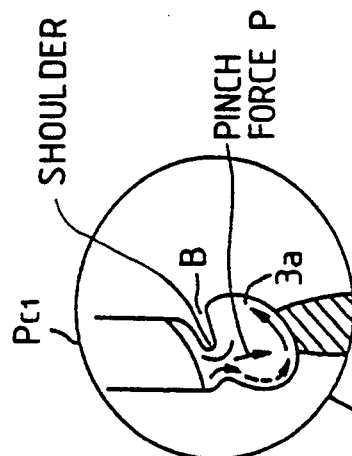
Figure 46C:
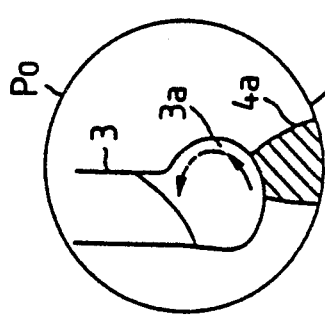
Figure 46D:
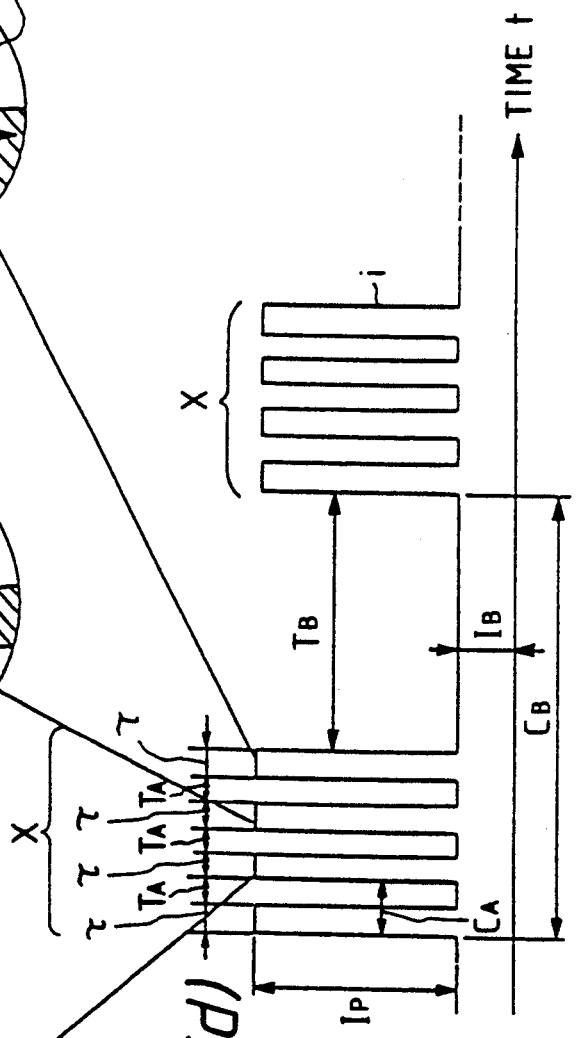
Figure 47A:
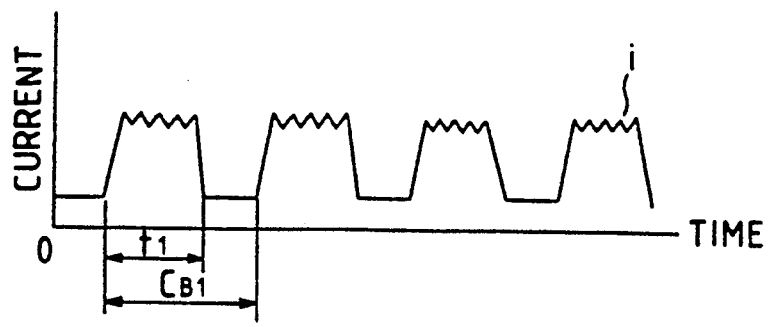
FIGS. 47(a), (b) are pulsating current waveforms in the conventional pulsed arc welding apparatus.
Figure 47B:
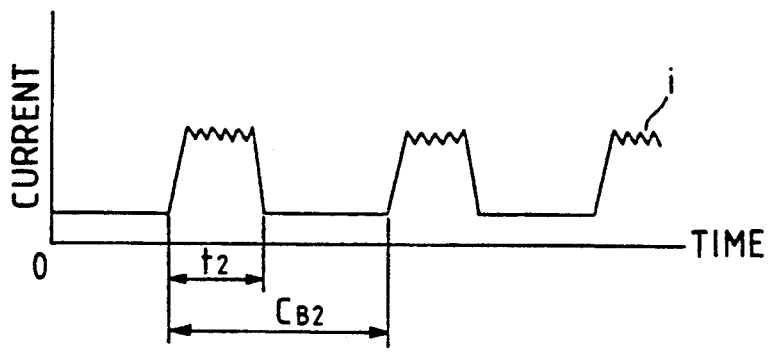
Figure 48:
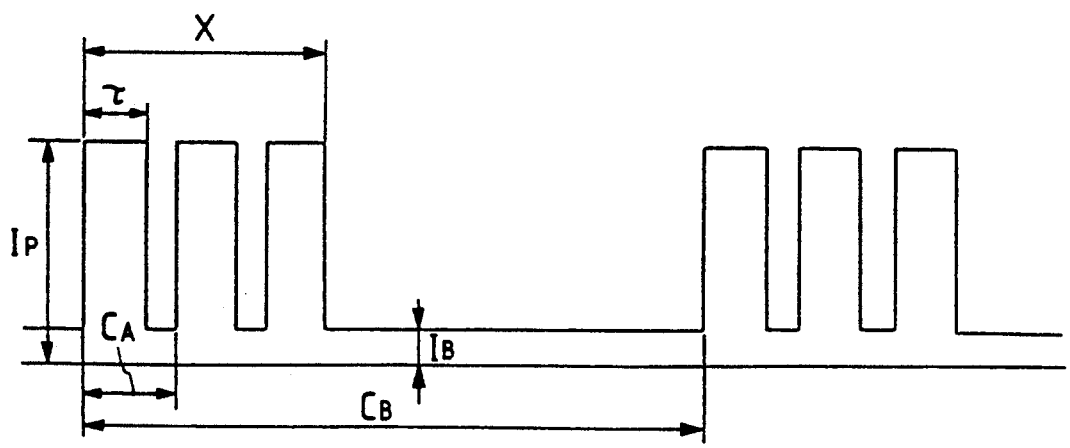
FIG. 48 is a waveform chart of the group of pulsating currents in the conventional pulsed arc welding apparatus.
Figure 49:
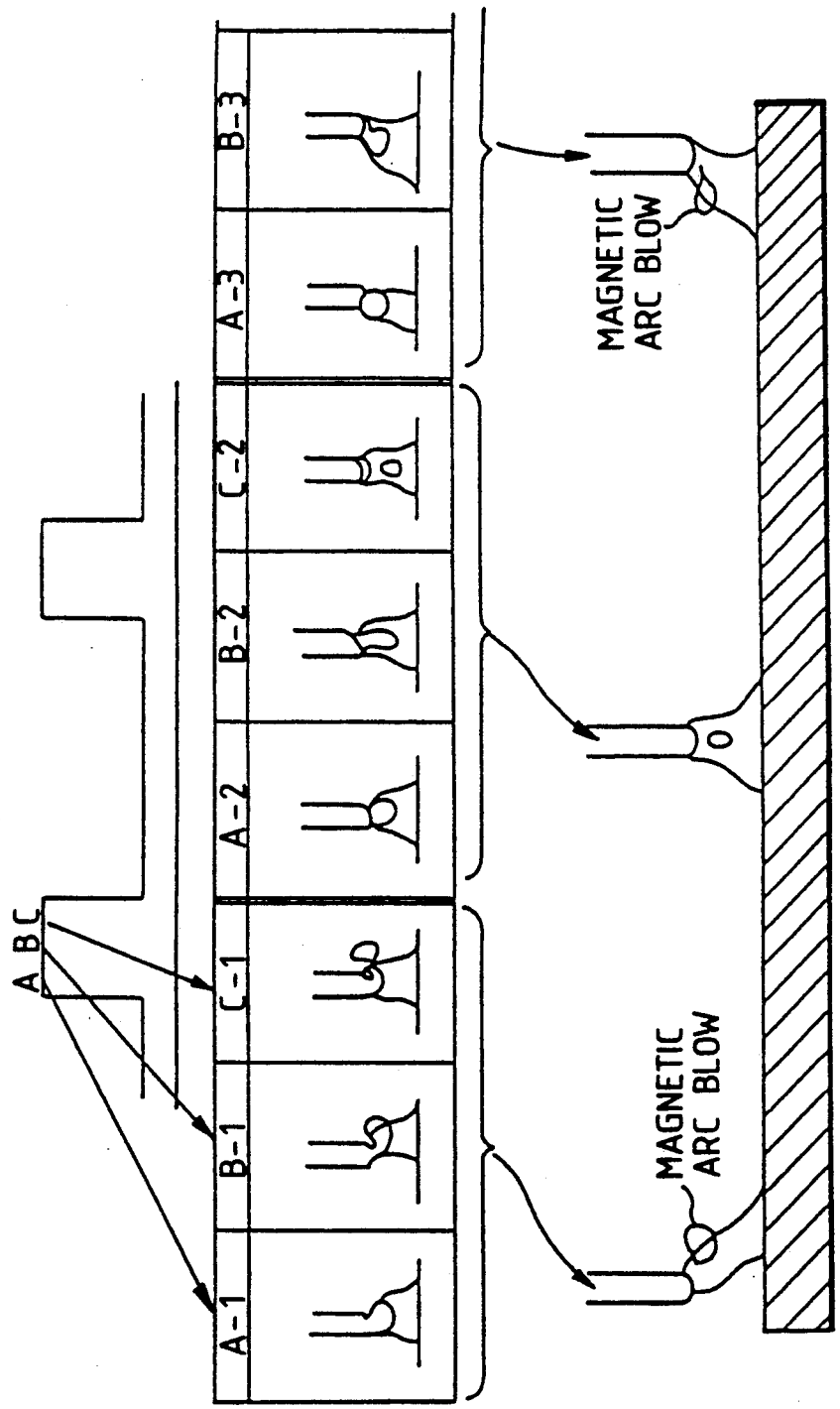
FIGS. 49, 50(a), (b) are diagrams explanatory of problems pertaining to the conventional apparatus.
Figure 50:
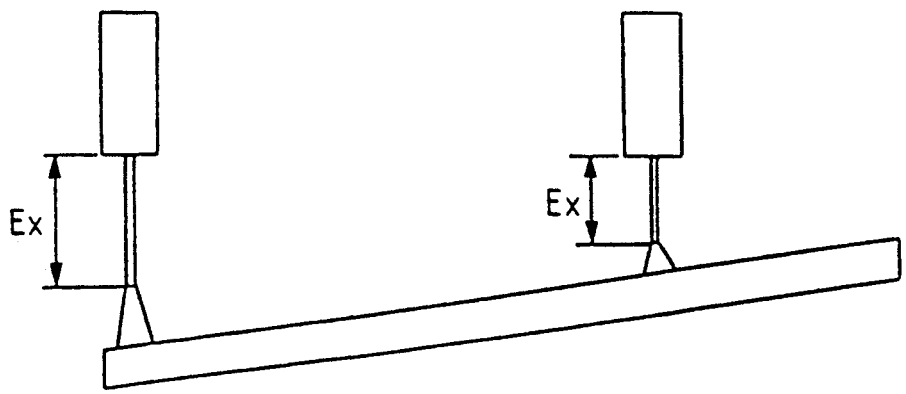
Figure 50:
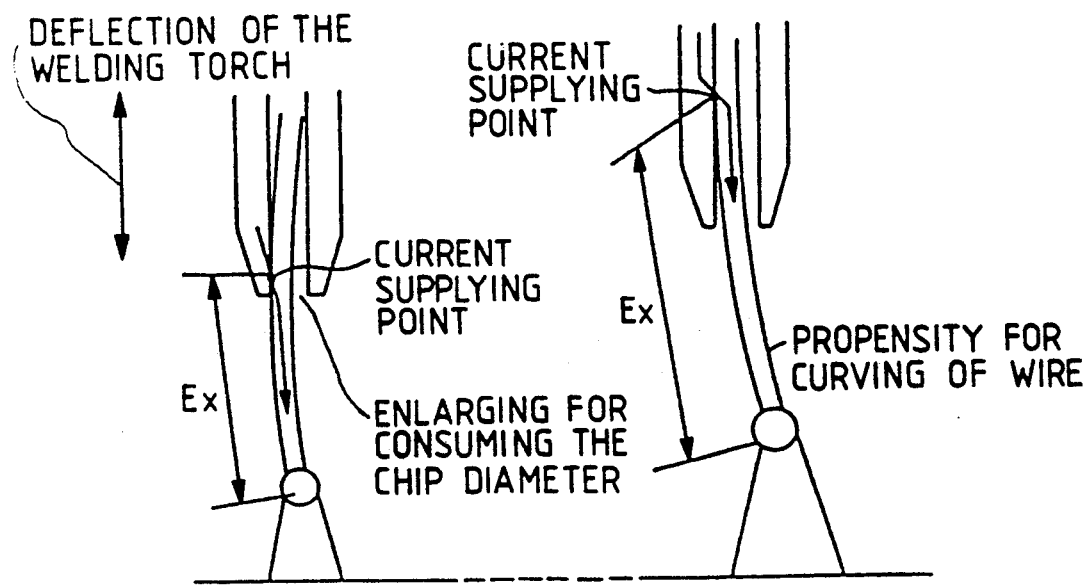

According to the nineteenth aspect in the invention, there has been shown the method of controlling the charge amount of the group of pulsating currents to be supplied in accordance with the variation of the mean arc length after obtaining the mean value of the varying arc length. As shown in the twenty-first aspect in the invention of FIG. 43, the arc signal at specific time is sampled in the sampling arc length convertor 8a and the arc length L(l)S thus sampled is compared with the target sampling arc length Lo set by the target sampling arc length setting device 9a at specific time. The same effect is accordingly achievable by controlling the pulse width of the group of pulsating currents likewise according to the difference signal $\Delta L(=L(l)S-Lo)$.

As the twenty-first aspect in the invention is similar in operation to the nineteenth aspect in the invention except for what is compared to detect the variation of the arc length, the description of its operation will be omitted.

Although the signal applied to the integrator $10k_1$ of the pulse charge amount setting unit 10k was set as $I_P$ in the nineteenth to twenty-first aspects in the invention, it may be Io as the output from the adder 10h or the signal I detected by the current detector 6. Moreover, there may be provided a means for limiting the signal to what is effective only during the arc interval.

What is claimed is:

1. A pulsed arc welding apparatus comprising:
   a voltage detector an arc voltage corresponding to a variation of an arc length produced between a welding electrode and workpieces,
   a current detector for detecting an arc current to be supplied to said welding electrode,
   an arc length detector for converting said detected arc current value into a reference arc voltage and for outputting an arc length signal, representing a momentary variation in the arc length as a pulsed welding process proceeds, based on comparison operations between said reference arc voltage and said detected arc voltage value, and
   means for performing said pulsed arc welding process based on said arc length signal.

2. A pulsed arc welding apparatus as claimed in claim 1, wherein said arc length detector comprises:
   a multiplier for receiving from said current detector, a detected arc current value which momentarily varies and for multiplying said detected arc current by a predefined function,
   an adder for adding a d.c. voltage set by a d.c. voltage setting device to an output from said multiplier, and
   a comparator for receiving from said voltage detector, the arc voltage that momentarily varies as the arc length varies and for outputting said arc length signal, representing said variation in the arc length, based on a comparison between said arc voltage and the reference arc voltage.

3. A pulsed arc welding apparatus as claimed in claim 1 or 2, wherein said welding apparatus includes a first varying molten lump detection means comprising a differentiating circuit for detecting the level of said arc length signal at the sharp rise and fall time thereof, a decision circuit for choosing said signal only at the rise time according to the output signal of said differentiating circuit, and a detector for deciding the output signal of said decision circuit to be a signal representing the time at which the molten lump transfers to the workpieces.

4. A pulsed arc welding apparatus as claimed in claim 3, wherein said first varying molten lump detection means comprises a decision circuit for choosing said signal only at the fall time according to the output signal of said differentiating circuit, and a detector for deciding the output signal of said decision circuit to be a signal representing the time at which the molten lump and the workpieces short-circuit.

5. A pulsed arc welding apparatus as claimed in claim 1 or 2, wherein said welding apparatus includes a second varying molten lump detection means comprising a means for comparing the arc length signal with a reference signal A, a decision circuit for deciding that the arc length signal exceeds the reference signal A, and a detector C for deciding the output signal of said decision circuit to be a signal representing the time at which the molten lump transfers to the workpieces.

6. A pulsed arc welding apparatus as claimed in claim 5, wherein said second varying molten lump detection means comprises a means for comparing the arc length signal with a reference signal B lower in level than said reference signal A, a decision circuit D for deciding a point of time the arc length signal becomes lower than the reference signal B by means of said comparator means, and a detector D for deciding the output signal of said decision circuit D to be a signal representing the time at which the molten lump and the workpieces short-circuit.

7. A pulsed arc welding apparatus as claimed in claim 6, wherein said decision circuit comprises a welding start timer for setting the input time of the arc length signal together with the welding start signal input, an analog switch for performing the ON operation for said period of time so as to input the arc length signal, a separation level setting device for setting the separation time of the molten lump in accordance with the arc length signal level, a short-circuit level setting device for setting the short-circuit time of the molten lump in conformity with the arc length signal level, a first comparator for comparing the arc signal level thus input with a set separation level value, and a second comparator for comparing the arc length signal level thus input with the set short-circuit level value, and wherein said detector comprises a first leading edge detector for detecting the leading edge of the signal output from said first comparator, and a second leading edge detector for detecting the leading edge of the signal output from said second comparator.

8. A pulsed arc welding apparatus as claimed in claim 1 wherein said welding apparatus includes a pulsating current waveform control circuit comprising the arc length setting device for setting a pre-simulated momentary variation of the arc length as the welding process proceeds, a current waveform setting device for setting a reference welding current waveform, a comparator for comparing the arc length value detected by said arc length detector with a set simulation arc length value so as to output a difference signal, and a computing element for correcting said reference welding current waveform according to said difference signal and for forming and outputting the welding current so as to obtain a target arc length.

9. A pulsed arc welding apparatus as claimed in claim 8, wherein said pulse current waveform control circuit includes a current waveform period setting device for setting the period of reading a simulation arc length signal and the reference welding current waveform from said arc length setting device and said current waveform setting device.

10. A pulsed arc welding apparatus as claimed in claim 8 or 9, wherein said arc length setting device includes a cut period setting device for setting the interval during which the cut waveform in the simulation arc length waveform is output, a cut waveform setting device for setting the cut waveform, a fusion interval setting device for setting the interval during which a fusion waveform is output, a fusion waveform setting device for setting the fusion waveform, a shaped waveform setting device for setting a shaped waveform, a waveform synthesizer for synthesizing a simulation arc length by synthesizing respective set waveforms in order, an analog switch installed in each waveform setting device and used for controlling the supply of each set waveform to the waveform synthesizer, an invertor element for controlling the reading of each set waveform, a flip-flop for setting the shaped waveform output interval based on the current waveform period signal output timing, and an AND gate for controlling the ON/OFF state of the analog switch for controlling the output from the shaped waveform setting device.

11. A pulsed arc welding apparatus as claimed in claim 10, wherein said arc length setting device includes a charge-discharge circuit for smoothing the simulation current waveform signal produced from the current waveform setting device so as to obtain a simulation arc length signal.

12. A pulsed arc welding apparatus as claimed in claim 10, wherein said arc length setting circuit includes a short-circuit interval detector for detecting the short-circuit between the molten lump and the workpieces according to said arc length signal so as to output a short-circuit interval detection signal, and a means for measuring short-circuit time or short-circuit frequency per unit time according to said short-circuit interval signal and for comparing said measured value with a preset prescribed value so as to correct the arc length waveform to a simulation arc length waveform level according the difference signal resulting from the comparison.

13. A pulsed arc welding apparatus as claimed in claim 12, wherein said arc length setting device comprises a short-circuit frequency convertor for counting short-circuit detection signals so as to convert the count into a short-circuit state occurrence frequency within a predetermined time, a short-circuit frequency setting device for setting the short-circuit state occurrence frequency within the predetermined time, and a comparator for comparing the short-circuit state occurrence frequency thus converted and output from said short-circuit convertor so as to output the level modifying signal at the arc length waveform signal level when the short-circuit state occurrence frequency exceeds a set short-circuit constant.

14. A pulsed arc welding apparatus as claimed in claim 10, wherein said arc length setting device includes a short-circuit time converter for measuring a short-circuit signal per unit time on the basis of the output duration of the short-circuit interval detection signal received from said short-circuit interval detector, a prescribed short-circuit setting device for setting the prescribed short-circuit time signal, and a comparator for comparing the short-circuit time per unit time with the prescribed short-circuit time signal value so as to output a level modifying signal $\Delta\tau$ at the simulation arc length waveform signal level as the difference signal.

15. A pulsed arc welding apparatus as claimed in claim 8, wherein said arc length setting device is used for simulating and setting the arc length waveform indicating the momentary variation of the arc length as the welding process proceeds in conformity with the reference welding current waveform set by said current waveform setting device.

16. A pulsed arc welding apparatus as claimed in claim 8, wherein said pulsating current waveform control circuit comprises a current waveform period setting device for synchronizing said reference welding current waveform with the period of reading the arc length waveform.

17. A pulsed arc welding apparatus as claimed in one of the claims 8, 9, 11, and 16, wherein said arc length setting device includes a separation detector for outputting a separation detection signal at the time the molten lump at the tip of the wire electrode separates according to said arc length signal, an output control means for correcting the output signal from the preset simulation arc length waveform setting device according to said separation detector, and a means for receiving said set reference welding current waveform so as to set it for simulation.

18. A pulsed arc welding apparatus as claimed in claim 17, wherein said arc length setting device includes a control means for controlling the fusion interval setting device so as to turn it on receiving said separation detection signal and to control the fusion waveform output of the fusion waveform setting device.

19. A pulsed arc welding apparatus as claimed in claim 8, wherein said pulsating current waveform control circuit includes a computing element for correcting the reference welding current waveform according to the different signal output from said comparator only when no said short-circuit interval is output and for controlling the correcting operation only when the short-circuit interval signal is output.

20. A pulsed arc welding apparatus as claimed in claim 1 or 2, wherein said welding apparatus includes a mean arc length converter for outputting a mean arc length signal according to the arc length signal, a target arc length setting device for setting a target arc length, a comparator for outputting a difference signal between said mean arc length and the target arc length, a pulsating current group output unit for periodically outputting a plurality of pulse trains (pulsating current group waveform), a charge amount setting device for setting the charge amount of the group of pulsating currents including the pulsed or base current during said period according to said difference signal, and a pulsating current group supply control unit, said control unit being used for suspending the supply of the group of pulsating currents when the output from the set charge amount setting device and the charge amount of the group of pulsating currents to be supplied substantially reach a predetermined value.

21. A pulsed arc welding apparatus as claimed in claim 20, wherein said pulsating current waveform control circuit includes a mean for detecting the short-circuit interval of the molten lump, a means for deciding the arc interval from said short-circuit interval, and a means for restricting the arc current during said arc interval when the charge amount during the arc interval and the set charge amount substantially reach the predetermined value.

22. A pulsed arc welding apparatus as claimed in claim 1 or 2, wherein said welding apparatus includes a sampling arc length convertor for extracting said arc length signal at every specific time, a sampling arc length setting device for setting a target sampling arc length at the specific time, a comparator for outputting a difference signal between said sampling arc signal and the target sampling arc length, the pulsating current group output unit for periodically outputting the plurality of pulse trains (pulsating current group waveform), the charge amount setting device for setting the charge amount of the group of pulsating currents including the pulsed or base current during said period, and the pulsating current group supply control unit, said control unit being used for suspending the supply of the group of pulsating currents when the output from the set charge amount setting device and the charge amount of the group of pulsating currents to be output substantially reach the predetermined value.

23. A pulsed arc welding apparatus as claimed in claim 1 or 2, wherein said welding apparatus includes the current waveform control circuit comprising the mean arc length converter for outputting a mean arc length signal by computing the mean value of the detected momentary arc length value output from the arc length detector, the target arc length setting device for setting a target arc length, the comparator for comparing the mean arc length with the target arc length so as to output the difference signal therebetween, the pulsating current group output unit for periodically outputting the group of pulsating currents composed of the plurality of pulse trains, the pulsating current group supply control unit for setting the charge amount of the group of pulsating currents including the pulsed or base current and for comparing the set charge amount with the charge amount of the group of pulsating currents thus caused to be output so as to output a decision signal when the charge amount of that group of pulsating currents substantially reaches the predetermined value, and a pulsating current output holding means for holding and outputting a high level output of the group of pulsating currents from a pulsating current supply control unit.

24. A pulsed arc welding apparatus as claimed in claim 23, wherein said pulsating current waveform control circuit includes a means for detecting a short-circuit interval, a means for deciding the arc interval from said short-circuit interval signal, and a signal output instruction means for applying an instruction signal as to the output of the group of pulsating currents to the pulsating current group output unit.

25. A pulsed arc welding apparatus as claimed in claim 1 or 2, wherein said welding apparatus includes the pulsating current waveform control circuit comprising the sampling arc length convertor for extracting and sampling said arc length signal at every specific time, the sampling arc length setting device for setting a target sampling arc length at the specific time, the comparator for comparing the sampling arc length signal with the target sampling arc length so as to output the difference signal therebetween, the pulsating current group output unit for setting and periodically outputting the group of pulsating currents composed of the plurality of pulse trains, the pulsating current group supply control unit for setting the charge amount of the group of pulsating currents including the pulsed or base current and for comparing the set charge amount with the charge amount of the group of pulsating currents thus caused to be output so as to output a decision signal when the charge amount of that group of pulsating currents substantially reaches the predetermined value, and a pulsating current output holding means for holding and outputting a high level output of the group of pulsating currents from a pulsating current supply control unit.

26. A pulsed arc welding apparatus as claimed in claim 1 or 2, wherein said welding apparatus includes the pulsating current group supply control unit comprising the mean arc length convertor for computing the mean value of the arc length signal from each arc length signal so as to output the mean arc length signal, the target arc length setting device for setting the target arc length, the comparator for comparing the means arc length with the target arc length so as to output the difference signal, the pulsating current group output unit for setting the pulsating current group waveform composed of the plurality of pulse trains and for deciding the peak value of the group of pulsating currents according to the difference signal so as to periodically output the group of pulsating currents, and the pulsating current group supply control unit for setting the charge amount of the group of pulsating current including the group of pulsating currents or base current and for comparing the set charge amount with the charge amount of the group of output pulsating currents so as to suspend the supply of the group of pulsating currents when the charge amount of the group of pulsating currents to be output substantially reaches the predetermined value.

27. A pulsed arc welding apparatus as claimed in claim 26, wherein said pulsating current waveform control circuit includes a means for detecting the short-circuit interval, a means for deciding the arc interval from said short-circuit interval, and a means for controlling the arc current during said arc interval when the charge amount during the arc interval and the set charge amount reach the predetermined value.

28. A pulsed arc welding apparatus as claimed in claim 1 or 2, wherein said welding apparatus includes the pulsating current waveform control circuit comprising the sampling arc length convertor for extracting and sampling said arc length signal at every specific time, the sampling arc length setting device for setting a target sampling arc length at the specific time, the comparator for comparing the sampling arc length signal with the target sampling arc length so as to output the difference signal therebetween, the pulsating current group output unit for setting the pulsating current group waveform composed of the plurality of pulse trains and for deciding the peak value of the group of pulsating currents according to the difference signal so as to periodically output the group of pulsating currents, and the pulsating current group supply control unit for setting the charge amount of the group of pulsating currents including the group of pulsating currents or base current according to the difference signal and for comparing the set charge amount with the charge amount of the group of output pulsating currents to be supplied so as to suspend the supply of the group of pulsating currents when the charge amount of the group of pulsating currents to be supplied substantially reaches the predetermined value.

29. A pulsed arc welding apparatus as claimed in claim 1 or 2, wherein said welding apparatus includes the pulsating current waveform control circuit comprising the mean arc length convertor for computing the mean value of the detected arc length value output from said arc length detector and momentarily varying so as to output the mean arc length signal, the target arc length setting device for setting the target arc length, the comparator for comparing the mean arc length with the target arc length so as to output the difference signal, a pulse waveform setting device for setting the waveform of the pulsating current form the welding current so as to output the pulsating current, and the pulsating current supply control unit for setting the charge amount of the group of pulsating currents to be supplied according to the difference signal and for comparing the set charge amount with the charge amount of the group of output pulsating currents to be supplied so as to suspend the supply of the group of pulsating currents when the charge amount of the group of pulsating currents to be supplied reaches the set charge amount.

30. A pulsed arc welding apparatus, according to clam 1, wherein said arc length detector further includes a first isolating amplifier for amplifying the arc voltage detected by said voltage detector,
a second isolation amplifier for amplifying the arc current detected by the current detector, and
an arc voltage setting device for converting an output of said second isolating amplifier to a reference voltage.

31. A pulsed arc welding apparatus, according to claim 1, wherein said arc length detector further includes a function setting device for receiving the detected arc current and for outputting a function setting value based on said current, and
a multiplier for multiplying said detected current and an output of said function setting device to form said reference arc voltage.

32. A pulsed arc welding apparatus, according to claim 1, further comprising a d.c. voltage constant setting device for multiplying a reference arc voltage by a preset offset value and outputting a d.c. voltage, and
an adder for summing a signal representative of said detected arc current and said d.c. voltage and outputting said reference arc voltage.

33. A pulsed arc welding apparatus, according to claim 1, wherein said arc length detector further comprises a comparator for comparing said arc reference voltage with said detected arc voltage and outputting said arc length signal therefrom.

34. A pulsed arc welding apparatus, according to claim 1, wherein said arc length detector includes an arc voltage setting device for converting said detected current to an arc reference voltage, and a comparator for comparing said reference arc voltage and said detected arc voltage and for outputting said arc length signal therefrom.

35. A pulsed arc welding apparatus, according to claim 1, wherein said arc length detector converts said detected current to said arc reference voltage based on the following equation:

$$V_x K_1(I)*I + K_2,$$

wherein $V_x$ represents said reference arc voltage, $K_1$ and $K_2$ represent constants and I represents said detected current.

* * * * *